(12) United States Patent
Fujita et al.

(10) Patent No.: US 7,813,835 B2
(45) Date of Patent: Oct. 12, 2010

(54) ROBOT BEHAVIOR CONTROL SYSTEM, BEHAVIOR CONTROL METHOD, AND ROBOT DEVICE

(75) Inventors: Masahiro Fujita, Saitama (JP); Tsuyoshi Takagi, Kanagawa (JP); Rika Horinaka, Tochigi (JP); Shinya Ohtani, Tokyo (JP)

(73) Assignee: Sony Corporation, Tokyo (JP)

( * ) Notice: Subject to any disclaimer, the term of this patent is extended or adjusted under 35 U.S.C. 154(b) by 1550 days.

(21) Appl. No.: 10/477,574

(22) PCT Filed: Mar. 17, 2003

(86) PCT No.: PCT/JP03/03129

§ 371 (c)(1),
(2), (4) Date: May 21, 2004

(87) PCT Pub. No.: WO03/078113

PCT Pub. Date: Sep. 25, 2003

(65) Prior Publication Data

US 2004/0243281 A1  Dec. 2, 2004

(30) Foreign Application Priority Data

Mar. 15, 2002 (JP) .............................. 2002-072351
Mar. 15, 2002 (JP) .............................. 2002-072352

(51) Int. Cl.
*G06F 19/00* (2006.01)

(52) U.S. Cl. ...................... 700/245; 700/253; 700/255; 700/258; 700/259; 318/568.12; 901/1

(58) Field of Classification Search ................ 700/31, 700/245, 248, 258, 259, 253, 255; 318/565, 318/568.11, 568.2, 569, 567, 568.12, 568.16, 318/580, 587; 348/121; 704/207, 209, 270; 901/1, 15, 47, 46; 342/125, 174; 701/23, 701/24, 25, 50, 208, 209, 210, 213, 214, 701/215; 180/168, 169; 382/153, 154; 702/150, 702/152, 153

See application file for complete search history.

(56) References Cited

U.S. PATENT DOCUMENTS

| | | | |
|---|---|---|---|
| 5,040,116 A | * | 8/1991 | Evans et al. .................... 701/28 |
| 6,038,493 A | * | 3/2000 | Tow ........................... 700/259 |
| 6,337,552 B1 | | 1/2002 | Inoue et al. |
| 6,362,589 B1 | | 3/2002 | Inoue et al. |

(Continued)

FOREIGN PATENT DOCUMENTS

| | | |
|---|---|---|
| EP | 1 088 629 | 4/2001 |
| EP | 1088629 A1 * | 4/2001 |
| JP | 2001-179666 | 7/2001 |
| JP | 2001-334482 | 12/2001 |

OTHER PUBLICATIONS

Banergee et al., A Behavioral Layer Architecture for Telecollaborative Virtual Manufacturing Operations, 2000, IEEE, p. 218-227.*
Blahur et al., Applying a Culture Dependent Emotion Triggers Database for Text Valence and Emotion Classification, 199, Inteernet, p. 1-8.*

*Primary Examiner*—Khoi Tran
*Assistant Examiner*—Spencer Patton
(74) *Attorney, Agent, or Firm*—Frommer Lawrence & Haug LLP; William S. Frommer; Thomas F. Presson

(57) ABSTRACT

A behavior control system for a robot apparatus that operates autonomously. The behavior control system includes a plurality of behavior description sections for describing motions of the robot and an external environment recognition section. The system also includes an internal state management section for managing an internal state of the robot in response to the recognized external environment and/or a result of execution of a behavior, and for managing emotions. A behavior evaluation section evaluates execution of behaviors in response to the external environment and/or the internal state.

45 Claims, 47 Drawing Sheets

U.S. PATENT DOCUMENTS

| | | | |
|---|---|---|---|
| 6,408,226 B1 * | 6/2002 | Byrne et al. | 700/258 |
| 6,442,450 B1 * | 8/2002 | Inoue et al. | 700/245 |
| 6,535,793 B2 * | 3/2003 | Allard | 700/259 |
| 6,615,109 B1 * | 9/2003 | Matsuoka et al. | 700/245 |
| 6,650,965 B2 * | 11/2003 | Takagi et al. | 700/245 |
| 6,845,297 B2 * | 1/2005 | Allard | 700/259 |
| 7,523,080 B1 * | 4/2009 | Yokoe | 706/16 |
| 2002/0156751 A1 * | 10/2002 | Takagi et al. | 706/12 |

* cited by examiner

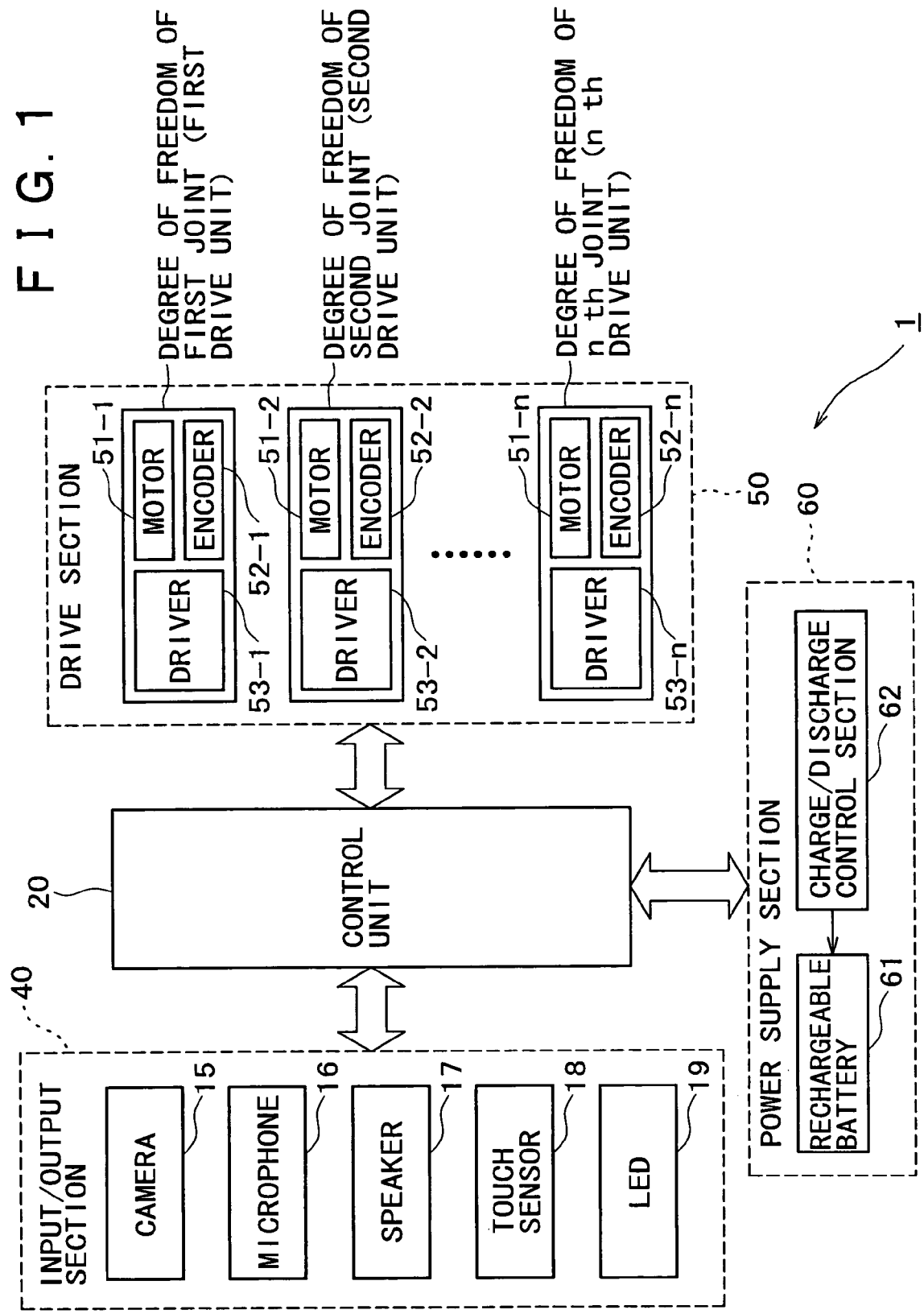

FIG. 7
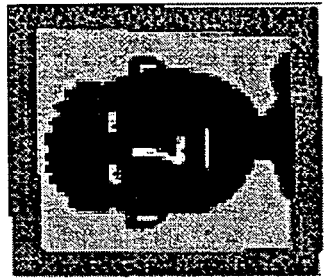
B
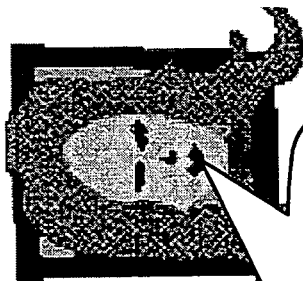
A
MASAHIRO!
- DETECTION OF SOUND COMING DIRECTION
- VOICE RECOGNITION
- FACE DISCRIMINATION
- TURN TO CALLING PERSON AND TRACK FACE
- START DIALOG
ROBOT
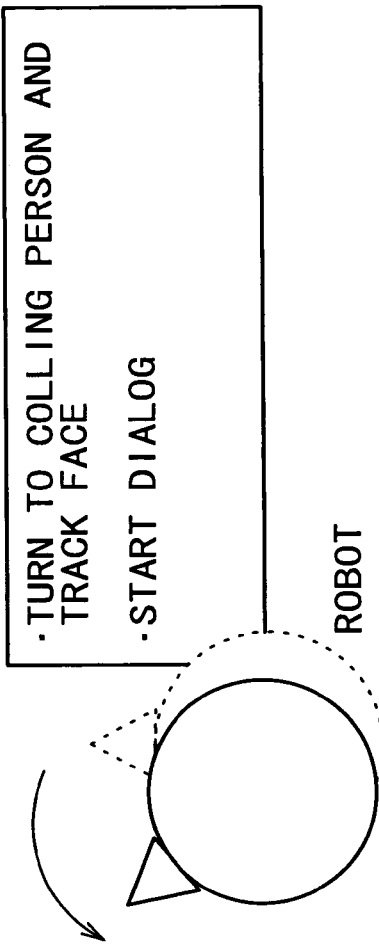

F I G. 1 4
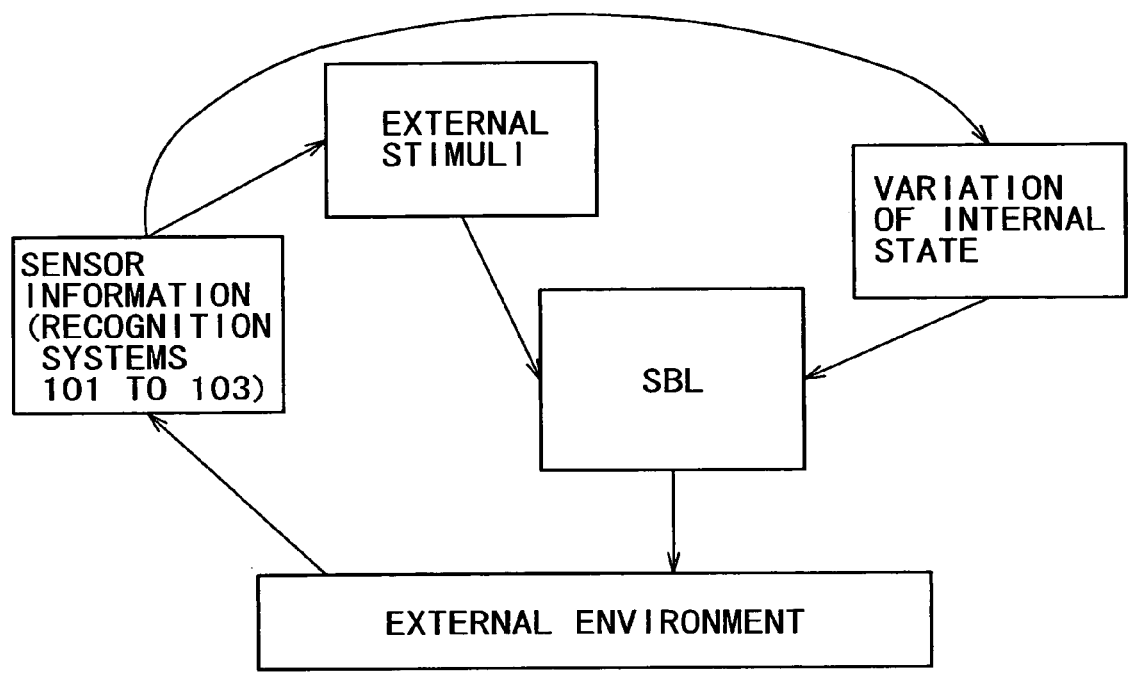
F I G. 1 5
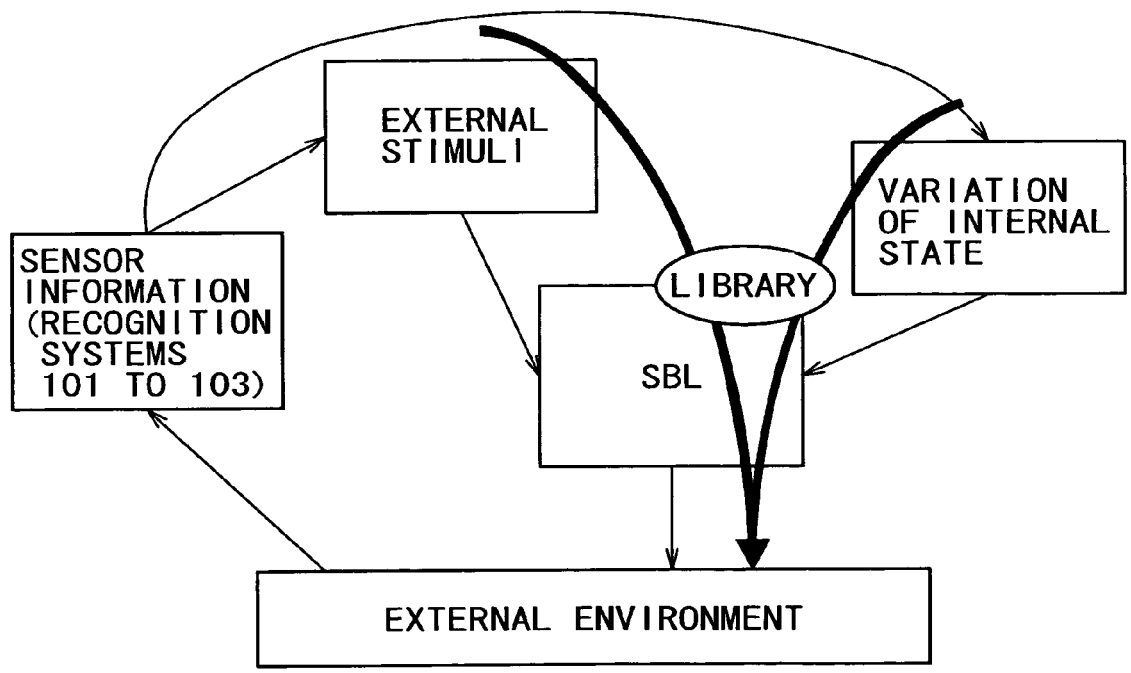

ROBOT BEHAVIOR CONTROL SYSTEM, BEHAVIOR CONTROL METHOD, AND ROBOT DEVICE

TECHNICAL FIELD

This invention relates to a behavior control system and a behavior control method for a robot and a robot apparatus wherein a robot operates autonomously to achieve realistic communication with a user, and more particularly to a behavior control system and a behavior control method and a robot apparatus for a robot of the situated behavior type wherein a robot integrally discriminates a situation in which the robot is placed such as a result of recognition of an external environment through a visual sense or an auditory sense and an internal state such as an instinct or a feeling to select a suitable behavior.

BACKGROUND ART

A mechanical apparatus that performs movements similar to motions of a human being using electrical or magnetic actions is called "robot". It is said that the word "robot" originates from a word "ROBOTA" (slave machine) in Slavic. Here in Japan, robots began to be popularized at the end of the 1960s. Most of them, however, were industrial robots such as manipulators or transport robots intended for automation and unmanning of manufacturing works in a factory.

Recently, research and development regarding a structure of legged mobile robots and its stable walking control such as pet type robots which copy body mechanisms and motions of animals which perform quadrupedal walking like a dog, a cat or a bear or such as "human-like" or "humanoid" robots which copy body mechanisms and motions of animals which perform bipedal upright walking such as a human being or a monkey have proceeded. Thus, expectation for practical use of the legged mobile robots and its stable walking control has been increasing. Such legged mobile robots are superior in that a flexible walking or traveling operation in moving up and down the stairs or in riding over an obstacle can be achieved although they are disadvantageous in that they are unstable and difficult in posture control and walking control compared with robots of the crawler type.

One of applications of legged mobile robots is a substitute for various difficult works in industrial, manufacturing and like activities. The substitution may be, for example, for maintenance works in atomic power plants, thermal power plants and petrochemical plants, for transporting and assembling works of parts in manufacturing factories or for dangerous works and difficult works such as cleaning of multistoried buildings, salvage in fire cites and like places.

Another application of legged mobile robots is a living-based type, that is, an application for "symbiosis" with human being or "entertainment" rather than working assistance. Robots of the type just described regenerate abundant feeling expressions in fidelity making use of motion mechanisms and the limbs of legged walking animals that have a comparatively high intelligence such as human beings, dogs (pets) or bears. Further, it is demanded for a robot of the type described not only to execute motion patterns inputted in advance merely in fidelity but also to achieve a living responding expression dynamically responding to a word or a behavior ("praise", "scold", "tap" or the like) received by a user (or some other robot).

Conventional toy machines have a fixed relationship between a user operation and a responding motion, and it is impossible to change a motion of a toy in accordance with a taste of a user. As a result, the user will soon become tired of the toy that only repeats the same motions. In contrast, an intelligent robot autonomously selects a behavior including dialog and machine body movements, and therefore, can achieve realistic communication at a higher intelligence level. As a result, the user will feel deep love and friendship to the robot.

In a robot or some other realistic dialog system, a behavior is normally selected successively in response to a variation of an external environment through a visual sense or an auditory sense. In another example of a behavior selection mechanism, emotions such as an instinct and a feeling are modeled to manage an internal state of a system, and a behavior is selected in response to a variation of the internal state. Naturally, the internal state of the system varies not only depending upon the external environment but also depending upon development of a selected behavior.

However, examples of situated behavior control wherein a robot integrally discriminates a situation in which the robot is placed such as an external environment and an internal state and selects a behavior based on the discrimination are few.

Here, the internal state may include a factor such as an instinct which corresponds, for example, to an access to the limbic system in a living organism, another factor which can be grasped with an ethological model such as an innate desire or a social desire that corresponds to an access to the brain cortex, a further factor called feeling such as joy, sad, anger or surprise, and so forth.

In conventional intelligent robots and other autonomous dialog type robots, the internal state including such various factors as an instinct and a feeling is all managed collectively and one-dimensionally as "emotion". In other words, the various factors of the internal state exist in parallel to each other, and a behavior is selected only based on a situation of an external world or an internal state without definite selection criteria.

In conventional systems, all behaviors are present in one dimension for selection and development of a motion, and it is determined which one of the behaviors should be selected. Therefore, as the number of motions increases, the selection becomes complicated and it becomes more difficult to perform behavior selection on which a situation or an internal state at the time is reflected.

DISCLOSURE OF THE INVENTION

It is an object of the present invention to provide a superior behavior control system and behavior control method for a robot and robot apparatus that can perform an autonomous motion and achieve realistic communication.

It is another object of the present invention to provide a superior behavior control system and behavior control method for a robot and robot apparatus which can integrally discriminate a situation in which it is placed such as a result of recognition of an external environment through a visual sense or an auditory sense or an internal state such as an instinct or a feeling to select a behavior.

It is a further object of the present invention to provide a superior behavior control system and behavior control method for a robot and robot apparatus in which existence significance regarding feelings is made more definite so that a robot can suitably select and execute a behavior suitable for an external stimulus or an internal state in fixed order.

It is a still object of the present invention to provide a superior behavior control system and behavior control method for a robot and robot apparatus which can integrally discriminate a situation in which it is placed such as a result of recognition of an external environment through a visual sense or an auditory sense or an internal state such as an instinct or a feeling to select a behavior.

The present invention has been made taking the subject described above into consideration, and according to a first aspect of the present invention, there is provided a behavior control system for a robot which operates autonomously, including:

a plurality of behavior description sections for describing motions of a machine body of the robot;

an external environment recognition section for recognizing an external environment of the machine body;

an internal state management section for managing an internal state of the robot in response to the recognized external environment and/or a result of execution of a behavior; and a behavior evaluation section for evaluating execution of behaviors described in the behavior description sections in response to the external environment and/or the internal state.

It is to be noted that the term "system" here signifies a logical set of a plurality of apparatus (or function modules for implementing particular functions) particularly irrespective of whether or not the apparatus or function modules are accommodated in a single housing.

The external environment recognition section performs at least one of visual recognition of the outside, auditory recognition of sound generated outside the robot and contact recognition of contact applied from the outside to the robot. Meanwhile, the internal state management section manages an instinct model and/or a feeling model of the robot.

The behavior description sections are arranged in a tree structure form in accordance with implementation levels of the machine body motions. The tree structure includes a plurality of branches such as branches for executing behavior models representing ethological situated behaviors in formulae and branches for executing emotional expressions. For example, in a lower layer immediately below a route behavior description section, behavior description sections named "Investigate", "Ingestive" and "Play" are disposed. Below the "Investigate", behavior description sections which describe more concrete investigative behaviors such as "InvestigativeLocomotion", "HeadinAirSniffing" and "InvestigativeSniffing" are disposed. Similarly, below the behavior description section "Ingestive", behavior description sections which describe more concrete ingestive behaviors such as "Eat" and "Drink" are disposed. Below the behavior description section "Play", behavior description sections that describe more concrete playing behaviors such as "PlayBowing", "PlayGreeting" and "PlayPawing" are disposed.

In such an instance, the behavior evaluation section simultaneously and concurrently evaluates a plurality of ones of the behavior description sections from above to below in the tree structure. When evaluation of each of the behavior description sections is performed by the behavior evaluation section in response to new recognition by the external environment recognition section and/or a variation of the internal state by the internal state management section, permission of execution as a result of the evaluation is successively passed from above to below in the tree structure. Accordingly, a behavior suitable in response to the external environment or a change of the internal state can be selectively executed. In other words, evaluation and execution of a situated behavior can be performed concurrently.

The behavior control system for a robot may further include a resource management section for managing conflict of a resource on the machine body when behaviors described in a plurality of ones of the behavior description sections are executed simultaneously. In such an instance, the behavior selection section can simultaneously select two or more ones of the behavior description sections on the premise that conflict of a resource is arbitrated.

If a result of execution of evaluation of each of the behavior description sections by the behavior evaluation section based on new recognition by the external environment recognition section reveals appearance of a behavior description section which exhibits an evaluation value higher than that of the behavior being currently executed, the behavior selection section may stop the behavior being currently executed and preferentially execute the behavior described in the behavior description section having the higher evaluation value. Accordingly, a behavior that requires a higher degree of significance or urgency like a reflex behavior can be executed preferentially interrupting a situated behavior being executed already. In such an instance, preferably the behavior stopped once is resumed after the behavior executed preferentially comes to an end.

The behavior selection section may successively select a same one of the behavior description sections in response to a variation of each different external environment. In such an instance, an individual working space is allocated for each external environment every time the behavior described in the behavior description section is executed.

For example, while a behavior of dialog with a user A is executed, another user B cuts into the dialog between the robot and the user A and, as a result of evaluation of the activity levels performed based on an external stimulus and a variation of the internal state, the behavior of the dialog with the user B exhibits higher priority, the dialog with the user B is performed interrupting the dialog with the user A.

In such an instance, the dialogs with the persons A and B are both performed in accordance with the same behavior description section. Thus, a working space for the behavior of the dialog with the user B is allocated separately from a working space for the behavior of the dialog with the user A thereby to prevent interference between contents of the dialogs. In other words, the contents of the dialog with the user A are not destroyed by the dialog with the user B. Consequently, after the dialog with the user B comes to an end, the dialog with the user A can be resumed from the interrupted point.

According to a second aspect of the present invention, there is provided a behavior control system or behavior control method for a robot which operates autonomously in response to an internal state thereof, including:

an internal state management section or step for managing emotions each of which is an index to the internal state in a hierarchical structure having a plurality of layers; and a behavior selection section or step for selectively executing a behavior for satisfying one of the emotions in each of the layers.

Here, the internal state management section or step may divide the emotions into a layer of primary emotions necessary for individual preservation and another layer of secondary emotions which vary depending upon excess/deficiency of the primary emotions, and further divide the primary emotions into layers including an innate reflexive or physiological layer and an associative layer based on dimensions.

The behavior selection section or step may preferentially select a behavior that satisfies a comparatively low order primary emotion. Or, the behavior selection section or step may suppress selection of a behavior that satisfies a comparatively low order primary emotion where a comparatively high order primary emotion exhibits significant shortage when compared with the comparatively low order primary emotion.

In the behavior control system and the behavior control method for a robot according to the second aspect of the present invention, the emotions are divided into a plurality of hierarchical layers depending upon the significance of presence thereof, and a motion is determined in each of the layers. It is determined which one of a plurality of such determined motions should be selectively performed depending upon an external environment and an internal state at the time. Further, while a motion is selected in each of the layers, the order in which the motions should be performed is based on the priority order of the internal states of the robot. Therefore, the motions are developed preferentially beginning with that of a comparatively low layer so that an instinctive motion such as reflex and a higher order behavior such as selection of a motion through use of memory can be developed without a contradiction on a single individual. Further, this makes a definite index also when behaviors are categorized to generate schemas.

The behavior control system or behavior control method for a robot according to the second aspect of the present invention may further include an external environment recognition section for recognizing a variation of an external environment of the robot. In such an instance, the behavior selection section or step may select a behavior based on an index to the external environment in addition to the index to the internal state.

The internal state management section or step may change the index to the internal state in response to passage of time by use of the biorhythm or the like.

The internal state management section or step may change the index to the internal state in response to execution of a behavior selected by the behavior selection section, that is, in response to a degree of the motion.

Further, the internal state management section or step may change the index to the internal state in response to a variation of the external environment.

The behavior control system or method for a robot according to the second aspect of the present invention may further include and an associative memory section for associatively storing a variation of the internal state from the external state. In such an instance, the internal state management section or step may change the index to the internal state based on a variation of the internal state recalled from the external environment by the associative memory section or step. Further, the associative memory section or step may associatively store a variation of the internal state for each object article to be recognized in the external environment.

Selection or development of a motion in a conventional robot basically depends upon a physical distance to an object article or an internal state of the robot at the time. In other words, such behavior selection as what behavior should be taken depending upon difference in an object article is not performed.

In contrast, according to the behavior control system and the behavior control method for a robot according to the second aspect of the present invention, since a variation of an internal state which differs among different object articles can be recalled using associative memory, even if the situation is same, the facility in development of a behavior can be made different. In other words, a behavior can be selected taking not only an external stimulus or physical situation and a current internal state but also memory for each object article of the robot into consideration. Consequently, variegated and diversified countermeasures can be anticipated.

For example, if the robot does not perform a fixed behavior depending upon an external environment or an internal state like "the robot performs ×× since it sees ○○" or "the robot performs ×× (for everything) since it currently lacks in ○○" but uses variation memory of an internal state regarding an object article like "even if the robot sees ○○ it performs □□ because of ΔΔ" or "even if the robot sees ○○, it performs ■■ because of ××", then various behaviors can be achieved.

The other objects, features and advantages of the present invention will become apparent from the following description a preferred embodiment of the present invention taken in conjunction with the accompanying drawings.

BRIEF DESCRIPTION OF THE DRAWINGS

FIG. 1 is a block diagram schematically showing a functional configuration of a robot apparatus 1 embodying the present invention;

FIG. 7 is a schematic view illustrating a dialog process between users A and B by the robot 1;

FIG. 14 is a flow diagram schematically illustrating a form of situated behavior control by a situated behavior layer 108;

FIG. 15 is a flow diagram illustrating an example of basic motions in behavior control by the situated behavior layer 108 shown in FIG. 14;

BEST MODE FOR CARRYING OUT THE INVENTION

Figure 2:
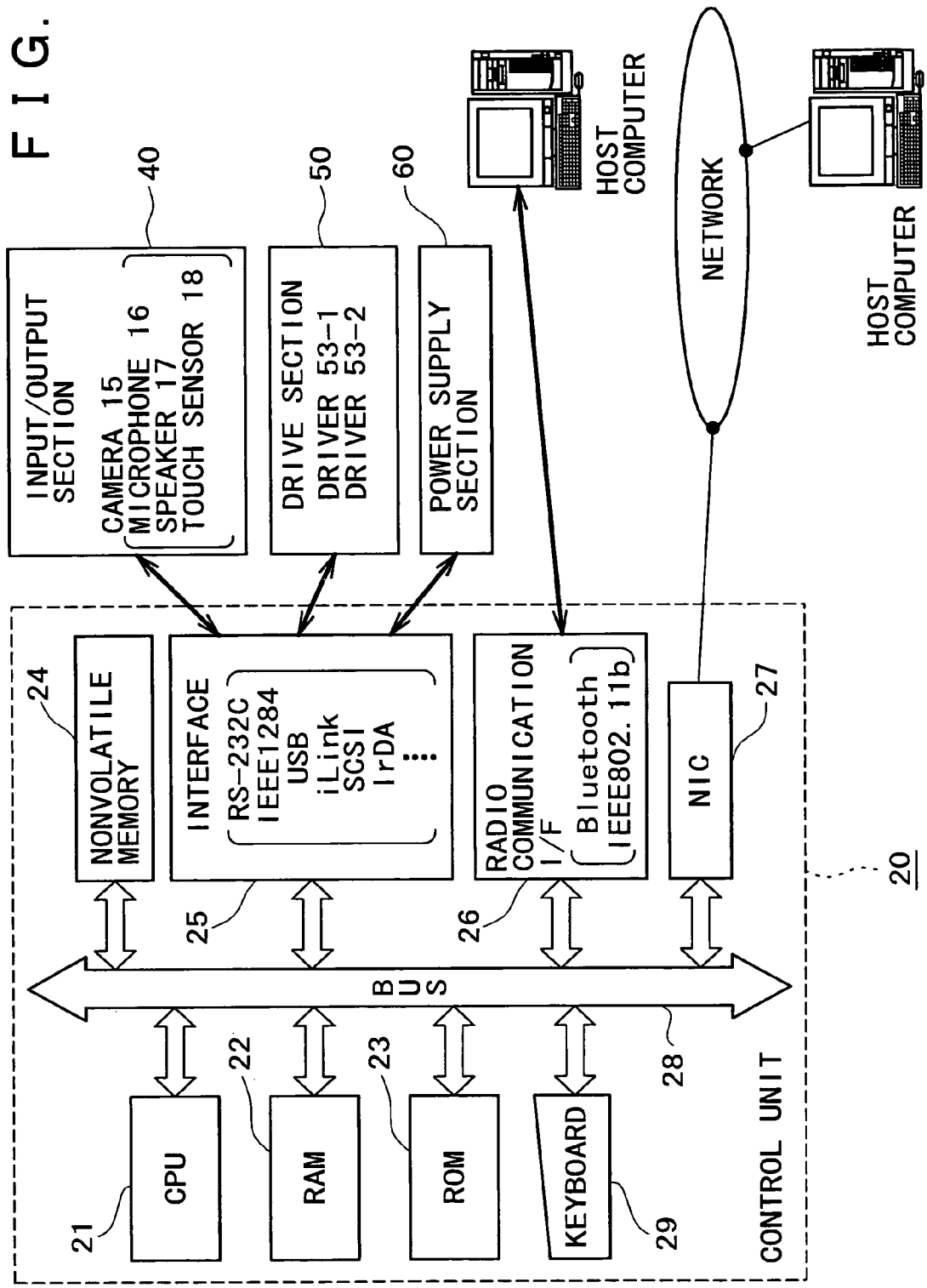
FIG. 2 is a block diagram more particularly showing a configuration of a control unit 20.

In the following, an embodiment of the present invention is described with reference to the drawings.

A. Configuration of the Robot Apparatus

FIG. 1 schematically shows a functional configuration of a robot apparatus 1 embodying the present invention. Referring to FIG. 1, the robot apparatus 1 includes a control unit 20 which performs general control of operation of the entire robot 1 and other data processes, an input/output section 40, a drive section 50, and a power supply section 60. In the following, description is given of the components.

The input/output section 40 includes, as input elements thereof, a CCD camera 15 that corresponds to an eye of robot apparatus 1 and a microphone 16 that corresponds to an ear. The input/output section 40 further includes, as input elements thereof, touch sensors 18 disposed at such locations as the head and the back for sensing contact of a user, and other various sensors which correspond to the five senses as input elements. Further, the input/output section 40 includes, as outputting elements thereof, a speaker 17 which corresponds to the mouth, an LED indicator (eye lamp) 19 which forms various expressions of the face through a combination of blinking or a timing of lighting, and other necessary elements. The outputting elements can represent user feedback from the robot apparatus 1 even in such forms as sound or blinking of a lamp other than mechanical movement patterns by the legs and so forth.

The drive section 50 is a function block that implements machine body motions of the robot apparatus 1 in accordance with a predetermined movement pattern indicated by an instruction from the control unit 20 and is an object of control by behavior control. The drive section 50 is a function module for achieving the degree of freedom at each joint of the robot apparatus 1 and includes a plurality of drive units provided for individual shafts such as roll, pitch and roll shafts at each joint. Each of the drive units is formed from a combination of a motor 51, an encoder 52 and a driver 53. The motor 51 provides a rotational motion around a predetermined axis. The encoder 52 detects the rotational position of the motor 51. The driver 53 adaptively controls the rotational position and/or the rotational speed of the motor 51 based on an output of the encoder 52.

The robot apparatus 1 can be configured as a legged mobile robot such as, for example, a bipedal walking robot or a quadrupedal walking robot depending upon a manner of combination of drive units.

The power supply section 60 is a functional module that literally supplies power to various electric circuits and so forth in the robot apparatus 1. The robot apparatus 1 according to the present embodiment is an autonomously driven robot that uses a battery, and the power supply section 60 includes a chargeable battery 61 and a charge/discharge control section 62 that manages a charging/discharging state of the chargeable battery 61.

The chargeable battery 61 is formed as a "battery pack" wherein, for example, pluralities of lithium ion secondary cells are packaged like a cartridge.

The charge/discharge control section 62 measures the terminal voltage, charging/discharging current amount, ambient temperature and so forth of the chargeable battery 61 to grasp the remaining capacity of the chargeable battery 61 to determine a starting timing or an ending timing of charging. The starting and ending timings of charging determined by the charge/discharge control section 62 are conveyed to the control unit 20 and used as a trigger by the robot apparatus 1 for starting and ending a charging operation.

The control unit 20 corresponds to the "brain" and is carried, for example, on the head part or the body part of the machine body of the robot apparatus 1.

FIG. 2 illustrates details of the configuration of the control unit 20. Referring to FIG. 2, the control unit 20 includes a CPU (Central Processing Unit) 21 that serves as a main controller and is connected to a memory and other circuit components as well as peripheral equipment by a bus. The bus 27 is a common signal transmission line including a data bus, an address bus, a control bus and other necessary buses. The apparatus on the bus 27 have unique addresses (memory addresses or I/O addresses) individually allocated thereto. The CPU 21 can designate an address to communicate with a particular one of the apparatus on the bus 27.

A RAM (Random Access Memory) 22 is a writable memory formed from a volatile memory such as a DRAM (Dynamic RAM) and is used to load program codes to be executed by the CPU 21 or to temporarily store work data used by an executive program.

A ROM (Read Only Memory) 23 is a read only memory for permanently storing programs and data. Program codes stored in the ROM 23 may include a self-diagnosis program executed when the power supply to the robot apparatus 1 is on and motion control programs that define motions of the robot apparatus 1.

Control programs of the robot apparatus 1 include a "sensor input and recognition processing program" for processing sensor inputs of the CCD camera 15, microphone 16 and so forth to recognize them as symbols. The control programs further include a "behavior control program" for controlling the behavior of the robot apparatus 1 based on sensor inputs and predetermined behavior control models while controlling storage operations (hereinafter described) such as short-term memory and long-term memory. The control programs further include a "drive control program" for controlling driving of joint motors, sound outputting of the speaker 17 and so forth in accordance with the behavior control models.

A nonvolatile memory 24 is formed from a memory device that allows electric erasure and rewriting like, for example, an EEPROM (Electrically Erasable and Programmable ROM) and is used to retain data to be updated successively in a nonvolatile fashion. The data to be updated successively may be an encryption key or other security information, an apparatus control program to be installed after shipment and so forth.

An interface 25 is an apparatus for establishing mutual connection to an apparatus outside the control unit 20 to allow data exchange with the apparatus. The interface 25 inputs and outputs data, for example, to and from the camera 15, microphone 16 and speaker 17. The interface 25 further inputs and outputs data and/or commands from and to drivers 53-1, . . . provided in the drive section 50.

The interface 25 may include a universal interface for connection of peripheral equipment to a computer such that it may move a program or data to or from a locally connected external apparatus. The universal interface may be a serial interface such as the RS (Recommended Standard)-232C interface, or a parallel interface such as the IEEE (Institute of Electrical and Electronics Engineers) 1284 interface. The universal interface may otherwise be a USB (Universal Serial Bus) interface, an i-Link (IEEE1394) interface, a SCSI (Small Computer System Interface) interface or a memory card interface (card slot) for accepting a PC card or a memory stick.

Further, as another example of the interface 25, an infrared communication (IrDA) interface may be provided so as to perform radio communication with an external apparatus.

The control unit 20 further includes a radio communication interface 26, a network interface card (NIC) 27 and so forth. Thus, the control unit 20 can perform short-haul radio data communication like the Bluetooth or can perform data communication with various external host computers through a radio network like the IEEE 802.11b or a wide area network such as the Internet.

Through such data communication between the robot apparatus 1 and a host computer, it is possible to arithmetically operate complicated motion control of the robot apparatus 1 or remotely control the robot apparatus 1 using a remote computer resource.

B. Behavior Control System of the Robot Apparatus

Figure 3:
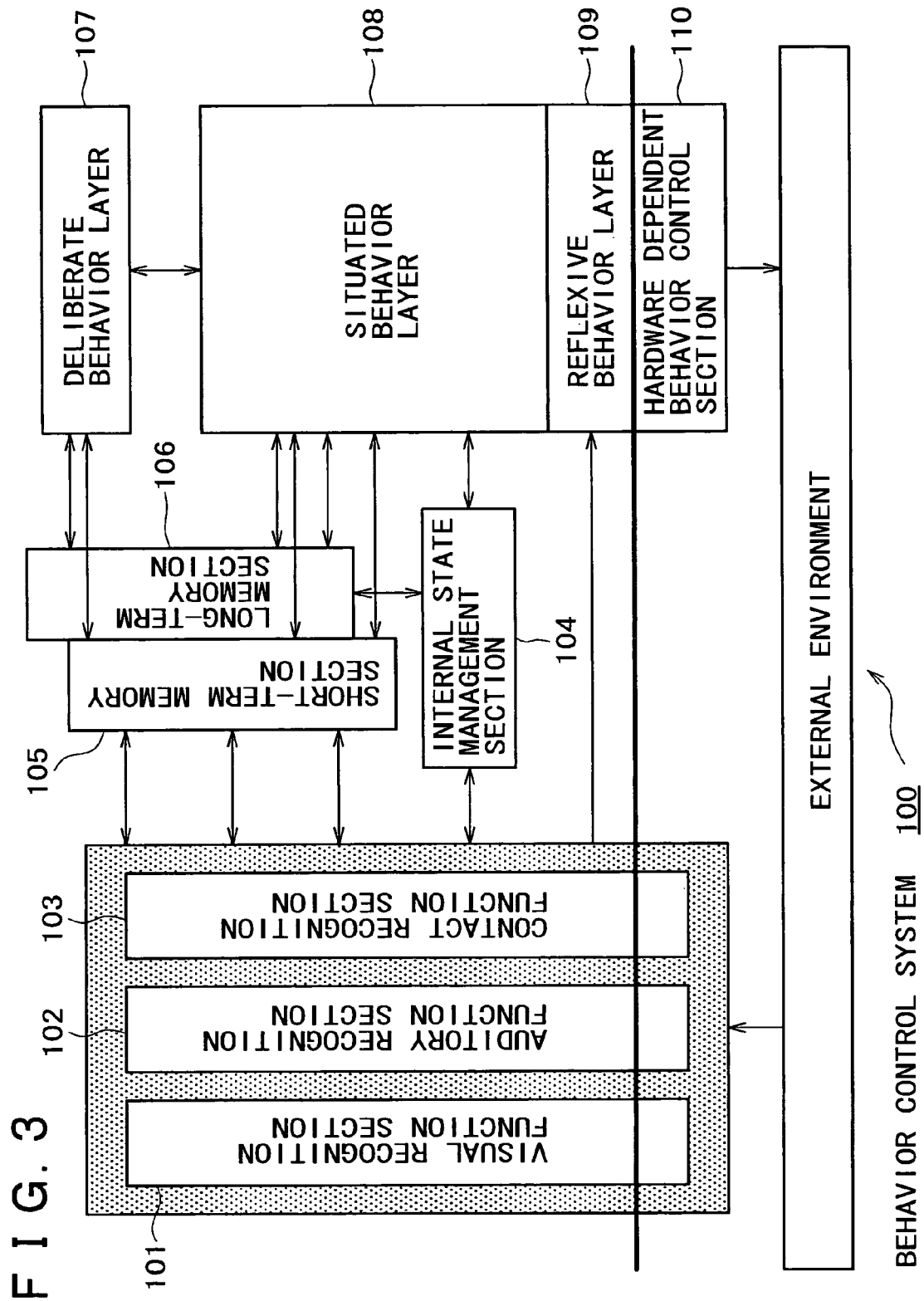
FIG. 3 is a diagrammatic view schematically showing a functional configuration of a behavior control system 100 of the robot apparatus 1 according to the embodiment of the present invention.

FIG. 3 schematically shows a functional configuration of a behavior control system 100 of the robot apparatus 1 according to the embodiment of the present invention. The robot apparatus 1 can perform behavior control in response to a result of recognition of an external stimulus or a variation of an internal state. Further, the robot apparatus 1 includes a long-term memory function and can perform behavior control in response to a result of recognition of an external stimulus or a variation of an internal state by associatively storing variations of an internal state from external stimuli.

The behavior control system 100 shown in the figure can fetch and mount object-oriented programming. In this instance, each piece of software is handled in a unit of a module called "object" which includes data and a processing procedure for the data integrated with each other. Each object can perform delivery and Invoke of data by an inter-object communication method that uses message communication and a common memory.

The behavior control system 100 includes a visual recognition function section 101, an auditory recognition function section 102 and a contact recognition function section 103 in order to recognize an external environment (Environments).

The visual recognition function section (Video) 51 performs an image recognition process such as face recognition or color recognition and characteristic extraction based on a picked up image inputted through an image input apparatus such as, for example, a CCD (Charge Coupled Device) camera. The visual recognition function section 51 is formed from a plurality of objects such as "MultiColorTracker", "FaceDetector" and "FaceIdentify" hereinafter described.

The auditory recognition function section (Audio) 52 recognizes speech data inputted through a sound input apparatus such as a microphone to extract a characteristic or perform word set (text) recognition. The auditory recognition function section 52 is formed from a plurality of objects such as "AudioRecog" and "AuthurDecoder" hereinafter described.

The contact recognition function section (Tactile) 53 recognizes a sensor signal from a contact sensor built in, for example, the head part of the machine body to recognize an external stimulus such as "stroked" or "tapped".

An internal state management section (ISM: Internal Status Manager) 104 manages several emotions such as instincts and feelings as formula models. The internal state management section 104 manages internal states such as instincts and feelings of the robot apparatus 1 in response to an external stimulus (ES: ExternalStimula) recognized by the visual recognition function section 51, auditory recognition function section 52 and contact recognition function section 53 described above.

Each of feeling models and instinct models individually has a recognition result and a behavior history as inputs thereto and manages a feeling value and an instinct value, respectively. A behavior model can refer to the feeling value and the instinct value.

In the present embodiment, an emotion is formed from a plurality of layers according to existence significance thereof and operates in the individual layers. Which one of a plurality of determined motions should be performed is determined depending upon an external environment or an internal state at the time (hereinafter described). Further, although a behavior is selected in each layer, by developing a motion preferentially beginning with a lower order motion, an instinctive behavior such as a reflexive behavior or a higher order behavior such as motion selection wherein memory is used can be developed without contradiction on a single individual.

The robot apparatus 1 according to the present embodiment includes a short-term memory section 105 and a long-term memory section 106 in order to perform behavior control in response to a recognition result of an external stimulus or a variation of an internal state. The short-term memory section 105 is used for short-term memory that is lost as time passes, and the long-term memory section 106 is used for comparatively long-term memory of information. The classification of the memory mechanism into the short-term memory and the long-term memory relies upon the neuropsychology.

The short-term memory section (ShortTermMemory) 105 is a function module for retaining a target or an event recognized from an external environment by the visual recognition function section 101, auditory recognition function section 102 or contact recognition function section 103 described above for a short period of time. For example, the short-term memory section 105 stores an input image from the CCD camera 15 for a short period of time of approximately 15 seconds.

The long-term memory section (LongTermMemory) 106 is used to retain information obtained by learning such as the name of an article for a long period of time. The long-term memory section 106 can associatively store a variation of an internal state from an external stimulus, for example, in a certain behavior module.

Behavior control of the robot apparatus 1 according to the present embodiment is roughly divided into a "reflexive behavior" implemented by a reflexive behavior section 109, a "situated behavior" implemented by a situated behavior layer 108 and a "deliberate behavior" implemented by a deliberate behavior layer 107.

The reflexive behavior section (ReflexiveSituatedBehaviorsLayer) 109 is a functional module which implements a reflexive machine body motion in response to an external stimulus recognized by the visual recognition function section 101, auditory recognition function section 102 or contact recognition function section 103 described above.

The reflexive behavior signifies a behavior of directly receiving recognition results of external information inputted from the sensors, classifying them and directly determining an output behavior. For example, such a behavior as to track the face of a human being or nod is preferably mounted as a reflexive behavior.

The situated behavior layer (SituatedBehaviorsLayer) 108 controls a behavior in conformity with a situation in which the robot apparatus 1 is currently placed based on storage contents of the short-term memory section 105 and the long-term memory section 106 and an internal state managed by the internal state management section 104.

The situated behavior layer 108 prepares a state machine (or state transition model) for each behavior, and classifies recognition results of external information inputted from the sensors depending upon a preceding behavior or situation to develop a behavior on the machine body. Further, the situated behavior layer 108 implements a behavior (also called "homeostasis behavior") for keeping an internal state within a certain range. If the internal state exceeds the designated range, the situated behavior layer 108 activates a behavior for returning the internal state into the range so that the behavior may be developed readily (actually, a behavior is selected taking both of the internal state and the external environment into consideration). The situated behavior is slower in response time when compared with the reflexive behavior.

The deliberate behavior layer (DeliberativeLayer) 107 performs a behavior plan and so forth of the robot apparatus 1 for a comparatively long period of time based on stored contents of the short-term memory section 105 and the long-term memory section 106.

A deliberate behavior signifies a behavior performed under an inference or a plan prepared to realize the inference in accordance with a given situation or an instruction from a human being. For example, to search for a route from the position of the robot and a target position corresponds to a deliberate behavior. Such an inference or plan as just mentioned may possibly require longer processing time or a higher calculation load than reaction time performed for keeping an interaction by the robot apparatus 1. Therefore, the deliberate behavior performs an inference or a plan while the reflexive behavior or the situated behavior described above returns a reaction on the real time basis.

The deliberate behavior layer 107, situated behavior layer 108 and reflexive behavior section 109 can be described as higher layer application programs which do not rely upon the hardware configuration of the robot apparatus 1. In contrast, a hardware dependent behavior control section (ConfigurationDependentActionsAndReactions) 110 directly operates the hardware (external environment) of the machine body such as driving of a joint actuator in accordance with an instruction from a higher order application (a behavior module called "schema").

C. Memory Mechanism of the Robot Apparatus

While the robot apparatus 1 according to the present embodiment includes the short-term memory section 105 and the long-term memory section 106 as described above, such memory mechanisms as just mentioned rely upon the neuropsychology.

The short-term memory literally signifies memory for a short period of time and is lost as time passes. The short-term memory can be used to retain a target or an event recognized from an external environment through, for example, a visual sense, an auditory sense or a contact for a short period of time.

The short-term storage can be further classified into "sense memory", "direct memory" and "work memory". The "sense memory" retains sense information (that is, an output from a sensor) as a signal of an original form for approximately 1 second. The "direct memory" stores the sense memory for a short period of time in a capacity obtained by encoding the sense memory. The "work memory" stores a variation of situation or a context for several hours. According to a neuropsychologic research, it is said that the direct memory involves 7±2 chunks. Meanwhile, the work memory is called also "intermediate memory" in contrast to the short-term memory and the long-term memory.

The long-term memory is used to retain information obtained by learning such as the name of an article for a long period of time. The long-term storage can statistically process the same pattern to make robust memory.

The long-term memory is further classified into "declarative knowledge memory" and "procedural knowledge memory". The declarative knowledge memory includes "episode memory" which is memory relating to a scene (for example, a scene upon learning) and "significance memory" which is memory such as a significance of a word or common sense. Meanwhile, the procedural knowledge memory is procedural memory regarding how the declarative knowledge memory should be used and can be used to acquire a motion corresponding to an input pattern.

C-1. Short-Term Memory Section

The short-term memory section 105 is a function module that represents and stores an article presenting around the robot apparatus 1 itself or an event and causes the robot to behave based on the stored article or event. The short-term memory section 105 places articles and events on a self-centered coordinate system based on sensor information from the visual, auditory and other sensors, and can store an article outside the field of view so as to generate a behavior to the article or the like.

For example, when the robot is called by another user B during conversation with a certain user A, a short-term memory function is required in order to resume the conversation with the user A after it speaks with the user B while storing the position of the user A or contents of the conversation. However, integration by a very complicated process is not performed, but such simple integration based on closeness in the space and the time that pieces of sensor information that are spatially and temporally close to each other are regarded as signals from the same article.

Further, in order to store the position of an article other than an article which can be discriminated by pattern recognition using a technique such as a stereo visual sense technique, the short-term memory section 105 places the article on a self-centered coordinate system. Further, the technique just mentioned can be utilized together with floor surface detection to stochastically store the position of an obstacle or the like.

In the present embodiment, the short-term memory section 105 integrates external stimuli including results of a plurality of recognizers such as the visual recognition function section 101, auditory recognition function section 102 and contact recognition function section 103 described above so that they may maintain a temporal and spatial consistency. Thus, the short-term memory section 105 provides perceptions regarding individual articles under the external environment as short-term memory to a behavior control module such as the situated behavior layer (SBL) 108.

Accordingly, the behavior control module side formed as a higher order module can handle a plurality of recognition results from the external world as integrated significant symbol information to perform a high degree of behavior control.

Further, the behavior control module can make use of more complicated recognition results such as a problem of correspondence to recognition results observed prior to solve such a problem of which skin color region represents the face and to which person the face corresponds or whose voice the voice is.

Further, since the short-term memory section 55 stores information regarding recognized observation results as memory, it is possible to use a higher order module such as an application which performs behavior control of the machine body so that, even if an observation result is not available temporarily during a period wherein the robot behaves autonomously, it looks to the robot that an article is normally sensed there. For example, since also information outside the visual fields of the sensors is kept stored without being forgotten, even if the robot loses sight of the article once, it can search out it later. As a result, a stabilized system that is tough against an error of a recognizer or noise to a sensor and does not rely upon the timing of notification of a recognizer can be implemented. Further, even if information is insufficient as viewed from an individual recognizer, since it may sometimes be compensated for by another recognition result, the recognition performance as an entire system is augmented.

Further, since relating recognition results are coupled to each other, it is possible for a higher order module of an application or the like to use the relating information to determine a behavior. For example, when the robot apparatus is called out, it can extract the name of the person based on the voice of the call. As a result, the robot apparatus can make a reaction such as to make a reply like "Hello, XXX!" to a greeting.

Figure 4:
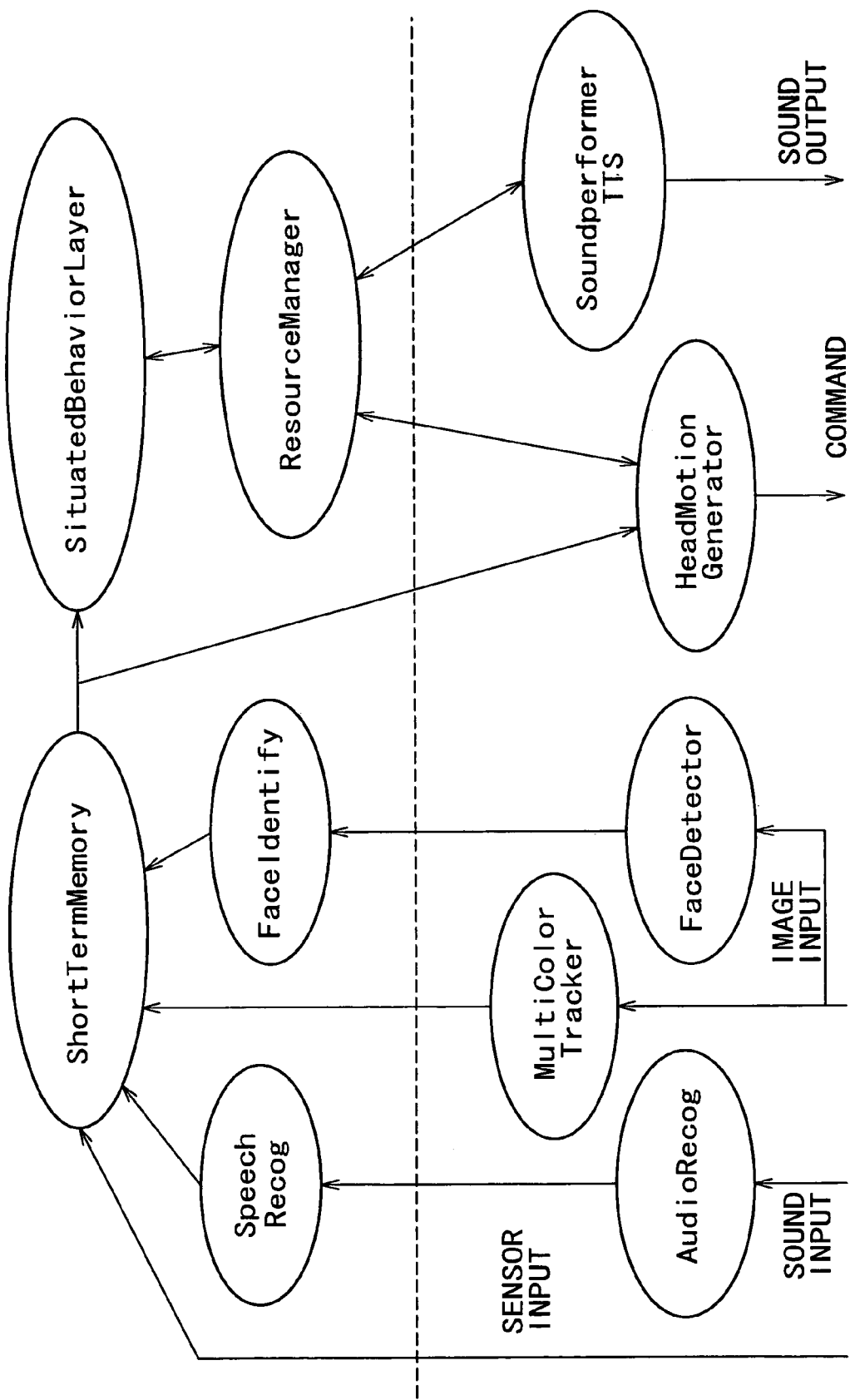
FIG. 4 is a diagrammatic view illustrating flows of motions by various objects which compose the behavior control system 100 shown in FIG. 3.

FIG. 4 illustrates a mechanism of situated behavior control of the behavior control system 100 shown in FIG. 3 responsive to an external stimulus. An external stimulus is fetched into the system by the function modules 101 to 103 of the recognition systems and supplied to the situated behavior layer (SBL) 108 through the short-term memory section (STM) 105. As seen in FIG. 4, the function modules 101 to 103 of the recognition systems, the short-term memory section (STM) 105 and the situated behavior layer (SBL) 108 are each formed as an object.

Referring to FIG. 4, an entity called "object" or "process" is represented by a circle. The entire system operates as the objects asynchronously communicate with each other. Each object performs delivery and Invoke of data by an inter-object communication method in which message communication and a common memory are used. In the following, functions of the objects are described.

AudioRecog:

This is an object that receives voice data from a sound input apparatus such as a microphone and performs characteristic extraction and voice interval detection. Further, where the microphone is a stereo microphone, sound source direction estimation in a horizontal direction can be performed. If a voice interval is discriminated, then a characteristic amount of the voice data and the sound source direction within the interval are sent to an ArtherDecoder (hereinafter described).

SpeechRecog:

This is an object that performs speech recognition using a speech characteristic amount received from the AudioRecog, and a speech dictionary and a syntax dictionary. A set of recognized words is sent to the short-term memory section (ShortTermMemory) 105.

MultiColorTracker:

This is an object that performs color recognition, and receives image data from an image input apparatus such as a camera, extracts a color region based on a plurality of color models stored in advance therein and divides it into continuous regions. Information of the position, size, and characteristic amount and so forth of each of the regions obtained by the division is outputted and sent to the short-term memory section (ShortTermMemory) 105.

FaceDetector:

This is an object that detects a region of the face from within an image frame, and receives image data from an image input apparatus such as a camera and converts it into scale images of nine-level scales. The object searches all of the images for a rectangular region that corresponds to the face. The object decreases such overlapping candidate regions to finally discriminate a region as the face, and outputs and sends information of the position, size, characteristic amount and so forth regarding the region to FaceIdentify (described below).

FaceIdentify:

This is an object that identifies a detected face image, and receives a rectangular region image representative of a region of the face from the FaceDetector. Then, the object compares the face image with contents of a person dictionary on hand to detect to which person in the person dictionary the face image corresponds to discriminate the person. In this instance, the object receives a face image from the face detection and outputs ID information of the person together with the position and size information of the face image region.

ShortTermMemory (Short-Term Memory Section):

This is an object which retains information regarding external environments of the robot 1 for a comparatively short period of time. The object receives speech recognition results (words, a sound source direction, and a confidence factor) from the SpeechRecog and receives the position and the size of a skin color region and the position and the size of a face region from the MultiColorTracker. Further, the object receives ID information and so forth of a person from the FaceIdentify. Furthermore, the object receives the direction (joint angle) of the neck of the robot from several sensors on the machine body of the robot 1. Then, the object integrally uses such recognition results and sensor outputs to store information that which person is at which place and from which person spoken words originate and besides what dialog has been performed with the person. The object passes such physical information regarding an article, that is, a target and events (history) as viewed in the direction of time as an output therefrom to a higher order module such as the situated behavior layer (SBL).

SituatedBehaviorLayer (Situated Behavior Layer):

This is an object which determines a behavior (behavior depending upon a situation) of the robot 1 based on information from the ShortTermMemory (short-term storage section) described hereinabove. The object can evaluate or execute a plurality of behaviors at the same time. Further, the object can change over the behavior to place the machine body into a sleep state and activate another behavior.

ResourceManager:

This is an object that performs resource arbitration between pieces of hardware of the robot 1 in response to an outputting command. In the example of FIG. 4, the object performs resource arbitration between an object that controls a speaker for outputting sound and another object for controlling the motion of the neck.

SoundPerformerTTS:

This is an object for outputting sound. The object performs speech synthesis in response to a text command given thereto from the SituatedBehaviorLayer through the ResourceManager and outputs sound from the speaker on the machine body of the robot 1.

HeadMotionGenerator:

This is an object which calculates a joint angle of the neck in response to reception of a command for moving the neck from the SituatedBehaviorLayer through the ResourceManager. If a command of "tracking" is received, then the object calculates a joint angle of the neck directed to a direction in which an article exists based on position information of the article received from the ShortTermMemory.

The short-term memory section 105 is formed from two different memory objects of a target memory and an event memory.

The target memory integrates information from the recognition function modules 101 to 103 and retains information regarding an article being currently perceived, that is, a target. Therefore, when an object article disappears or appears, the object deletes the pertaining target from a storage region (GarbageCollector) or newly generates a pertaining target. Further, the object can represent one target with a plurality of recognition attributes (TargetAssociate). For example, a target may be represented as an article (the face of a human being) which has a skin color, has a pattern of a face and emits voice.

Position or posture information of an article (target) stored in the target memory is represented not on a sensor coordinate system which is used in each of the recognition function sections 51 to 53 but on a world coordinate system wherein a particular location on the machine body such as the trunk of the robot 1 is fixed to a predetermined place. Therefore, the short-term memory section (STM) 105 supervises the current value (sensor output) of each of the joints of the robot 1 at all times and performs conversion from a sensor coordinate system into the fixed coordinate system. Consequently, information from the recognition function modules 101 to 103 can be integrated with each other. For example, even if the robot 100 moves the neck or some other part to change the posture of a sensor, the position of an article as viewed from a behavior control module such as the situated behavior layer (SBL) remains identical. Therefore, handling of a target is facilitated.

Meanwhile, the event memory is an object which stores events from the past to the present having occurred under an external environment in a time series relationship. The events handled in the event memory may be appearance and disappearance of a target, speech recognized words and information regarding a variation of a situation of the external world such as a behavior or a variation in posture of the robot itself.

The events include a state variation with regard to a certain target. Therefore, if an ID of a pertaining object is included in the event information, it is possible to search for more particular information regarding an occurring event from within the target memory described above.

Figure 5:
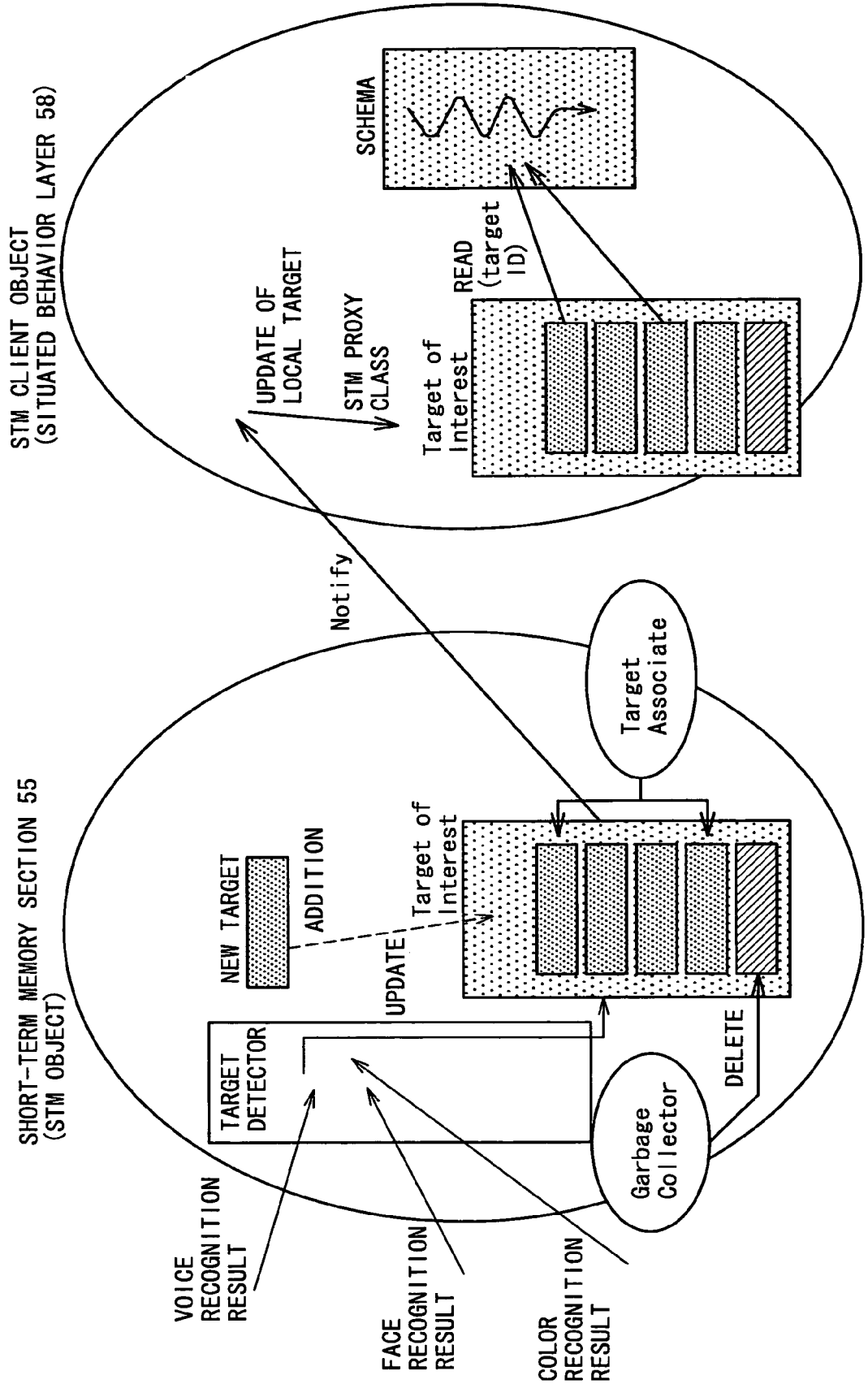
FIG. 5 is a diagrammatic view illustrating flows of information introduced into a target memory in a short-term memory section 105 based on results of recognition by recognition function modules 101 to 103.
Figure 6:
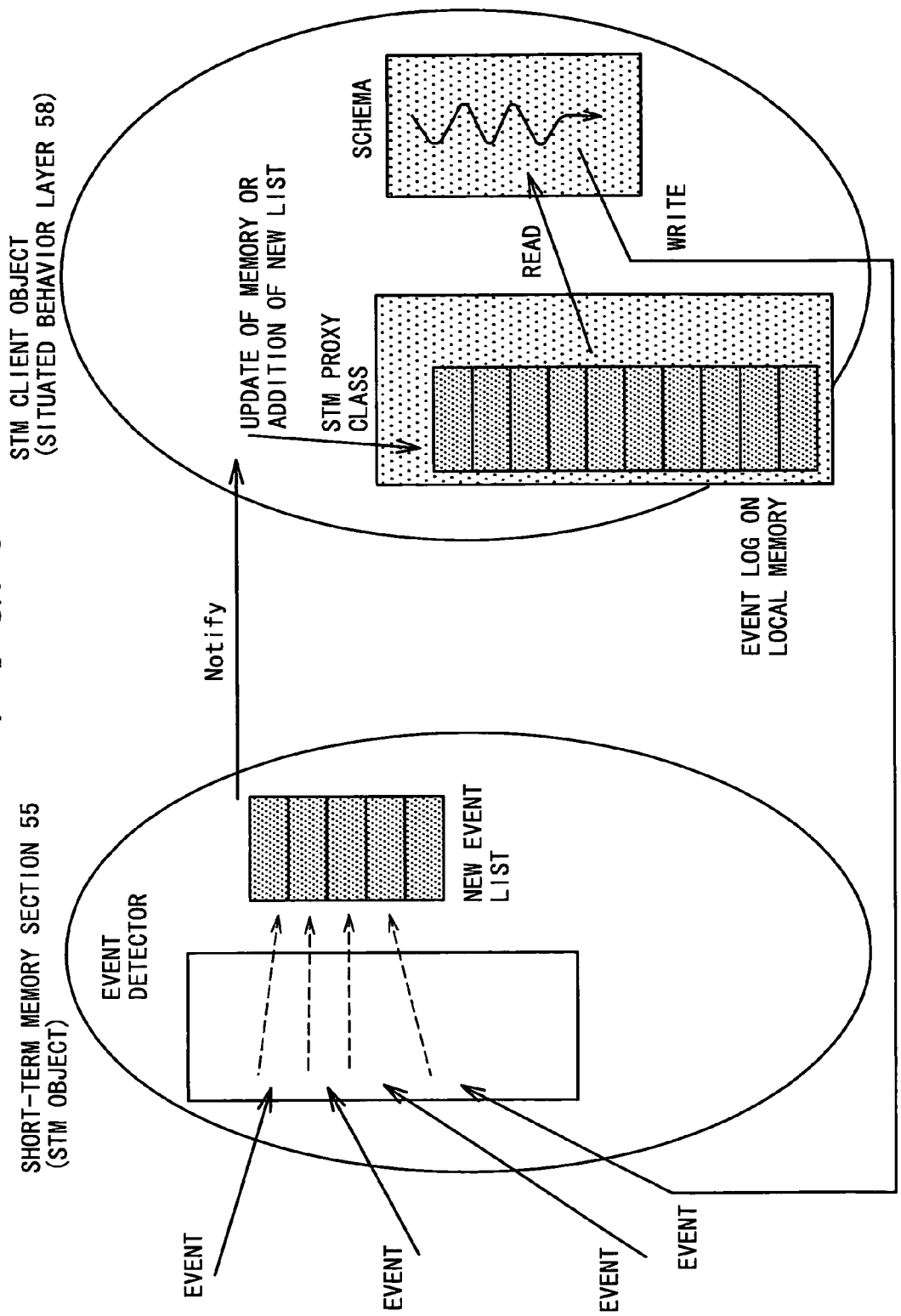
FIG. 6 is a diagrammatic view illustrating flows of information introduced into an event memory in the short-term memory section 105 based on results of recognition by the recognition function modules 101 to 103.

FIGS. 5 and 6 illustrate flows of information introduced into the target memory and the event memory in the short-term memory section 105 based on recognition results of the recognition function modules 101 to 103.

As seen in FIG. 5, a target detector for detecting a target from an external environment is provided in the short-term memory section 105 (STM object). The target detector adds, based on recognition results of the function modules 101 to 103 such as a voice recognition result, a face recognition result and a color recognition result, a new target or updates an existing target so that it may be reflected on the recognition results. A detected target is stored into the target memory.

The target memory further has a garbage collector (GarbageCollector) function of searching and erasing a target which is not observed any more, a target associate (TargetAssociate) function of discriminating relationships of a plurality of targets to couple them with the same target, and other necessary functions. The garbage collector is implemented by decrementing the confidence factors of targets as time passes and deleting (delete) that one of the targets whose confidence factor becomes lower than a predetermined value. Meanwhile, the target associate can identify the same target because targets that have characteristic amounts of the same attribute (recognition type) proximate to each other have spatial and temporal closeness to each other.

The situated behavior layer (SBL) described above is an object that becomes a client (STM client) of the short-term memory section 105 and periodically receives a notification (Notify) of information regarding each target from the target memory. In the present embodiment, an STM proxi class copies targets into a client-local work area independent of the short-term memory section 105 (STM object) so that the latest information may be retained at all times. Then, the situated behavior layer (SBL) reads out a desired target as an external stimulus from within a local target list (Target of Interest) to determine a schema, that is, a behavior module (hereinafter described).

Further, as seen in FIG. 6, an event detector for detecting an event that generates in an external environment is provided in the short-term memory section 105 (STM object). The event detector detects production of a target by the target detector or deletion of a target by the garbage collector as an event. Further, where the recognition results of the recognition function modules 101 to 103 are speech recognition, the occurring events are stored in the order of time of occurrence as an event list into the event memory.

The situated behavior layer (SBL) is an object that becomes a client (STM client) of the short-term memory section 105 and receives a notification (Notify) of an event every moment from the event memory. In the present embodiment, an STM proxi class copies the event list into a client-local work area independent of the short-term memory section 105 (STM object). Then, the situated behavior layer (SBL) reads out a desired event as an external stimulus from within the local event list and determines a schema, that is, a behavior module (hereinafter described). An executed behavior module is detected as a new event by the event detector. On the other hand, an old event is discarded successively, for example, in a FIFO (Fast In Fast Out) fashion from the event list.

According to the short-term memory mechanism according to the present embodiment, the robot 1 integrates results of a plurality of recognizers relating to an external stimulus so that they may temporally and spatially have a consistency thereby to handle them as significant symbol information. Consequently, the robot 1 can make use of more complicated recognition results such as a problem of correspondence to recognition results observed prior to solve such a problem of which skin color region represents the face and to which person the face corresponds or whose voice the voice is.

In the following, a dialog process between users A and B by the robot 1 is described with reference to FIGS. 7 to 9.

Referring first to FIG. 7, if the user A calls "Masahiro!" (name of the robot), then voice direction detection, speech recognition and face identification are performed by the recognition function sections 51 to 53, respectively, and such a situated behavior as to turn to the calling direction and track the face of the user A or start dialog with the user A is performed.

Figure 8:
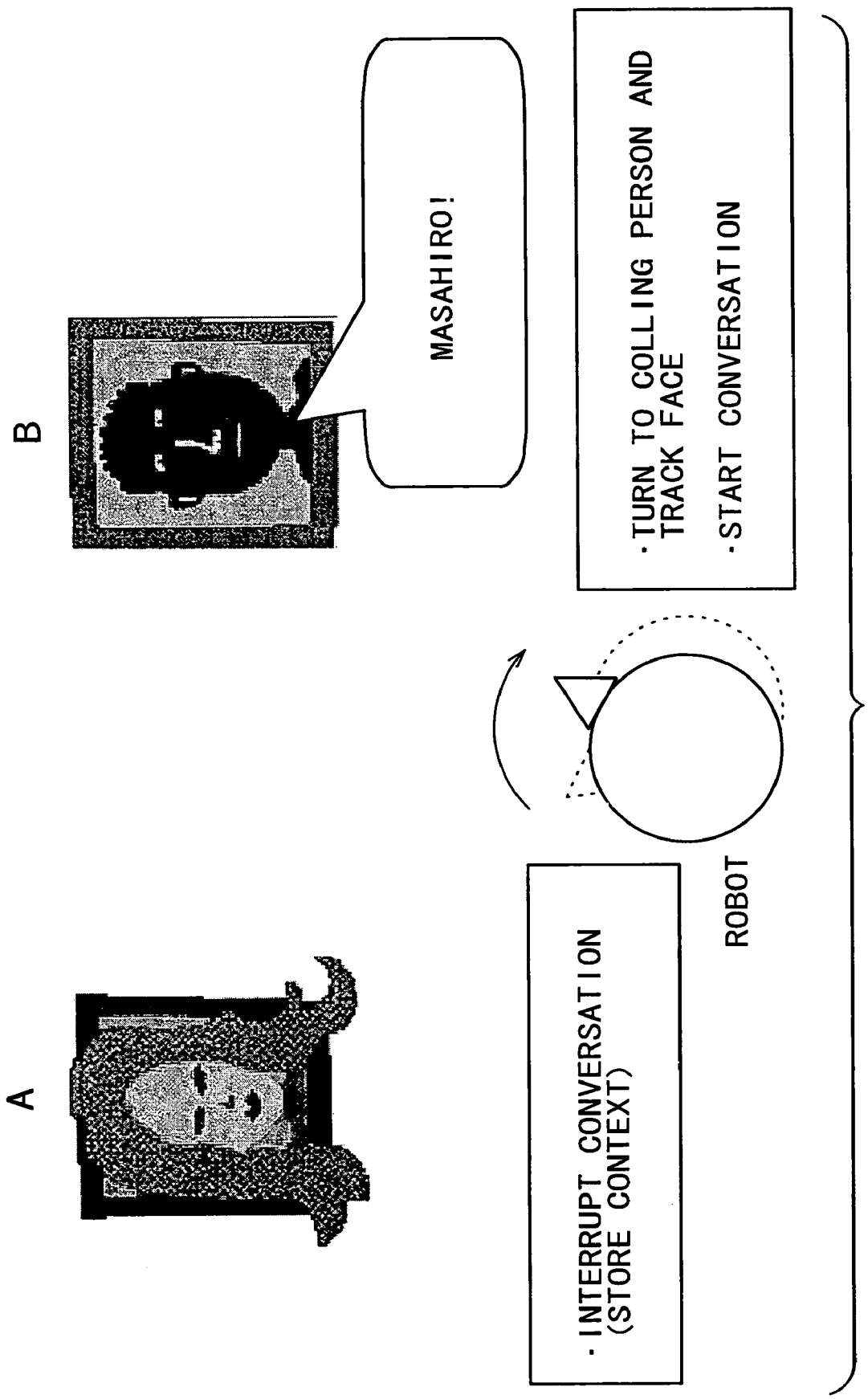
FIG. 8 is a schematic view illustrating another dialog process between users A and B by the robot 1.

Then, if the user B now calls "Masahiro!" (name of the robot) as seen in FIG. 8, then voice direction detection, speech recognition and face identification are performed by the recognition function sections 101 to 103, respectively. Then, such a situated behavior as to interrupt the dialog with the user A (but store the context of the conversation) and turn to the calling direction and then track the face of the user B or start dialog with the user B is performed. This is a Preemption function (hereinafter described) the situated behavior layer 108 has.

Figure 9:
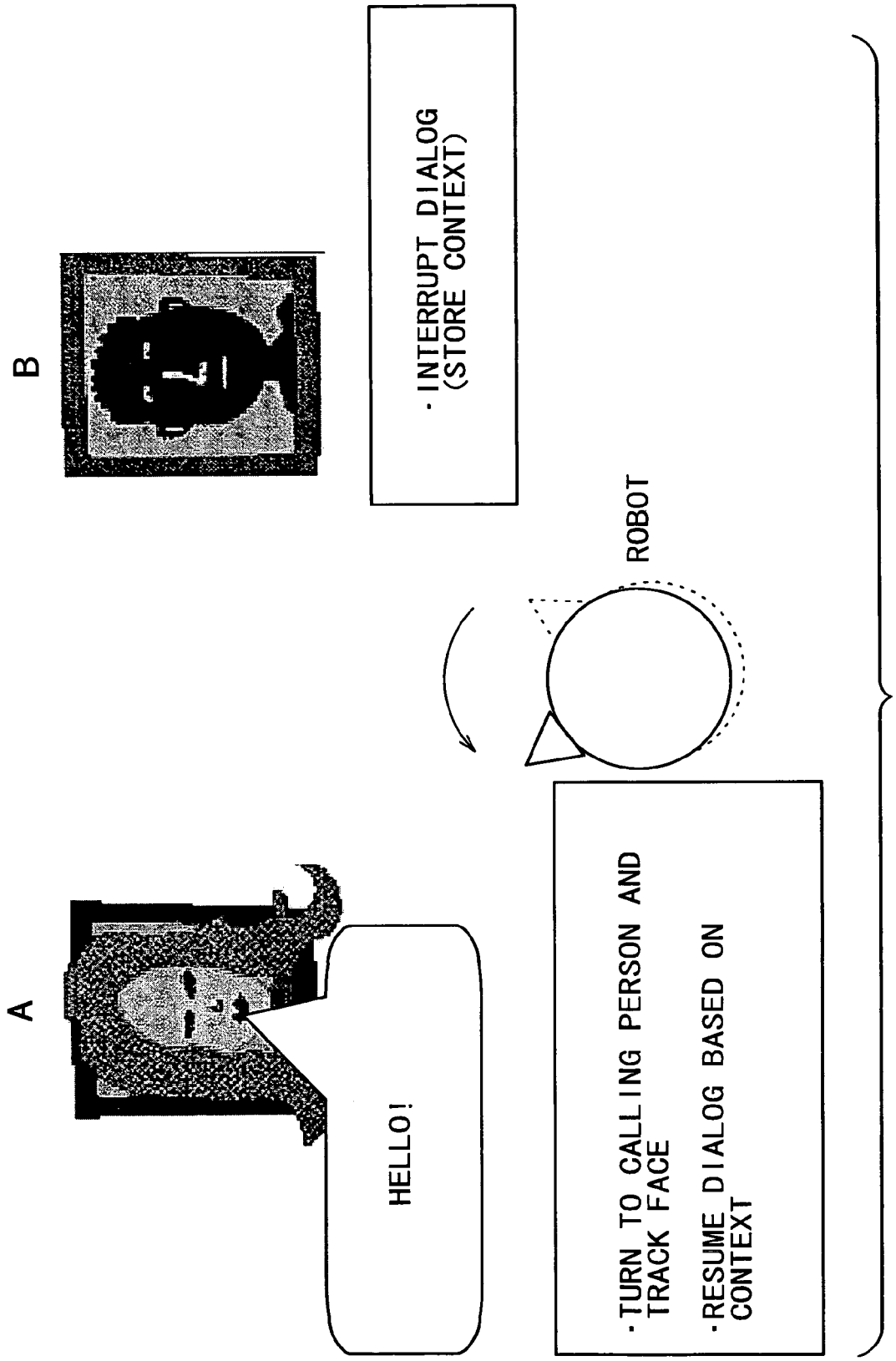
FIG. 9 is a schematic view illustrating a further dialog process between users A and B by the robot 1.

Then, if the user A utters "Hallo!" to urge the robot 1 to continue the conversation as seen in FIG. 9, such a situated behavior as to now interrupt the dialog with the user B (but store the context of the conversation) and turn to the calling direction and then track the face of the user A or resume the dialog with the user A based on the stored context is performed. At this time, thanks to a Reentrant function (hereinafter described) the situated behavior layer 108 has, the contents of the dialog with the user B are not destroyed by the dialog with the user A, and the dialog can be resumed accurately from the interrupted point.

C-2. Long-Term Memory Section

The long-term memory is used to retain information obtained by learning such as the name of an article for a long period of time. The long-term memory can statistically process the same patterns to make robust memory.

The long-term memory is further classified into "declarative knowledge memory" and "procedural knowledge memory". The declarative knowledge memory includes "episode memory" which relates to a scheme (for example, a scene upon learning) and "significance memory" which may include significance of words and common sense. Meanwhile, the procedural knowledge memory is such procedural memory as how to use the declarative knowledge memory and can be used to acquire a motion to an input pattern.

The episode memory is a kind of declarative knowledge memory (also called statement memory) from within the long-term memory. For example, if riding on a bicycle is considered, it corresponds to the episode memory that a scene (time, place and so forth) wherein a person rode on a bicycle for the first time is remembered. Thereafter, as time passes, the memory regarding the episode becomes faded. However, memory of significance of the episode is the significance memory. Further, a procedure in a manner of riding on a bicycle is memorized, and this corresponds to the procedural knowledge memory. Generally, time is required for memory of procedural knowledge. While it is possible to "say" depending upon the declarative knowledge memory, the procedural knowledge memory is potential and appears as execution of a motion.

The long-term memory section 106 in the present embodiment is formed from associative memory of storing sensor information regarding articles such as visual information and auditory information and a result of a variation of an internal state and so forth as a result of a behavior performed for the articles, frame memory regarding one of the articles, and such a rule as map information constructed from a surrounding sight, map information given as data or an originating situation, a behavior to the same and a result of the behavior.

C-2-1. Associative Memory

The associative memory signifies a mechanism of storing input patterns each formed from a plurality of symbols as memory patterns in advance and recalling a pattern similar to one of the stored patterns. The associative memory in the present embodiment is implemented by a model that uses a competition type neural network. According to such an associative memory mechanism as just described, when a pattern having some defect is inputted, the closest memory pattern among the stored patterns can be outputted. This is because, even when only an external stimulus formed from incomplete data is supplied, significance of a certain object and so forth can be recalled by firing of a pertaining neuron or neurons.

The associative memory is roughly classified into "self-recalling type associative memory" and "mutual-recalling type associative memory". The self-recalling type is a model that extracts a stored pattern directly with a key pattern. Meanwhile, the mutual-recalling type is a model wherein an input pattern and an output pattern are coupled in a certain association relationship with each other. In the present embodiment, the self-recalling type associative memory is adopted. This is because it has advantages over conventional hop field or associatron (described hereinabove) memory models in that additional learning is easy and statistic memory of input patterns is possible.

According to the additional learning, even if a new pattern is learned newly, the memory in the past is not erased by overwriting at all. Further, according to the statistic learning, if the same thing is observed by a great number of times, then it remains in the memory as much, and if the same thing is executed repetitively, then it becomes less likely to be forgotten. In this instance, even if a complete pattern is not inputted every time in the memory process, the stored pattern gradually converges to a pattern presented by a comparatively great number of times through repetitive execution.

C-2-2. Significance Memory by the Associative Memory

A pattern to be remembered by the robot 1 is formed from, for example, a combination of an external stimulus to the robot 1 and an internal state of the robot 1.

Here, the external stimulus is perception information obtained by recognition of sensor input by the robot 1 and is, for example, color information, shape information, face information and so forth obtained by processing of an image inputted from the CCD camera 15. More particularly, the external stimulus is formed from such components as a color, a shape, a face, a 3D general article, a hand gesture, a motion, voice, contact, a smell and a taste.

Meanwhile, the internal state signifies an emotion such as, for example, an instinct or a feeling based on the body of the robot. An instinctive factor is, for example, at least one of fatigue, temperature, pain, appetite or hunger, thirst, affection, curiosity, elimination and sexuality (sexual). Meanwhile, an emotional factor is at least one of happiness, sadness, anger, surprise, disgust, fear, frustration, boredom, somnolence, gregariousness, patience, tense, relaxed, alertness, guilt, spite, loyalty, submission and jealousy.

In the associative memory mechanism to which the competition type neural network according to the present embodiment is applied, an input channel is allocated to each of the factors that form an external stimulus or an internal state. Further, each of the perception function modules such as the visual recognition function section 101 and the auditory recognition function section 102 does not send a raw signal which is a sensor output, but symbolizes a result of recognition of a sensor output and sends ID information corresponding to the symbol (such as, for example, a color prototype ID, a shape prototype ID, a voice prototype ID and so forth) to the pertaining channel.

For example, each object segmented by a color segmentation module inputted together with a color prototype ID added thereto to the associative memory system. Further, an ID of an article recognized by the article recognition module is inputted to the associative system. Furthermore, a prototype of a word originating from utterance of a user is inputted from the sound recognition module. At this time, since also a phoneme sequence of the utterance is inputted, the robot apparatus 1 can utter through memory and association processes. Further, as regards the instinct, an analog value can be handled (hereinafter described), and if, for example, a delta value of the instinct is stored as 80, then the analog value of 80 can be obtained through association.

Accordingly, the associative memory system according to the present embodiment can store an external stimulus such as a color, a shape, voice or the like or an internal state as an input pattern formed from a combination of IDs symbolized for each channel. In other words, the associative memory system stores a combination of

[color ID, shape ID, face ID, voice ID, . . . , instinct ID (value), emotion ID]

Figure 10:
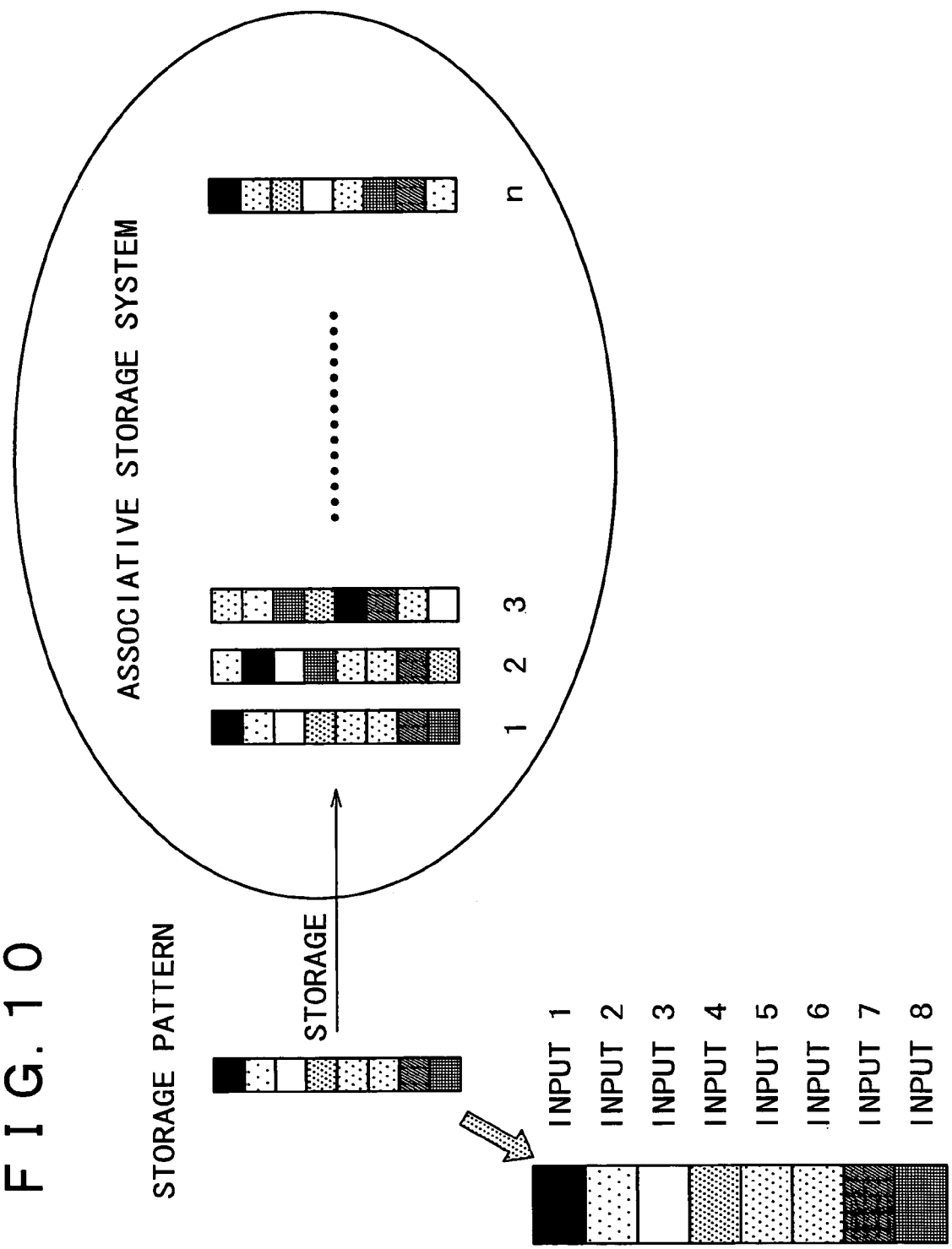
FIG. 10 is a diagrammatic view illustrating a concept of a storage process of associative memory according to the embodiment of the present invention.

The associative memory includes a storage process and a recall process. FIG. 10 illustrates a concept of the storage process of the associative memory.

A storage pattern inputted to the associative memory system is formed from a plurality of channels (in the example shown, from eight channels from input 1 to input 8) allocated to each factor of the external stimuli and the internal states. To each channel, ID information which symbolizes a recognition result of a corresponding external stimulus or a corresponding internal state is sent. It is assumed that, in the example shown, the density at each channel represents ID information. For example, where the kth column in the storage pattern is allocated to the channel of the face, a prototype ID of the face is represented by the color thereof.

In the example of FIG. 10, it is assumed that the associative storage system has totaling n storage patterns 1 to n stored therein already. Here, a difference in color of a corresponding channel between two storage patterns signifies that the symbol of an external stimulus or an internal state stored on the same channel, that is, an ID, is different between the two storage patterns.

Figure 11:
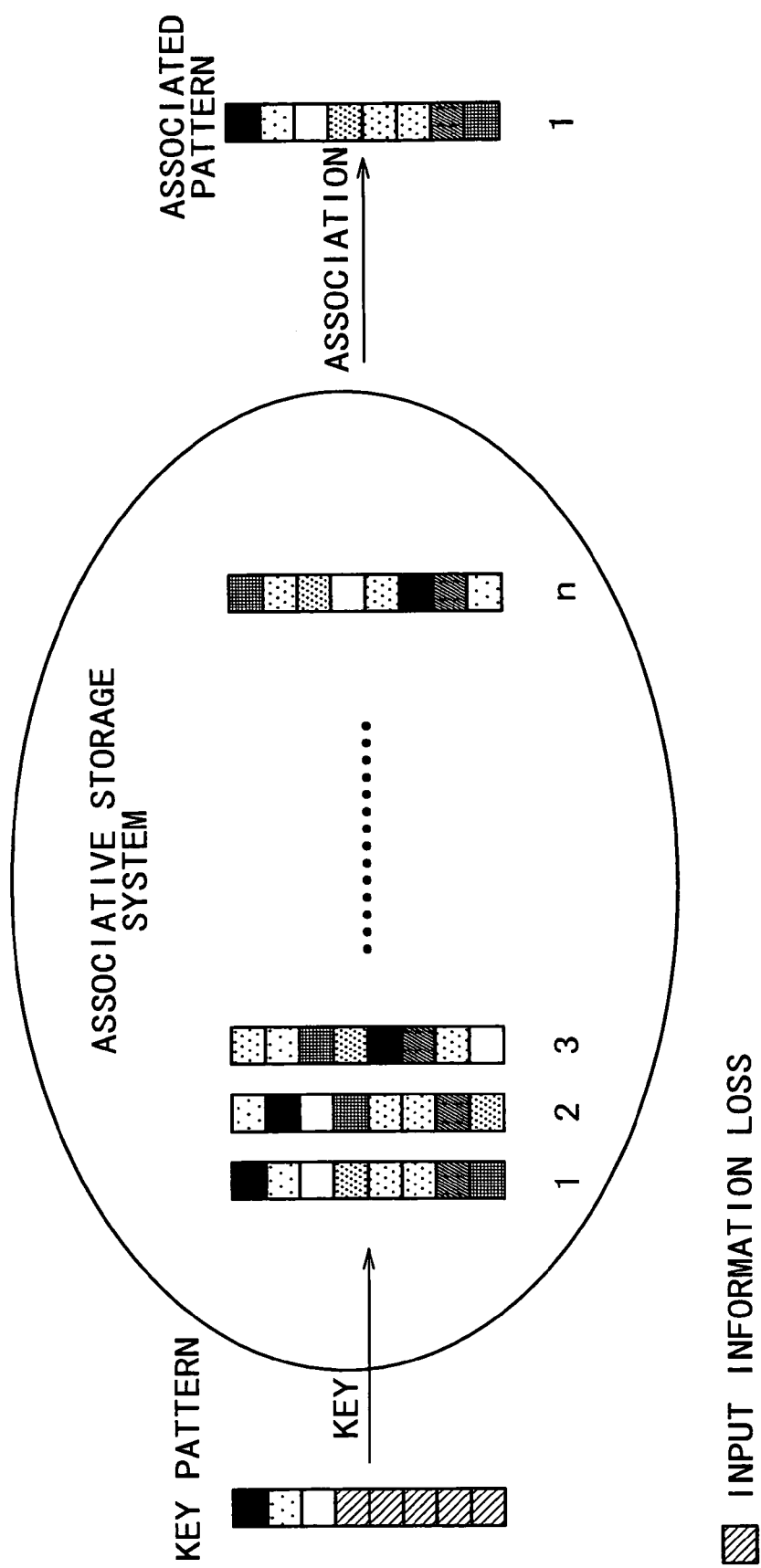
FIG. 11 is a diagrammatic view illustrating a concept of a recall process of associative memory according to the embodiment of the present invention.

Meanwhile, FIG. 11 illustrates a concept of the recall process of the associative memory. As described hereinabove, if a pattern similar to one of input patterns stored in the memory process is inputted, then a complete storage pattern is outputted so as to complement missing information.

In the example shown in FIG. 11, a pattern wherein an ID is given only for the 3 high order channels while the pattern is formed from 8 channels is inputted as a key pattern. In such an instance, the associative memory system can find out, among the storage patterns stored already, a pattern whose 3 high order channels is closest to those of the key pattern (in the example shown in FIG. 11, the storage pattern 1) and output the found out pattern as a recalled pattern. In other words, the closest storage pattern is outputted so as to complement the missing information of the channels 4 to 8.

Accordingly, according to the associative memory system, it is possible to recall a voice ID, that is, the name, only from an ID of the face or recall "delicious" or "not delicious" only from the name of food. According to the long-term memory architecture according to the competition type neural network, significance memory regarding a significance of a word or common sense can be realized with an engineering model same as that of the other long-term memory.

C-2. Associative Learning by the Competition Type Neural Network

Figure 12:
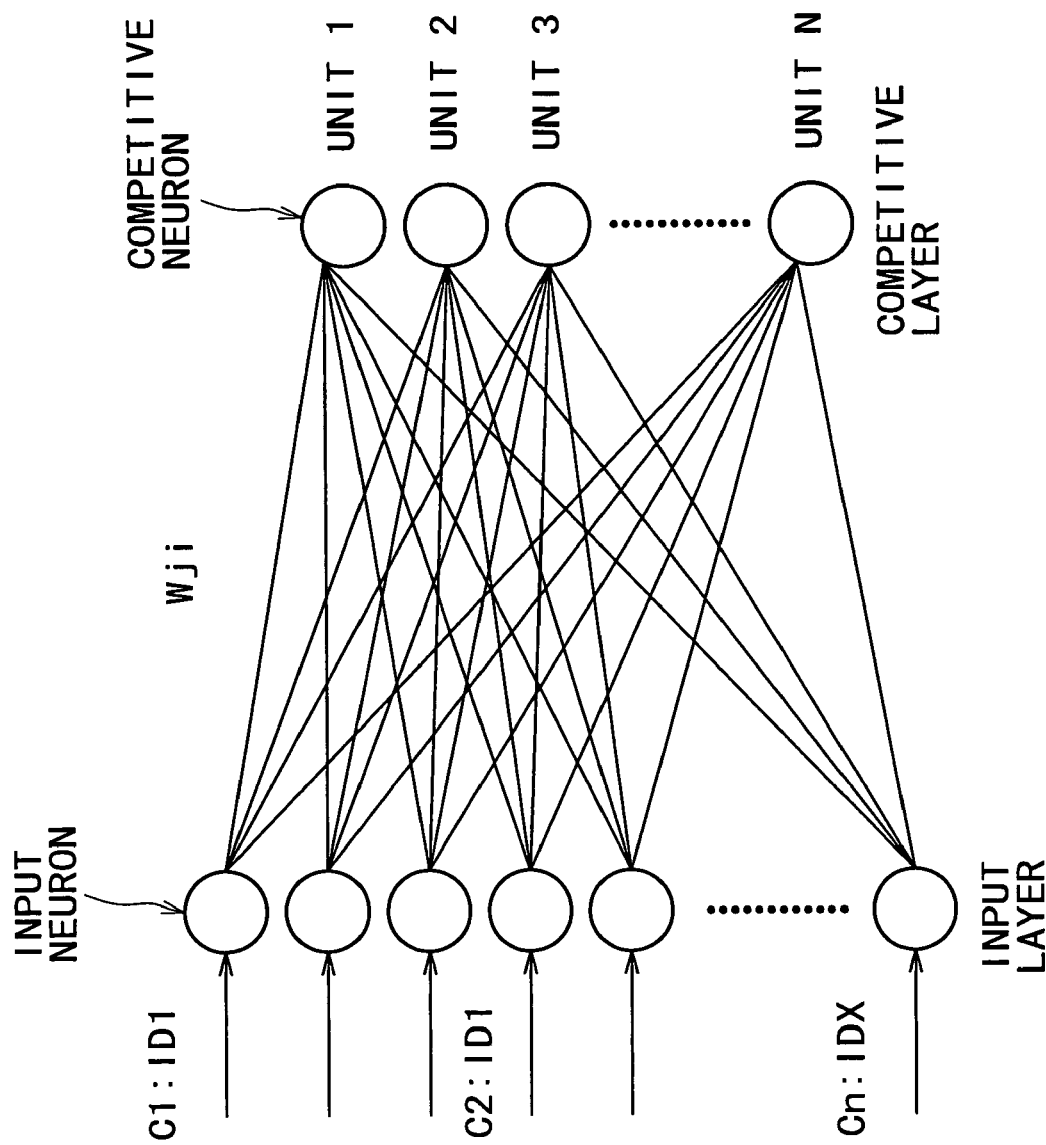
FIG. 12 is a diagrammatic view schematically illustrating an example of a configuration of an associative memory system to which a competitive type neural network.

FIG. 12 schematically shows an example of a configuration of the associative memory system to which the competition type neural network is applied. As seen in FIG. 12, the competition type neural network is a hierarchical type neural network including an input layer and a competitive layer.

The competition type neural network includes two different operation modes of a memory mode and a recall mode. In the memory mode, the competition type neural network competitively stores an input pattern. In the recall mode, the competition type neural network recalls a complete storage pattern from a partly missing input pattern.

The input layer is formed from a plurality of input neurons. Each input neuron receives, as an input thereto, a symbol corresponding to a recognition result of an external stimulus or an internal state, that is, ID information, from a channel allocated to each factor representative of the external stimulus or the internal state. For the input layer, it is necessary to prepare a number of neurons corresponding to the total number of the number of color IDs+number of shape IDs+number of voice IDs, number of kinds of instinct+ . . . .

Meanwhile, the competitive layer is formed from a plurality of competitive neurons. Each of the competitive neurons is coupled with certain coupling weights to the input neurons of the input layer side. Each of the competitive neurons corresponds to one symbol to be stored by the neuron. In other words, the total number of competitive neurons corresponds to the number of symbols that can be stored.

It is assumed that a certain input pattern is supplied to the input layer. At this time, the input pattern is formed from channels each representative of a factor of an external stimulus or an internal state, and any input neuron to which an ID is sent from a pertaining channel is fired.

Each of the competitive neurons receives outputs of the input neurons through weighting by synapses as inputs thereto and calculates a total value of the input values. Then, one of the competitive neurons which exhibit a maximum total value of the input values in the competitive layer is selected, and the coupling force between the selected victorious competitive neuron and the input neurons is strengthened to perform learning. Further, by selecting a victorious competitive neuron in the competitive layer with respect to a partly missing input pattern, a symbol corresponding to the input pattern can be recalled.

Memory Mode:

It is assumed that the coupling weights between the input layer and the competitive layer have a value ranging from 0 to 1. However, initial coupling weights are determined at random.

Storage in the competition type neural network is performed first by selecting a competitive neuron victorious in the competitive layer with respect to an input pattern to be stored and then by strengthening the coupling force between the competitive neuron and the input neurons.

Here, the input pattern vector $[x_1, x_2, \ldots, x_n]$ fires the neuron $x_1$ if the neuron corresponds to the prototype ID1 and the prototype ID1 is recognized, and further fires neurons corresponding to the shape and the voice successively. The fired neurons assume the value 1 while the neurons that are not fired assume another value of $-1$.

If the coupling force between the ith input neuron and the jth competitive neuron is represented by $w_{ij}$, then the value of the competitive neuron $y_j$ with respect to the input $x_i$ is represented by the following expression:

$$y_j = \sum_{i=0}^{NumOfInput} w_{ji} x_i$$

Accordingly, the victorious neuron in the competition can be determined in accordance with the following expression:

$$\max\{y_i\}$$

Storage is performed by strengthening the coupling force between the victorious neuron (winner neuron) in the competitive layer and the input neurons. Updating of the coupling between the victorious neuron (winner neuron) and the input neurons is performed in the following manner in accordance with the Kohonen's updating rule:

$$\Delta w_{ji} = \alpha(x_i - w_{ji}) \quad \alpha: \text{learning ratio}$$

$$w_{ji}(\text{new}) = \Delta w_{ji} + w_{ji}(\text{old})$$

Here, this is normalized with L2Norm:

$$w_{ji}(\text{new}) = \frac{w_{ji}(\text{new})}{\sqrt{\sum_i^{NumOfInput} w_{ji}^2}}$$

This coupling force represents the strength of memory and corresponds to the mnemonic power. Here, the learning rate $\alpha$ is a parameter representative of a relationship between the number of times of presentation and the memory. As the learning rate $\alpha$ increases, the amount of variation of the weight by one time of memory increases. For example, if $\alpha=0.5$ is used, then if a pattern is stored once, the pattern never forget, and if a similar pattern is presented next, then the stored pattern can be recalled almost without fail.

As the number of times by which a pattern is presented and stored increases, the coupling value (weight) of the network increases. This indicates that, as the number of times by which the same pattern is inputted increases, the strength of memory increases. Consequently, statistic learning is possible, and long-term storage that is influenced less likely by noise under an actual environment can be achieved.

On the other hand, if it is tried to input and store a new pattern, then since a new neuron in the competitive layer is fired. Consequently, the coupling to the new neuron is strengthened, but this does not mean to decrease the coupling force to another neuron by the memory in the past. In other words, the associative memory by the competition type neuron network allows additional learning and is released from the problem of oblivescence.

Recall Mode:

It is assumed now that such an input pattern vector as given below is presented to the associative memory system shown in FIG. 12. The input pattern need not necessarily be a complete pattern but may otherwise be a partly missing pattern.

$$[x_1 x_2 \ldots x_n]$$

At this time, the input vector may be a prototype ID or a likelihood or probability that it may be the prototype ID. The value of the output neuron $y_j$ is calculated in accordance with the following expression with respect to the input $x_i$:

$$y_j = \sum_{i=0}^{NumOfInput} w_{ji} x_i$$

It is considered that the expression above represents a likelihood of the firing value of a competitive neuron corresponding to a likelihood of each channel. What is important here is that, from likelihood inputs from a plurality of channels, an overall likelihood can be determined by connecting them. In the present embodiment, only one of channels that exhibit a maximum likelihood is selected as an associative channel, and a victorious neuron in the competition can be determined in accordance with the following expression:

$$\max\{y_i\}$$

Since the number of the determined competitive neuron Y corresponds to the number of the stored symbol, the input pattern X can be recalled by inverse matrix operation of W as given by the following expressions:

$$Y = W \cdot X$$

$$X = W^{-1} \cdot Y = W^T \cdot Y$$

Further, by allocating symbols of an episode, a motion ID and so forth to the input layer neurons of the competition type neural network shown in FIG. 12, the declarative knowledge memory or the procedural knowledge memory can be implemented by the associative memory architecture.

D. Situated Behavior Control

The situated behavior layer (SituatedBehaviorsLayer) 108 controls the behavior of the robot apparatus 1 suitable for a situation in which the robot apparatus 1 is currently placed based on storage contents of the short-term memory section 105 and the long-term memory section 106 and internal states managed by the internal state management section 104. Further, the situated behavior layer 108 includes, as a part thereof, the reflexive behavior section 109 for executing a reflective and direct machine body motion in response to a recognized external stimulus.

D-1. Configuration of the Situated Behavior Layer

In the present embodiment, the situated behavior layer 108 includes a state machine (or state transition model) prepared for each behavior model, and classifies recognition results of external information inputted from the sensors relying upon behaviors and situations in the past to develop a behavior on the machine body. Each behavior module is described as a schema having a monitor function that discriminates a situation in response to an external stimulus or a variation of an internal state and an action function which implements a state transition (state machine) involved in execution of a behavior. The situated behavior layer 108 is formed in a tree structure wherein pluralities of schemas are connected hierarchically (hereinafter described).

Further, the situated behavior layer 108 implements also a behavior (also called "homeostasis behavior") for keeping an internal state within certain range. If the internal state exceeds the designated range, then the situated behavior layer 108 activates a motion for returning the internal state into the range so that the motion may be performed more readily (actually, a motion is selected taking both of an internal state and an external environment into consideration).

Figure 13:
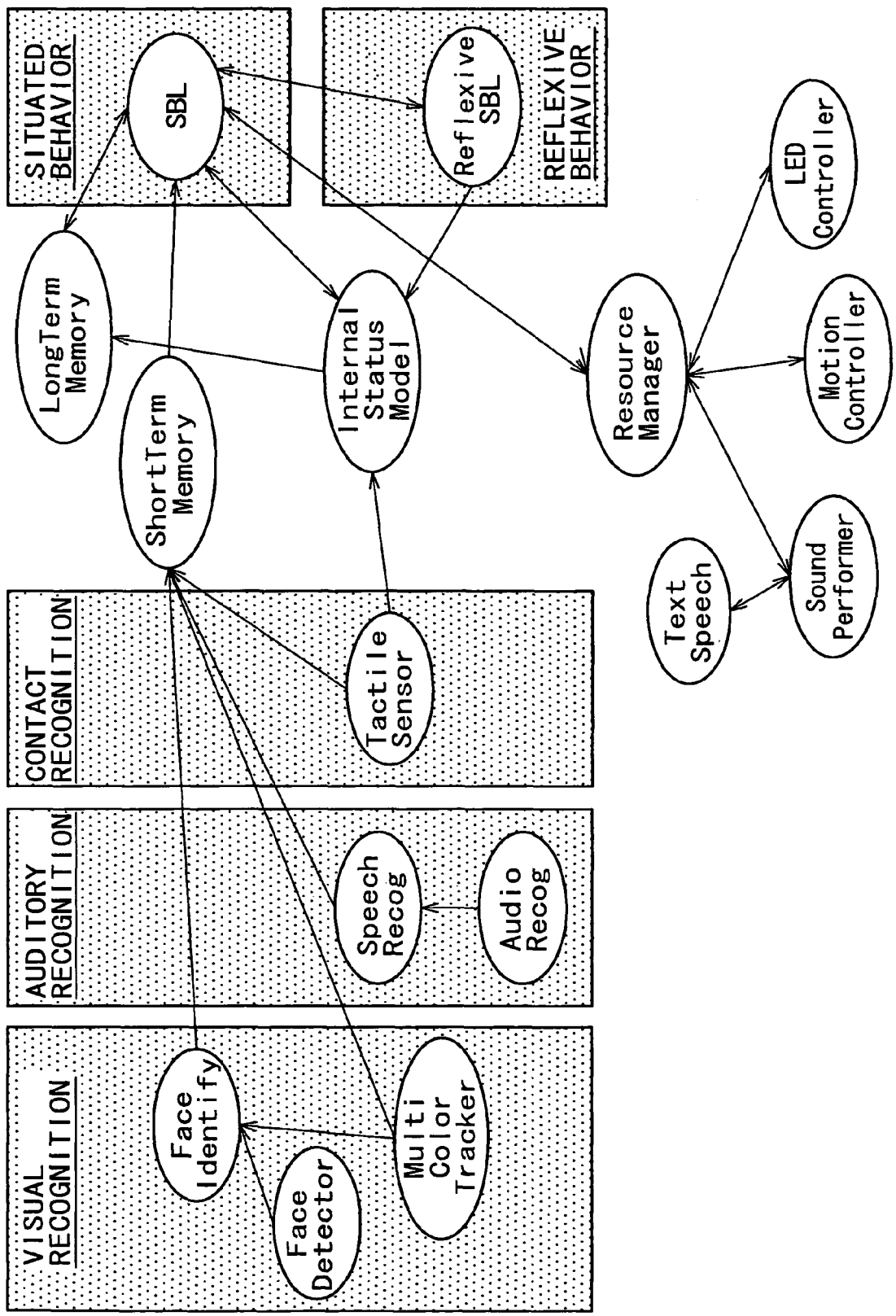
FIG. 13 is a diagrammatic view schematically showing an configuration of objects of the behavior control system 100 according to the embodiment of the present invention.

Each of such function modules of the behavior control system 100 of the robot 1 as shown in FIG. 3 is formed as an object. Each object can perform delivery and Invoke of data using an inter-object communication method in which message communication and a common memory are used. FIG. 13 schematically shows an object configuration of the behavior control system 100 according to the present embodiment.

The visual recognition function section 101 is formed from three objects of "FaceDetector", "MulitColotTracker" and "FaceIdentify".

The FaceDetector is an object that detects a face region from within an image frame and outputs a result of the detection to the FaceIdentify. The MulitColotTracker is an object that performs color recognition and outputs a result of the recognition to the FaceIdentify and the ShortTermMemory (an object which composes the short-term memory section 105). Further, the FaceIdentify searches a person dictionary on hand for a detected face image or the like to identify a person and outputs ID information of the person together with position and size information of the face image region to the ShortTermMemory.

The auditory recognition function section 102 is formed from two objects of "AudioRecog" and "SpeechRecog". The AudioRecog is an object that receives voice data from a voice input apparatus such as a microphone and performs character extraction and voice interval detection. The AudioRecog outputs a characteristic amount of voice data within a voice interval and a sound source direction to SpeechRecog and the ShortTermMemory. The SpeechRecog is an object that performs speech recognition using a voice characteristic amount received from the AudioRecog and a voice dictionary and a syntax dictionary. The SpeechRecog outputs a set of recognized words to the ShortTermMemory.

The contact recognition function section 103 is formed from an object of "TactileSensor" which recognizes a sensor input from a contact sensor and outputs a result of recognition to the ShortTermMemory and InternalStateModel (ISM) which is an object of managing an internal state.

The ShortTermMemory (STM) is an object which composes the short-term memory section 105 and is a function module which retains a target or an event recognized from an external environment by any of the objects of the recognition systems described above for a short period of time (for example, stores an input image from the CCD camera 15 for a short period of time of approximately 15 seconds. The ShortTermMemory (STM) periodically performs notification (Notify) of an external stimulus to the SituatedBehaviorsLayer which is an STM client.

The LongTermMemory (LTM) is an object that composes the long-term memory section 106 and is used to retain information obtained by learning such as the name of an article for a long period of time. The LongTermMemory can associatively store, for example, a variation of an internal state from an external stimulus in a certain behavior module.

The InternalStatusManager (ISM) is an object that composes the internal state management section 104. The InternalStatusManager manages several kinds of emotions such as instincts and feelings as formula models. The InternalStatusManager further manages internal states such as the instincts and the feelings of the robot 1 in response to an external stimulus (ES: ExternalStimula) recognized by any of the objects of the recognition systems described hereinabove.

The SituatedBehaviorsLayer (SBL) is an object that composes the situated behavior layer 108. The SBL is an object that becomes a client (STM client) of the ShortTermMemory. When the SBL periodically receives a notification (Notify) of information regarding an external stimulus (target or event) from the ShortTermMemory, it determines a schema, that is, a behavior model to be executed (hereinafter described).

The ReflexiveSituatedBehaviorsLayer is an object which composes the reflexive behavior section 109, and executes a reflexive and direct machine body motion in response to an external stimulus recognized by any of the objects of the recognition systems described hereinabove. For example, the ReflexiveSituatedBehaviorsLayer performs such a behavior as, for example, to track the face of a human being or to instantaneously dodge an obstacle in response to detection of the obstacle (hereinafter described).

The SituatedBehaviorsLayer selects a behavior in response to a situation such as an external stimulus or a variation of an internal state. In contrast, the ReflexiveSituatedBehaviorsLayer behaves reflexively in response to an external stimulus. Since behavior selections by the two objects are performed independently of each other, when behavior modules (schemas) selected by them are executed on the machine body, they may not possibly be performed successfully because of conflict of hardware resources of the robot 1 with each other. The object ResourceManager arbitrates in conflict of hardware upon behavior selection of the SituatedBahaviorsLayer and the ReflexiveSituatedBehaviorsLayer. Then, the ResourceManager issues a notification to the objects for implementing a machine body motion based on a result of the arbitration to drive the machine body.

SoundPerformer, MotionController and LedController are objects for implementing a machine body motion. The SoundPerformer is an object for outputting sound, and performs speech synthesis in response to a text command given thereto from the SituatedBehaviorLayer through the ResourceManager and outputs sound from the speaker on the machine body of the robot 1. Meanwhile, the MotionController is an object for performing a motion of each joint actuator on the machine body, and calculates a pertaining joint angle in response to reception of a command for moving a hand or a leg from the SituatedBehaviorLayer through the ResourceManager. Further, the LedController is an object for performing a blinking operation of the LED indicator 19, and performs blinking driving of the LED indicator 19 in response to reception of a command from the SituatedBehaviorLayer through the ResourceManager.

FIG. 14 schematically illustrates a form of situated behavior control by the situated behavior layer (SBL) 108 (including the reflexive behavior section 109). Recognition results of an external environment by the recognition modules 101 to 103 are supplied as external stimuli to the situated behavior layer 108 (including the reflexive behavior section 109). Also a variation of an internal state responsive to a recognition result of an external environment by any of the recognition systems is supplied to the situated behavior layer 108. The situated behavior layer 108 can discriminate a situation in response to the external stimuli and the variation of the internal state to perform behavior selection.

FIG. 15 illustrates an example of basic operation in the behavior control by the situated behavior layer 108 illustrated in FIG. 14. As seen from FIG. 15, the situated behavior layer 108 (SBL) calculates activity levels of the behavior modules (schemas) in response to an external stimulus or a variation of an internal state and selects a schema in response to a ratio among the activity levels to execute a behavior. For the calculation of an activity level, the situated behavior layer (SBL) 108 can utilize, for example, a library to perform an integrated calculation process for all schemas (this similarly applies in the following description). For example, a schema having the highest activity level may be selected. Or, two or more schemas having activity levels higher than a predetermined threshold value may be selected to execute corresponding motions concurrently (however, where schemas are to be executed concurrently, it is presupposed that the schemas do not cause conflict of hardware resources).

Figure 16:
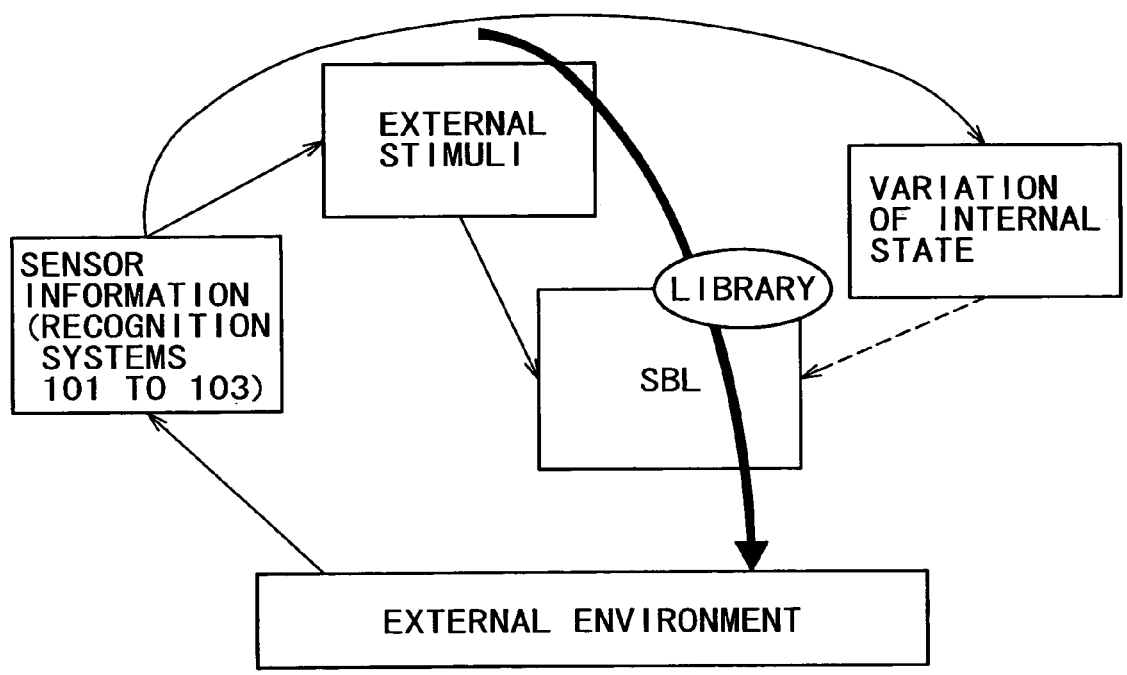
FIG. 16 is a flow diagram illustrating an example of motions when a reflexive motion is performed by the situated behavior layer 108 shown in FIG. 14.

FIG. 16 illustrates an example of operation when a reflexive motion is performed by the situated behavior layer 108 shown in FIG. 14. In this instance, the reflexive behavior section 109 (ReflexiveSBL) included in the situated behavior layer 108 receives an external stimulus recognized by each of the objects of the recognition systems as a direct input thereto and calculates activity levels based on the inputs. Then, the reflexive behavior section 109 (ReflexiveSBL) selects a schema in response to a ratio among the activity levels to execute a behavior. In this instance, a variation of an internal state is not used for the calculation of the activity levels.

Figure 17:
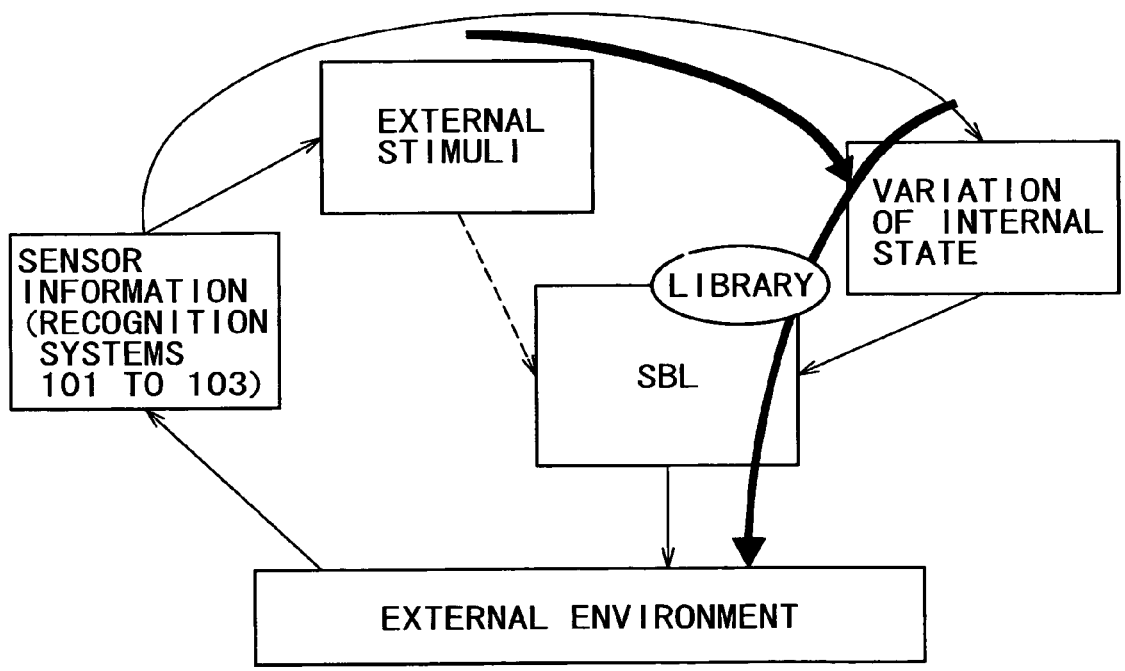
FIG. 17 is a flow diagram illustrating an example of motions when expression of a feeling is performed by the situated behavior layer 108 shown in FIG. 14.

FIG. 17 illustrates an example of operation when a feeling is expressed by the situated behavior layer 108 shown in FIG. 14. The internal state management section 104 manages emotions such as instincts and feelings as formula models and issues a notification (Notify) of a variation of an internal state to the situated behavior layer 108 in response to a state value of an emotion parameter when it reaches a predetermined value. The situated behavior layer 108 receives a variation of an internal state as an input thereto and calculates the activity levels, and selects a schema in response to a ratio among the activity levels to execute a behavior. In this instance, although an external stimulus recognized by any of the objects of the recognition systems is utilized for management and updating of the internal state in the internal state management section 104 (ISM), it is not used for calculation of the activity levels for a schema.

D-2. Schema

Figure 18:
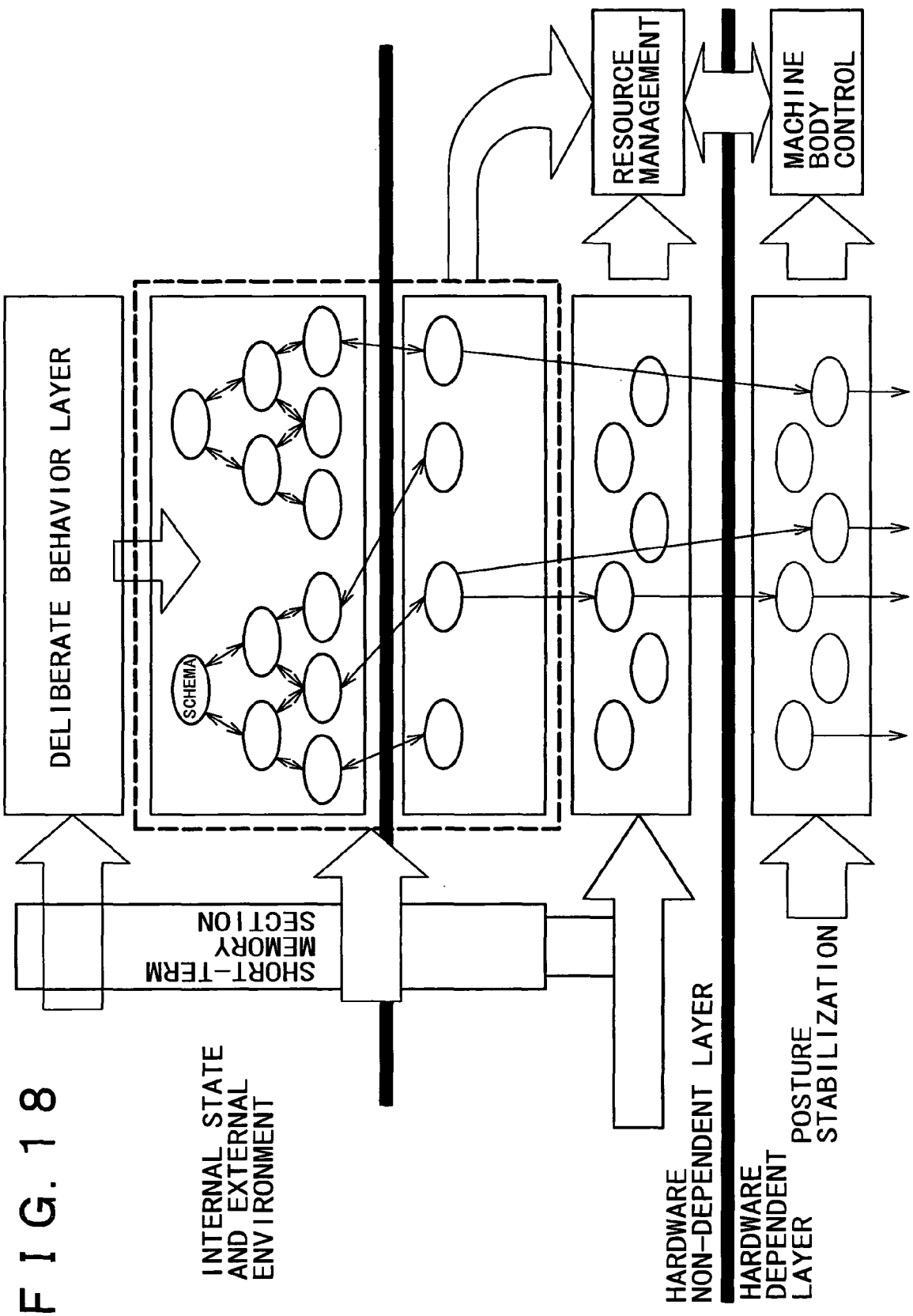
FIG. 18 is a diagrammatic view schematically illustrating a manner wherein the situated behavior layer 108 is formed from a plurality of schemas.

The situated behavior layer 108 includes a state machine prepared for each behavior model, and classifies recognition results of external information inputted from the sensors relying upon behaviors and situations in the past to develop a behavior on the machine body. Each behavior module is described as a schema having an action function and a monitor function. The action function describes a machine body motion and implements a state transition (state machine) involved in execution of a behavior. The monitor function evaluates execution of a behavior described by the action function in response to an external stimulus and/or an internal state to discriminate a situation. FIG. 18 schematically illustrates a manner wherein the situated behavior layer 108 is composed of a plurality of schemas.

The situated behavior layer 108 (specifically, a layer of the situated behavior layer 108 which controls an ordinary situated behavior) is formed in a tree structure wherein pluralities of schemas are connected hierarchically. The situated behavior layer 108 integrally discriminates an optimum scheme in response to an external stimulus and/or a variation of an internal state to perform behavior control. The tree includes a plurality of sub trees (or branches) such as, for example, a sub tree for executing a behavior model wherein an ethological situated behavior is represented by a formula or for executing expression of a feeling.

Figure 19:
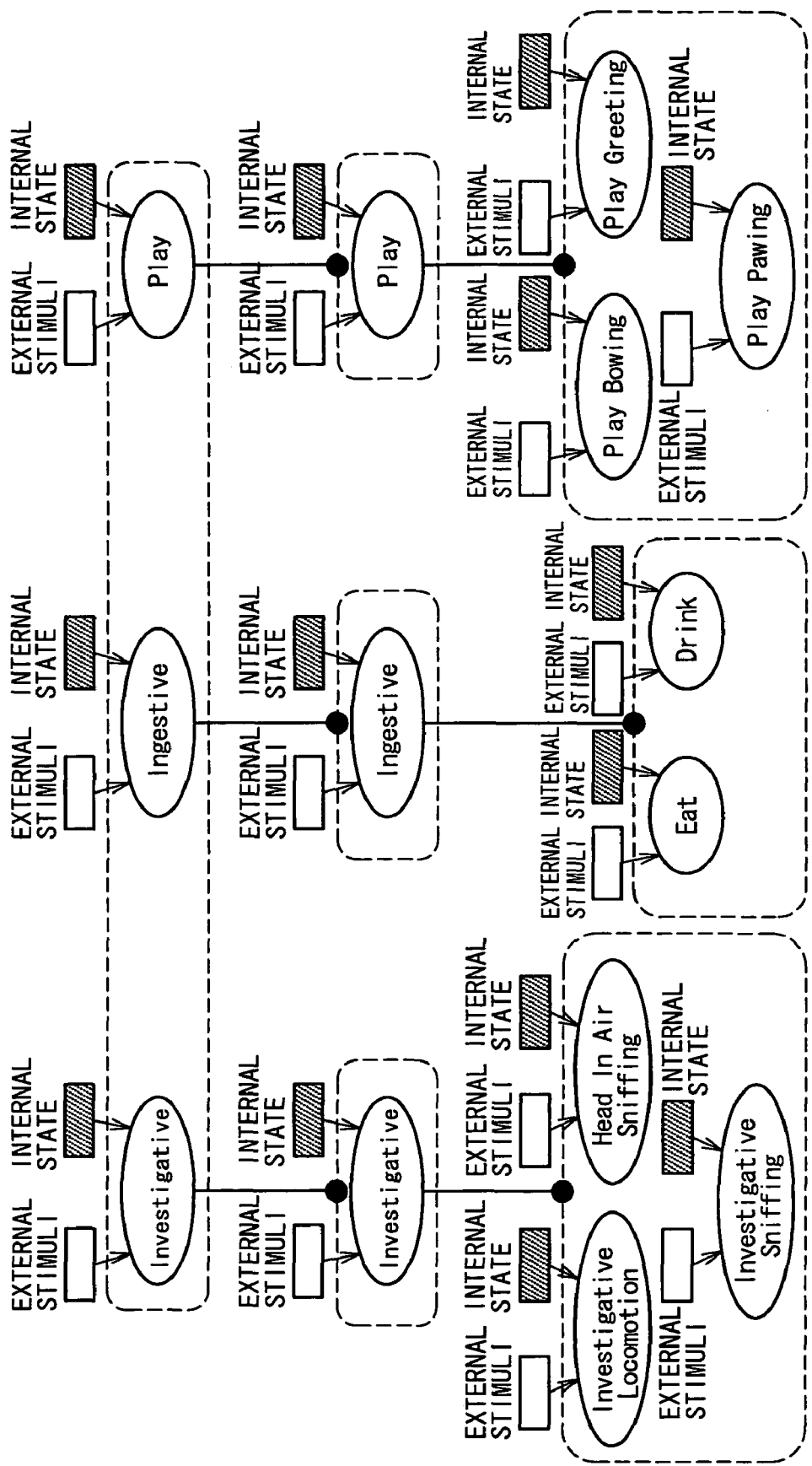
FIG. 19 is a diagrammatic view schematically showing a tree structure of the schemas of the situated behavior layer 108.

FIG. 19 schematically shows a tree structure of schemas in the situated behavior layer 108. Referring to FIG. 19, the situated behavior layer 108 includes schemas disposed in different layers from abstract behavior categories toward concrete behavior categories beginning with root schemas which receive a notification (Notify) of an external stimulus from the short-term memory section 105. For example, in a lower layer immediately below the route schemas, schemas named "Investigate", "Ingestive" and "Play" are disposed. Below the "Investigate", schemas which describe more concrete investigative behaviors such as "InvestigativeLocomotion", "HeadinAirSniffing" and "InvestigativeSniffing" are disposed. Similarly, below the schema "Ingestive", schemas which describe more concrete ingestive behaviors such as "Eat" and "Drink" are disposed. Below the schema "Play", schemas that describe more concrete playing behaviors such as "PlayBowing", "PlayGreeting" and "PlayPawing" are disposed.

As seen in FIG. 19, each schema receives an external stimulus and an internal state. Further, each schema includes at least a Monitor function and an Action function.

Figure 20:
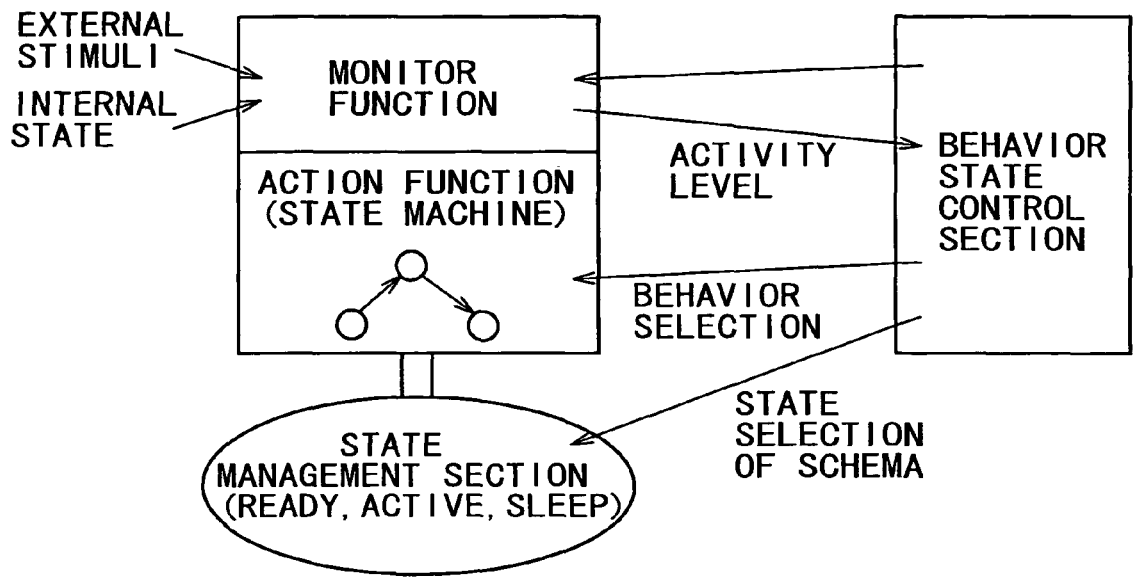
FIG. 20 is a diagrammatic view schematically showing an internal configuration of a schema.

FIG. 20 schematically illustrates an internal configuration of a schema. Referring to FIG. 20, the schema includes an Action function, a Monitor function and a state management section. The Action function describes a machine body motion in the form of a state transition model (state machine) wherein the state changes as a predetermined event occurs. The Monitor function evaluates each state of the Action function in response to an external stimulus and/or an internal state and returns results of the evaluation as activity level values. The state management section sets the state machine of the Action function to one of states of READY, ACTIVE and SLEEP and stores and manages the state of the schema.

The Monitor function is a function for calculating an activity level (Activation Level: AL value) of the schema in response to an external stimulus and an internal state. Where such a tree structure as shown in FIG. 19 is constructed, a higher order (parent) schema can recall the Monitor function of a lower order (child) schema using an external stimulus and an internal state as arguments, and the child schema returns an AL value as a return value. Further, each schema can call the Monitor function of a child schema in order to calculate an AL value of the schema. Since each root schema receives AL values from its sub trees returned as return values, it can integrally discriminate an optimum schema, that is, an optimum behavior, suitable for the external stimulus and a variation of the internal state.

For example, a schema having the highest AL value may be selected. Or, two or more schemas having AL values higher than a predetermined threshold value may be selected to execute corresponding behaviors in parallel (however, where schemas are to be executed in parallel, it is presupposed that the schemas do not cause conflict of a hardware resource).

Figure 21:
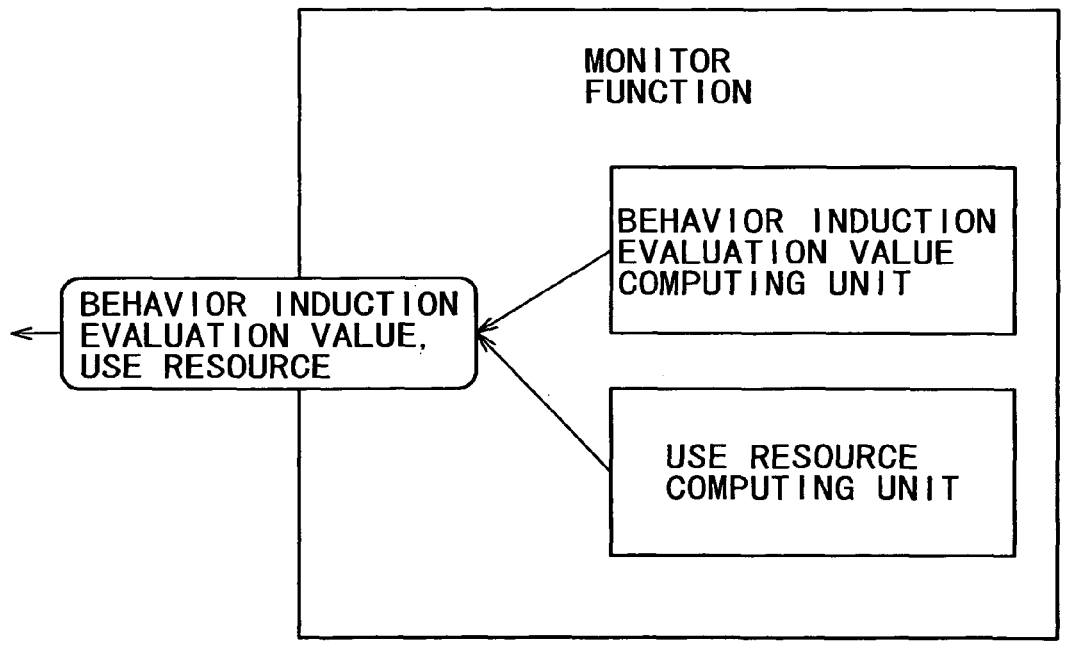
FIG. 21 is a diagrammatic view schematically showing an internal configuration of a Monitor function.

FIG. 21 schematically shows an internal configuration of the Monitor function. Referring to FIG. 21, the Monitor function includes a behavior induction evaluation value computing unit for calculating an evaluation value with which a behavior described in the schema is induced as an activity level, and a use resource computing unit for specifying a machine body resource to be used. In the example shown in FIG. 20, if the Monitor function is called from a behavior state control section (provisional name) which manages the schema, that is, the behavior module, then it virtually executes the state machine of the Action function to arithmetically operate a behavior induction evaluation value (that is, an activity level) and a use resource and returns them.

Meanwhile, the Action function includes a state machine (or state transition model) which describes behaviors the schema has. Where such a tree structure as shown in FIG. 19 is constructed, a parent schema can call the Action function to start or interrupt execution of a child schema. In the present embodiment, the state machine of the Action is not initialized unless it is placed into Ready. In other words, even if the execution of the child schema is interrupted, the state is not reset, but work data during execution of the schema is stored. Consequently, re-execution after interruption is possible (hereinafter described).

In the example shown in FIG. 20, the behavior state control section (provisional name) which manages the schema, that is, the behavior module, selects a behavior to be executed based on a return value from the Monitor function. Then, the behavior state control section (provisional name) calls the Action function of the pertaining schema or issues an instruction of transition of the state of the schema stored in the state management section. For example, a schema that exhibits the highest activity level as the behavior induction evaluation value may be selected or a plurality of schemas may be selected in accordance with a priority order so that conflict of a resource may not occur. Further, the behavior state control section controls the state of the schema in the following manner. If a schema having a higher degree of priority is activated and causes conflict of a resource, then the behavior state control section places the state of a schema having comparatively low priority from ACTIVE into SLEEP. Then, if the conflict state is canceled, then the last-mentioned schema is placed back into ACTIVE.

Figure 22:
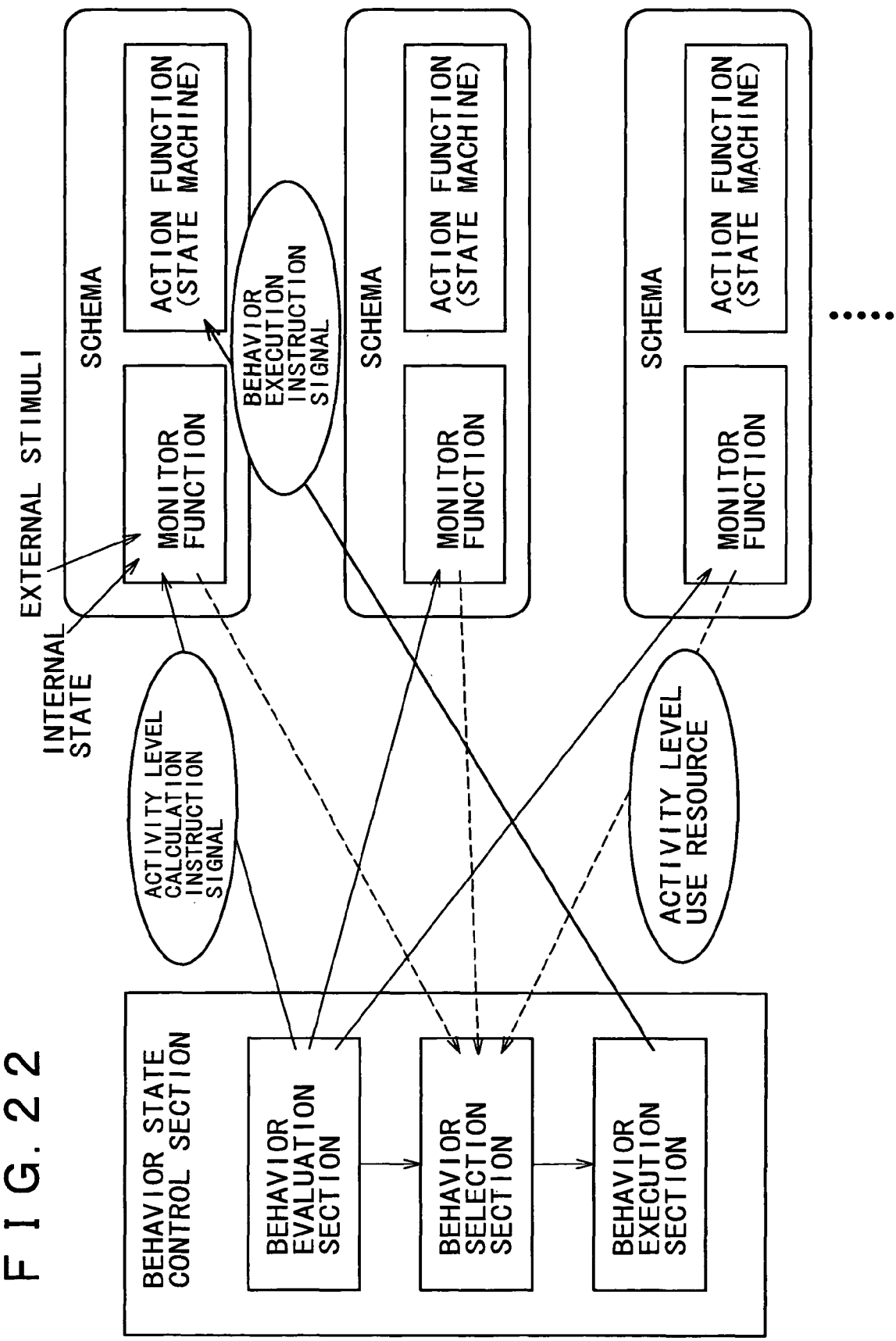
FIG. 22 is a diagrammatic view schematically showing an example of a configuration of a behavior state control section.

Otherwise, only one such behavior state control section may be disposed in the situated behavior layer 108 as seen in FIG. 22 such that it may manage all of the schemas that form the layer 108 in a concentrated manner.

In the example shown in FIG. 22, the behavior state control section includes a behavior evaluation section, a behavior selection section and a behavior execution section. The behavior evaluation section calls the Monitor function of each of the schemas, for example, in a predetermined control cycle to acquire an activity level and a use resource. The behavior selection section performs behavior control by the schemas and management of machine body resources. For example, the behavior selection section selects the schemas in the descending order of the tabulated activity level and selects two or more schemas at the same time so that conflict of a use resource may not occur among them. The behavior execution section issues a behavior execution instruction to the Action function of each of the selected schemas and manages the state (READY, ACTIVE, SLEEP) of each of the schemas to control execution of the schemas. For example, if a schema having higher priority is activated and causes conflict of a resource, then the behavior execution section changes the state of a schema having comparatively low priority from ACTIVE into SLEEP. However, when the conflict state is canceled, the state of the lowest-ordered schema is placed back into ACTIVE.

Figure 23:
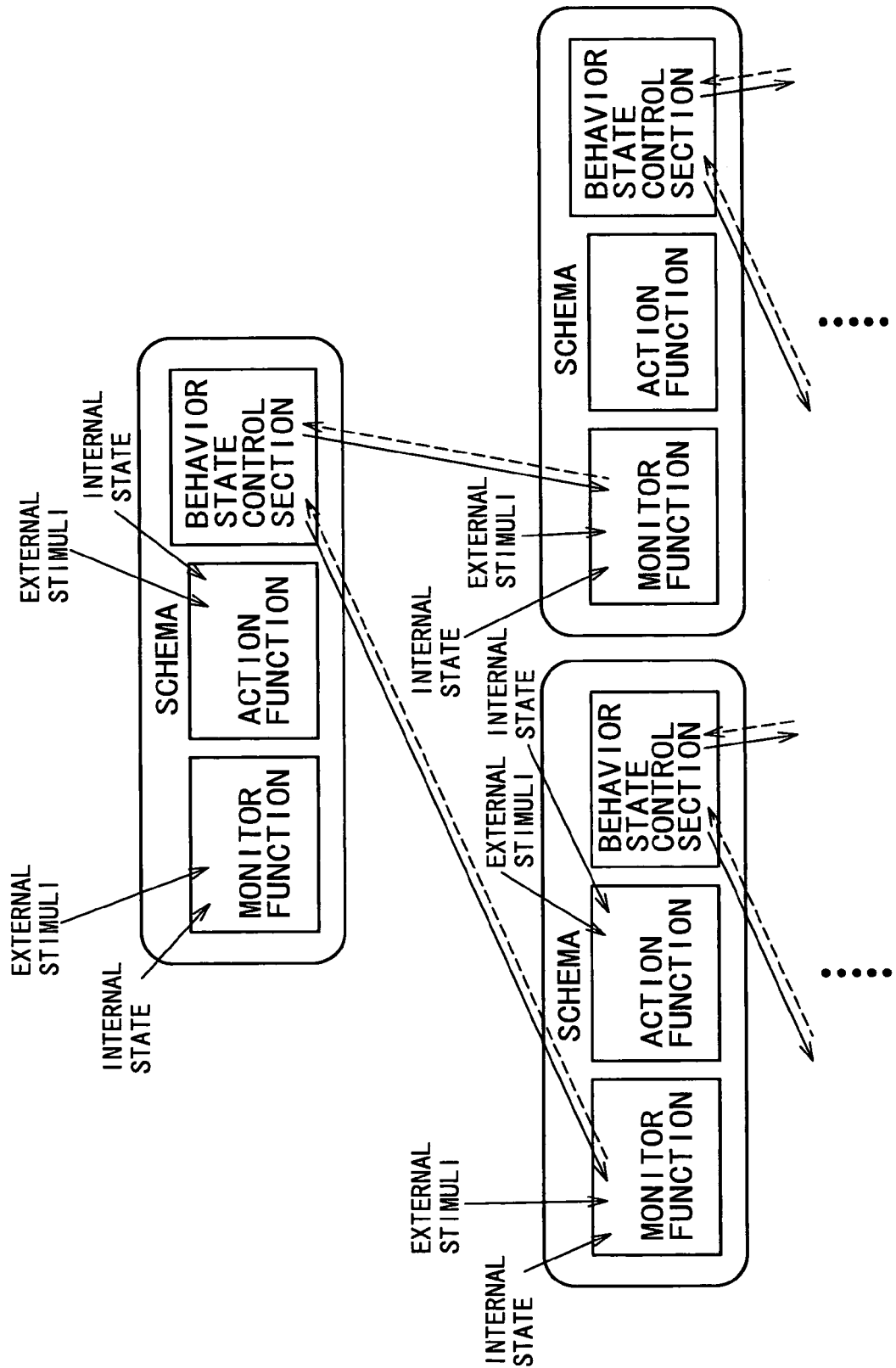
FIG. 23 is a diagrammatic view schematically showing another example of a configuration of the behavior state control section.

Alternatively, such functions of the behavior state control section as described above may be disposed for each schema in the situated behavior layer 108. For example, where schemas are arranged so as to form a tree structure as seen in FIG. 19 (refer to FIG. 23), the behavior state control section of a higher order (parent) schema calls the Monitor function of a lower order (child) schema using an external stimulus and an internal state as arguments. Then, the parent schema receives an activity level and a use resource as return values from the child schema. Further, the child schema calls the Monitor function of a child schema thereof in order to calculate an activity level and a use resource of the child schema itself. Then, since the behavior state control section of each root schema receives such activity levels and use resources returned from its sub trees, it integrally discriminates an optimum schema or behavior in response to the external stimulus and a variation of the internal state. Then, the behavior state control section calls the Action function of the optimum schema to start or interrupt execution of the child schema.

Figure 24:
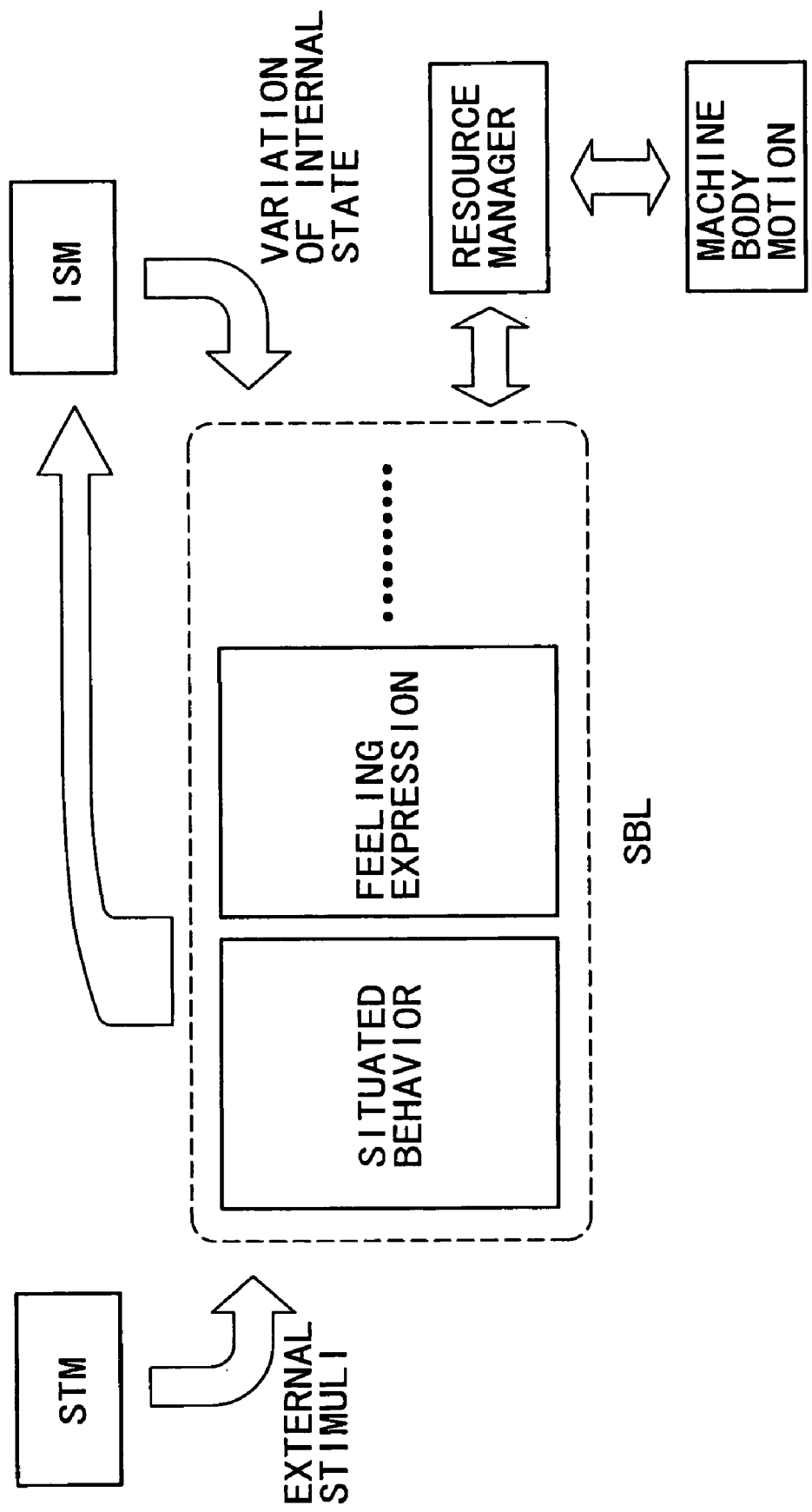
FIG. 24 is a diagrammatic view schematically showing a mechanism for controlling an ordinary situated behavior in the situated behavior layer 108.

FIG. 24 schematically illustrates a mechanism for controlling an ordinary situated behavior by the situated behavior layer 108.

Referring to FIG. 24, the situated behavior layer 108 receives an external stimulus as an input (Notify) thereto from the short-term memory section 105 and receives a variation of an internal state as an input thereto from the internal state management section 109. The situated behavior layer 108 is formed from, for example, a plurality of sub trees such as a behavior model wherein an Ethological situated behavior is represented as a formula or a sub tree for executing expression of a feeling. The root schema calls the Monitor function of each of the sub trees thereof in response to a notification (Notify) of an external stimulus and refers to activity levels (AL values) as return values from the Monitor functions to perform integrated behavior selection. Then, the root schema calls the Action function of a sub tree that implements the selected behavior. Further, the situated behavior determined by the situated behavior layer 108 is applied to a machine body motion (MotionController) after arbitration by the resource manager against conflict of a hardware resource with a reflexive behavior by the reflexive behavior section 109.

Further, the reflexive behavior section 109 of the situated behavior layer 108 executes a reflexive and direct machine body motion in response to an external stimulus recognized by any of the objects of the recognition system described above (for example, instantaneously dodges an obstacle in response to detection of the obstacle). Therefore, different from the case (FIG. 19) wherein an ordinary situated behavior is controlled, pluralities of schemas that directly receive signals of the objects of the recognition system as inputs thereto are disposed not hierarchically but in parallel.

Figure 25:
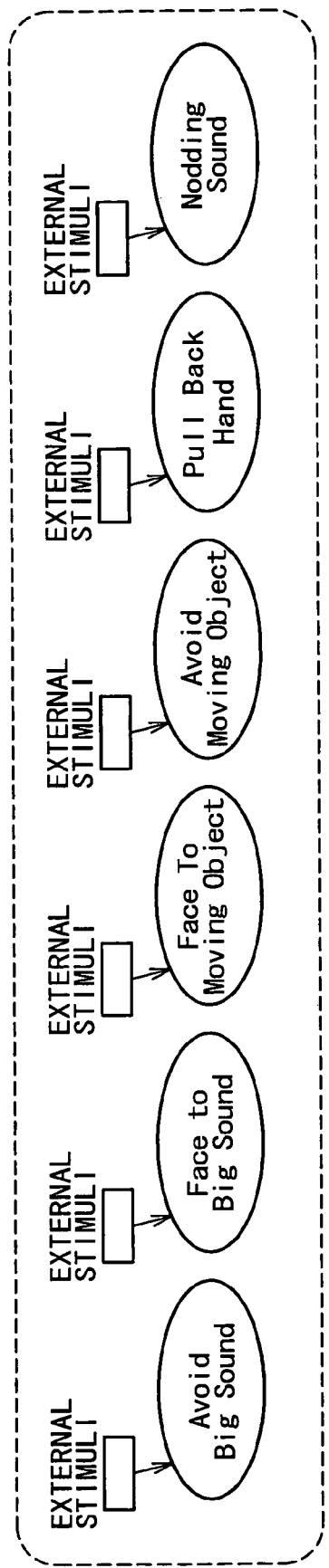
FIG. 25 is a diagrammatic view schematically showing a configuration of schemas of a reflexive control section 109.

FIG. 25 schematically illustrates a configuration of schemas in the reflexive behavior section 109. Referring to FIG. 25, the reflexive behavior section 109 includes "AvoidBigSound", "FacetoBigSound" and "NoddingSound" as schemas that operate in response to a recognition result of the auditory system. Further, the reflexive behavior section 109 includes "FacetoMovingObject" and "AvoidMovingObject" as schemas that operate in response to a recognition result of the visual system. Furthermore, the reflexive behavior section 109 includes a "withdraw a hand" as a schema that operates in response to a recognition result of the contact system. In the reflexive behavior section 109, the schemas mentioned are disposed at equal positions (in parallel).

As seen in FIG. 25, each of those schemas that perform a reflexive behavior has an external stimulus as an input thereto. Further, each schema includes at least a monitor function and an action function. The monitor function calculates an AL value of the schema in response to an external stimulus and it is discriminated based on the AL value whether or not a pertaining reflexive behavior should be developed. Meanwhile, the action function includes a state machine (hereinafter described) that describes reflexive behaviors the schema has. When the action function is called, it develops a pertaining reflexive behavior and changes the state of the action.

Figure 26:
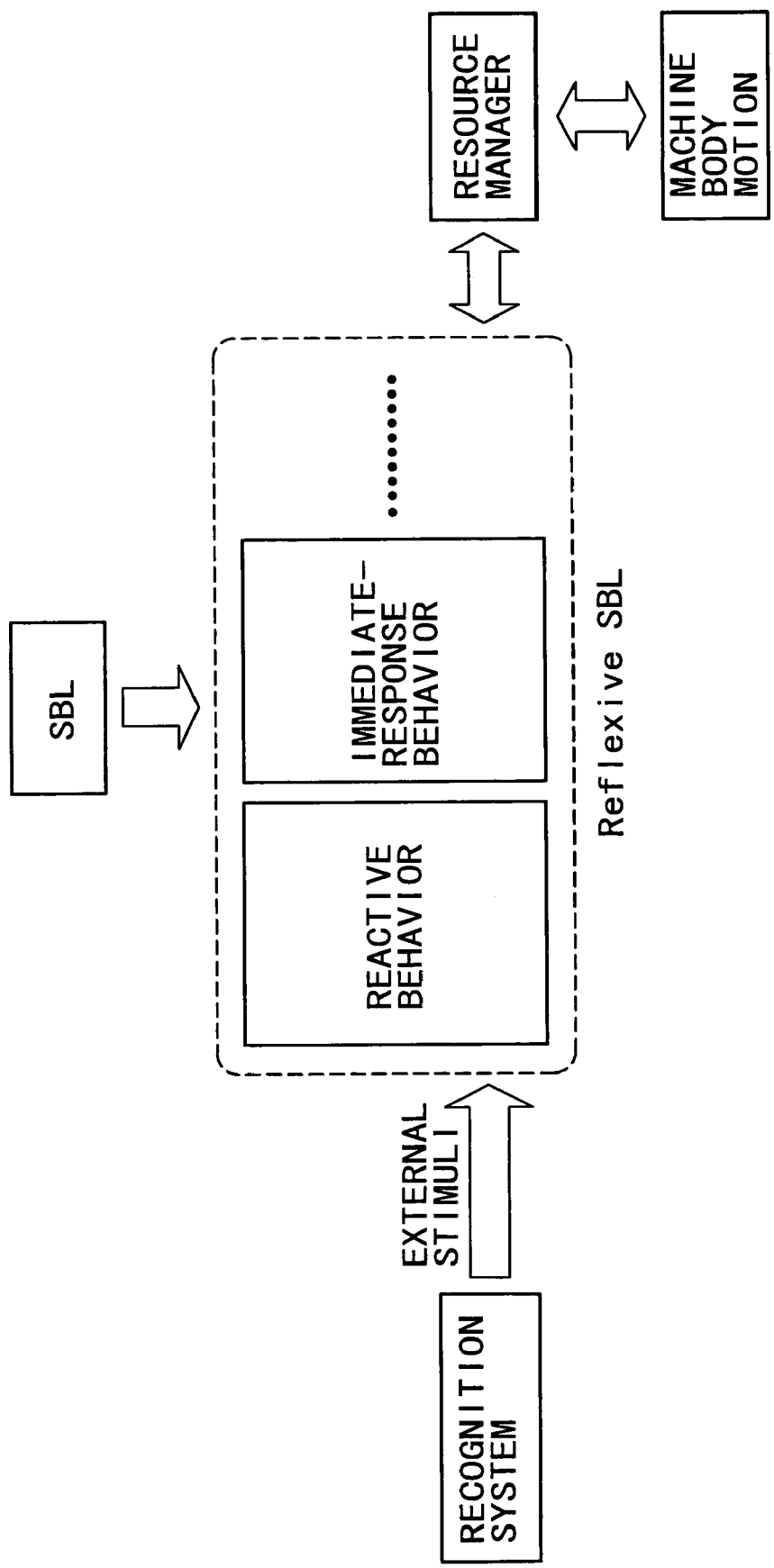
FIG. 26 is a diagrammatic view schematically showing a mechanism for controlling a reflexive behavior by the reflexive control section 109.

FIG. 26 schematically illustrates a mechanism for controlling a reflexive behavior by the reflexive behavior section 109.

As shown also in FIG. 25, schemas that describe reflexive behaviors and schemas that describe immediate responding behaviors are present in parallel in the reflexive behavior section 109. When a recognition result is inputted from an object of the recognition system, a corresponding reflexive behavior schema calculates an AL value using the monitor function and discriminates based on the calculated AL value whether or not the action should be activated. Then, the reflective behavior determined for activation by the reflexive behavior section 109 is applied to the machine body motion (MotionController) after arbitration by the resource manager against conflict of a hardware resource with a reflexive behavior by the reflexive behavior section 109.

Figure 27:
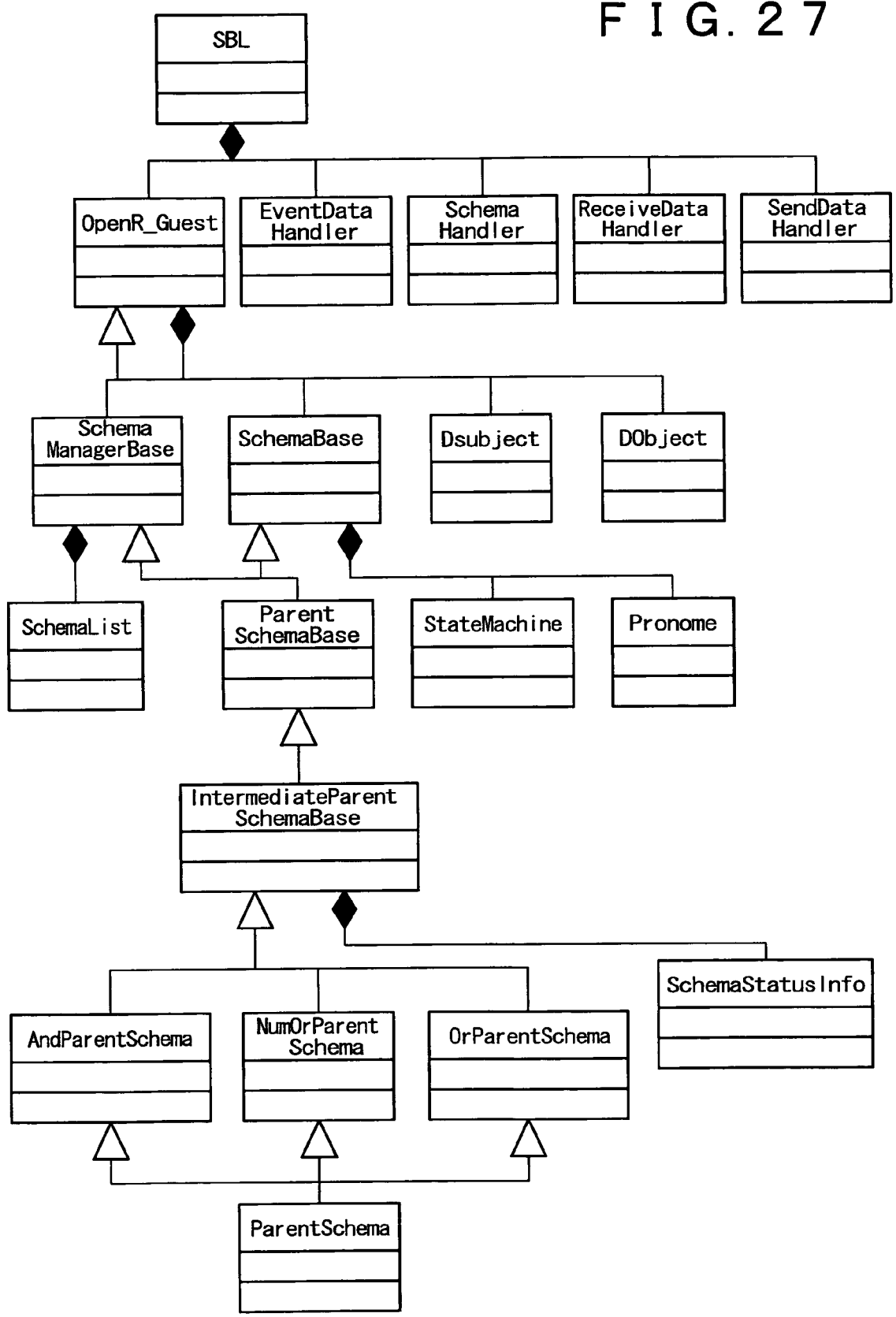
FIG. 27 is a diagrammatic view schematically illustrating class definitions of the schemas used in the situated behavior layer 108.

The schemas that compose the situated behavior layer 108 (including the reflexive behavior section 109) can be described each as a "class object" described, for example, on the C++ language base. FIG. 27 schematically illustrates class definitions of schemas used in the situated behavior layer 108. Each of blocks shown in FIG. 27 individually corresponds to one class object.

Referring to FIG. 27, the situated behavior layer (SBL) 108 includes more than one schema, EventDataHandler (EDH) for assigning IDs to input/output events to/from the SBL and SchemaHandler (SH) for managing the schemas in the SBL. The situated behavior layer (SBL) 108 further includes more than one ReceiveDataHandler (RDH) for receiving data from an external object (STM, LTM, resource manager, or each object of the recognition system), and more than one SendDataHandler (SDH) for transmitting data to an external object.

The EventDataHandler (EDG) is a class object for assigning IDs to input/output events to/from the SBL and receives a notification of an input/output event from the RDH or SDH.

The SchemaHandler retains information (configuration information of the SBL) of the schemas that compose the situated behavior layer (SBL) 108 or the reflexive behavior section 109, the tree structure and so forth as a file. For example, upon activation of the system or the like, the SchemaHandler reads the configuration information file and re-constructs (re-generates) such a schema configuration of the situated behavior layer 108 as shown in FIG. 19) to map entities of the schemas in the memory space.

Each schema includes OpenR_Guest positioned as a base of the schema. The OpenR_Guest includes more than one Dsubject for allowing the schema to transmit data to the outside and more than one DObject for allowing the schema to receive data from the outside. For example, when the schema tries to send data to an outside object of the SBL (the STM, LTM or each object of the recognition system), the Dsubject writes transmission data into the SendDataHandler. Meanwhile, the DObject can read data received from an outside object of the SBL from the ReceiveDataHandler.

SchemaManager and SchemaBase are class objects which both inherit the OpenR_Guest. The class inheritance is to inherit the definition of an original class, and in this instance, signifies that also the SchemaManager and the SchemaBase include such class objects as the Dsubject and the DObject defined by the OpenR_Guest (this similarly applies to the following description). For example, where a plurality of schemas are arranged in a tree structure as shown in FIG. 19, the SchemaManager has a class object SchemaList for managing a list of child schemas (has pointers to the child schemas) and can call a function of any of the child schemas. Meanwhile, the SchemaBase has a pointer to its parent schema and can return a return value of a function called from the parent schema.

Figure 28:
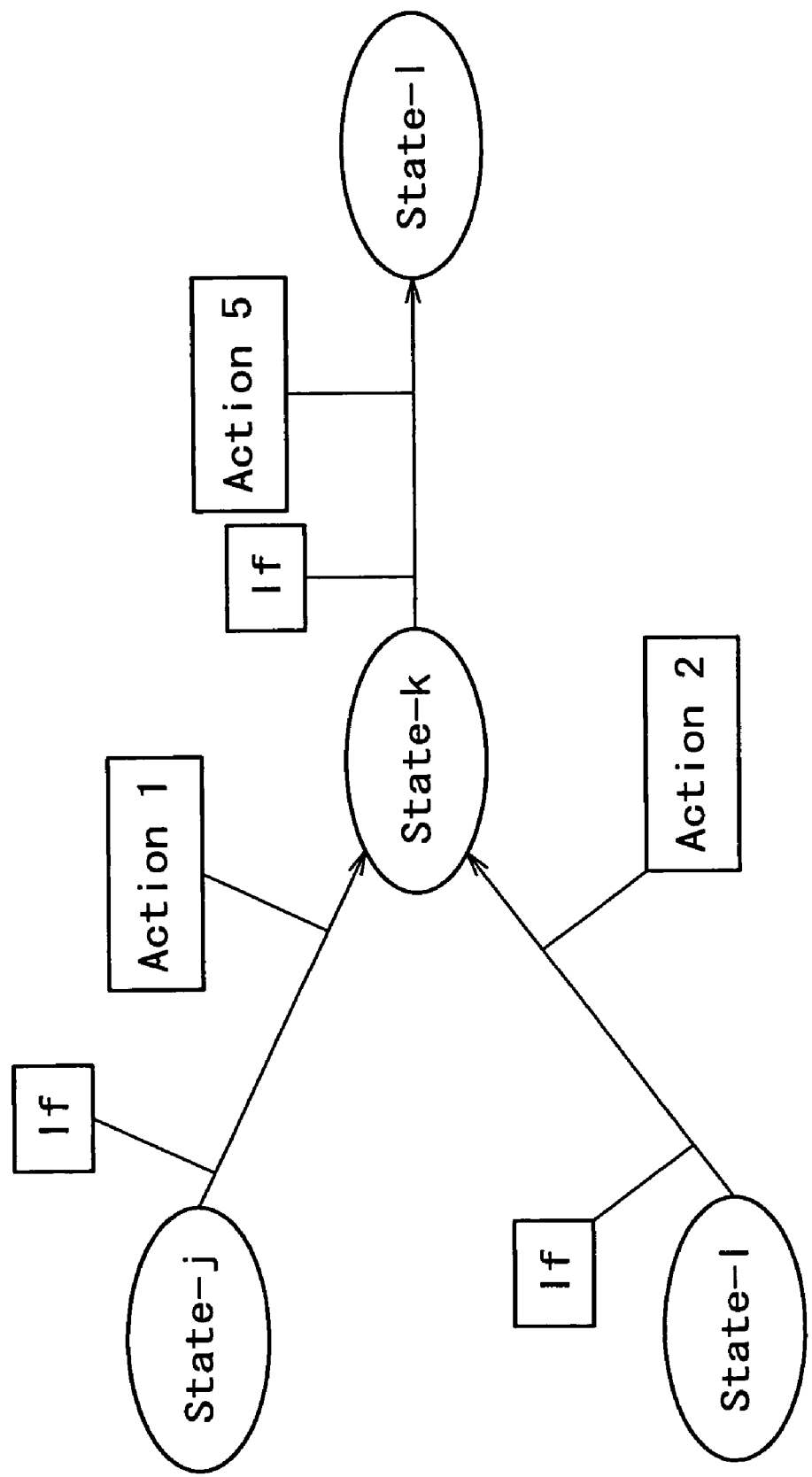
FIG. 28 is a diagrammatic view illustrating a state machine of an action function of a schema.

The SchemaBase has two class objects of StateMachine and Pronome. The StateMachine manages state machines regarding a behavior (Action function) of the schema. FIG. 28 illustrates a state machine regarding a behavior (Action function) of a schema. Behaviors (Action) are stringed individually to transitions between states of the state machine.

A parent schema can change over the state machine of the Action function of a child schema (can change the state of a child schema). A target to which the schema is to execute or apply a behavior (Action function) is substituted into the Pronome. As hereinafter described, the schema is occupied by the target substituted into the Pronome and is not released until after the behavior comes to an end (is completed or abnormally ended). In order to execute the same behavior for a new target, a schema of the same class definition is generated in the memory space. As a result, the same schema can be executed independently for each target (without interference between work data of individual schemas), and the Reentrance property (hereinafter described) of a behavior is secured.

ParentSchemaBase is a class object which multiply inherits the SchemaManager and the SchemaBase, and manages a parent schema and child schemas of the schema, that is, a parentage of the schema, in a tree structure of schemas.

IntermediaParentSchemaBase is a class object which inherits the ParentSchemaBase and implements interface conversion for each class. Further, the IntermediaParentSchemaBase has SchemaStatusInfo. The SchemaStatusInfo is a class object for managing state machines of the schema.

A parent schema can call the Action function of a child schema to change over the state of a state machine of the child schema. Further, the parent schema can call the Monitor function of the child schema to ask for an AL value corresponding to a state of the state machine. However, it is to be noted that the state machine of the schema is different from the state machine of the Action function described hereinabove.

Figure 29:
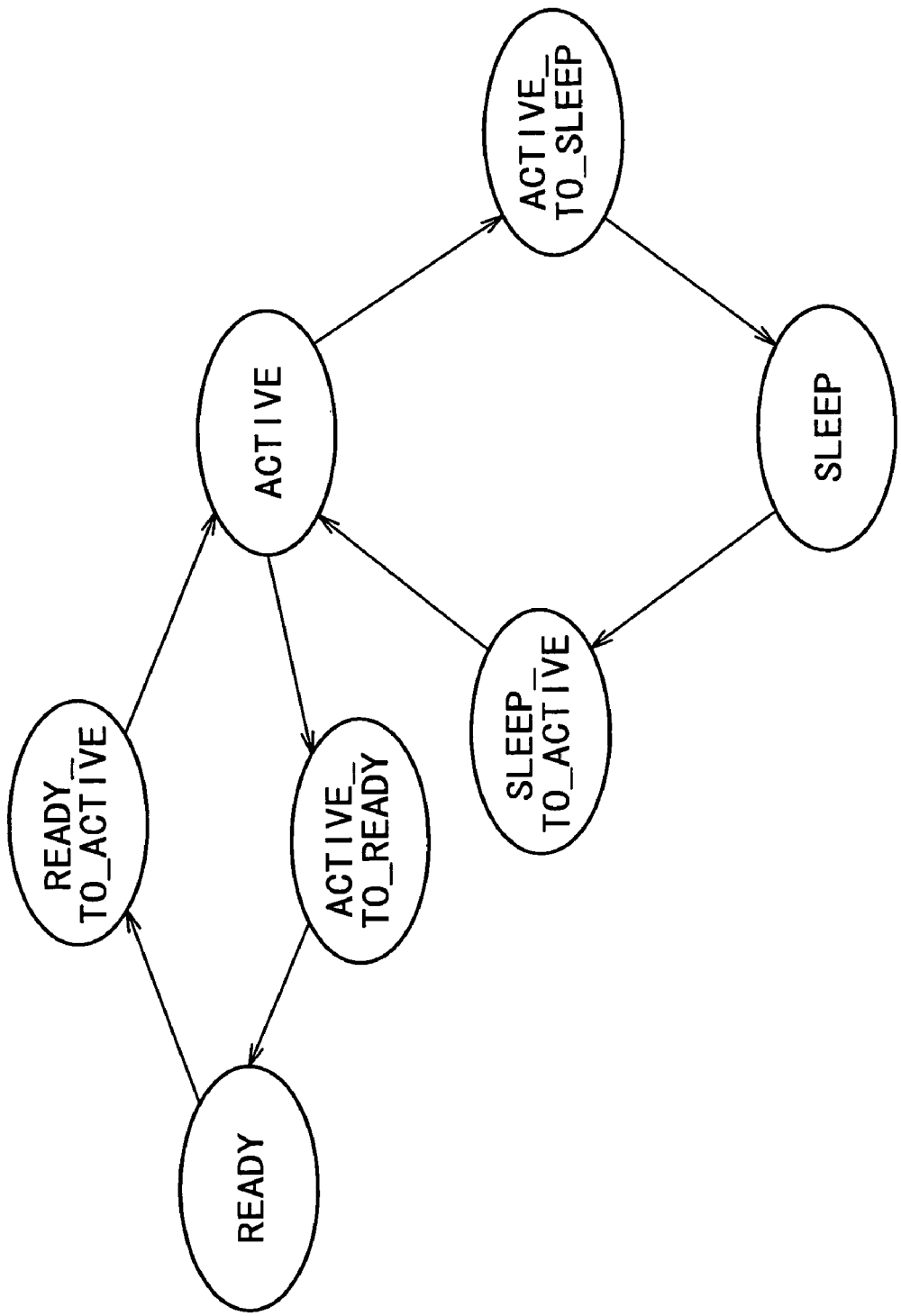
FIG. 29 is a diagrammatic view illustrating a state machine of a schema.

FIG. 29 illustrates state machines regarding a behavior described by a schema, that is, the Action function. As described hereinabove, the state machine of a schema defines the three states of READY, ACTIVE and SLEEP regarding a behavior described by the Action function. If a schema having higher priority is activated and causes competition of a resource, then the state of a schema having the lower priority is placed from ACTIVE into SLEEP, and then after the competition state is canceled, the state of the lower schema is placed back into ACTIVE.

As seen in FIG. 29, ACTIVE_TO_SLEEP is defined for a state transition from ACTIVE to SLEEP, and SLEEP_TO_ACTIVE is defined for another state transition from SLEEP to ACTIVE. In the present embodiment, it is characteristic (1) that a process for storing data (a context) necessary to resume upon later transition to ACTIVE and a behavior necessary for SLEEP are stringed to the ACTIVE_TO_SLEEP, and (2) that a process for restoring the stored data (context) and a behavior necessary for return to ACTIVE are stringed to the SLEEP_TO_ACTIVE.

The behavior necessary for SLEEP is, for example, a behavior of uttering such words as "wait a minute" for announcing a pause to the other party of conversation (which may be accompanied by a gesture or a movement of a hand). On the other hand, the behavior necessary for return to ACTIVE is, for example, a behavior of uttering such words as "sorry to have kept you waiting" for expressing appreciation to the other party of conversation (which may be accompanied by a gesture or a movement of a hand).

AndParentSchema, NumOrParentSchema and OrParentSchema are class objects that inherit the IntermediaParentSchemaBase. The AndParentSchema has pointers to a plurality of child schemas to be executed at the same time. The OrParentSchema has pointers to a plurality of child schemas one of which is to be executed selectively. The NumOrParentSchema has pointers to a plurality of child schemas from which only a predetermined number of ones are to be executed at the same time.

ParentSchema is a class object that multiply inherits the AndParentSchema, NumOrParentSchema and OrParentSchema.

Figure 30:
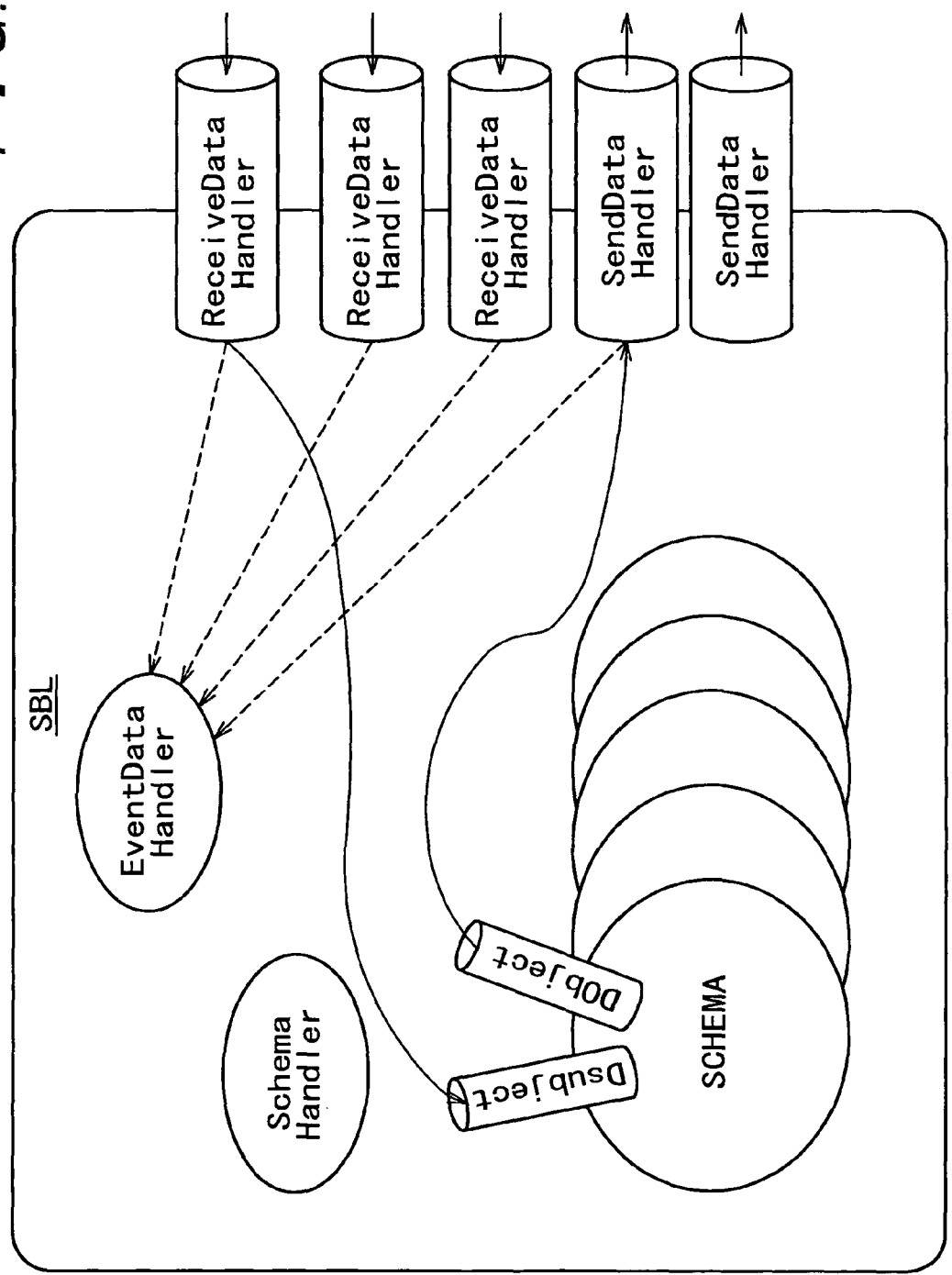
FIG. 30 is a diagrammatic view schematically showing a functional configuration of classes in the situated behavior layer 108.

FIG. 30 schematically illustrates a functional configuration of classes in the situated behavior layer (SBL) 108.

The situated behavior layer (SBL) 108 include more than one ReceiveDataHandler (RDH) for receiving data from an external object such as the STM, LTM, resource manager or each object of the recognition system and more than one SendDataHandler (SDH) for transmitting data to an external object.

The EventDataHandler (EDH) is a class object for assigning IDs to input/output events of the SBL and receives a notification of an input/output event from the RDH or the SDH.

The SchemaHandler is a class object for managing the schemas and retains configuration information of schemas that compose the SBL as a file. For example, upon activation of the system or the like, the SchemaHandler reads in the configuration information file and constructs a schema configuration in the SBL.

The schemas are generated in accordance with the class definition illustrated in FIG. 27, and entities thereof are mapped in the memory space. Each schema includes the OpenR_Guest as a base class object and such class objects as DSubject and DObject for accessing external data.

Functions and state machines a schema principally has are listed below.

ActivationMonitor( ): an evaluation function for allowing the schema to be rendered Active when it is Ready.
Action( ): a state machine for execution when Active.
Goal( ): a function for discriminating whether or not the schema reaches Goal when Active.
Goal( ): a function for discriminating whether or not the schema is in a fail state when Active.
SleepActions( ): a state machine executed before Sleep.
SleepMonitors( ): an evaluation function to Resume upon Sleep.
ResumeActions( ): a state machine to Resume before Resume.
DestroyMonitor( ): an evaluation function for discriminating whether or not the schema is in a fail state upon Sleep.
MakePronome( ): a function for determining a target of the entire tree.

The functions listed above are described in the SchemaBase.

Figure 31:
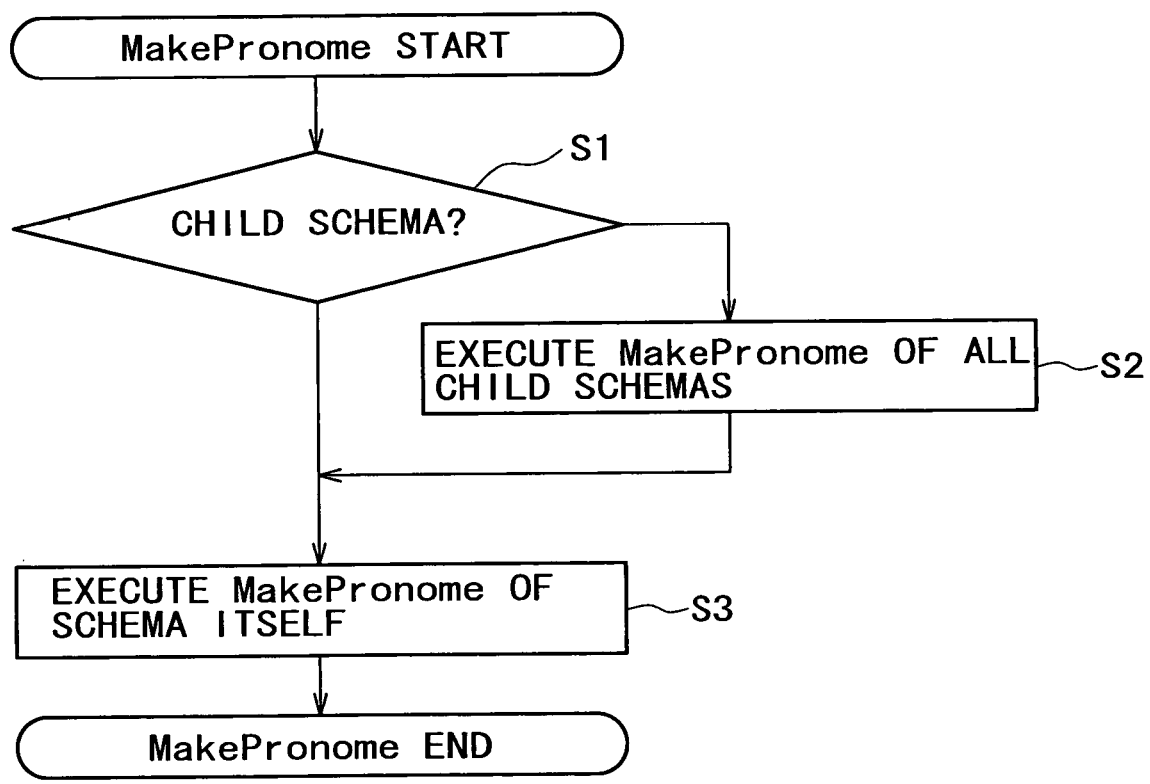
FIG. 31 is a flow chart illustrating a processing procedure for executing a MakePronome function.

FIG. 31 illustrates a processing procedure for executing the MakePronome function in the form of a flow chart.

If the MakePronome function of the schema is called, then it is first discriminated whether not the schema has a child schema (step S1).

If the schema has a child schema, then the MakePronome functions of all of such child schemas are similarly called recursively (step S2).

Then, the MakePronome of the schema is executed to substitute a target into the Pronome object (step S3).

As a result, the same target is substituted into the Pronome of all of the schemas belonging to the schema including the schema, and the schemas are not released until the behavior is ended (completed or abnormally ended). In order to execute the same behavior for a new target, a schema of the same class definition is generated in the memory space.

Figure 32:
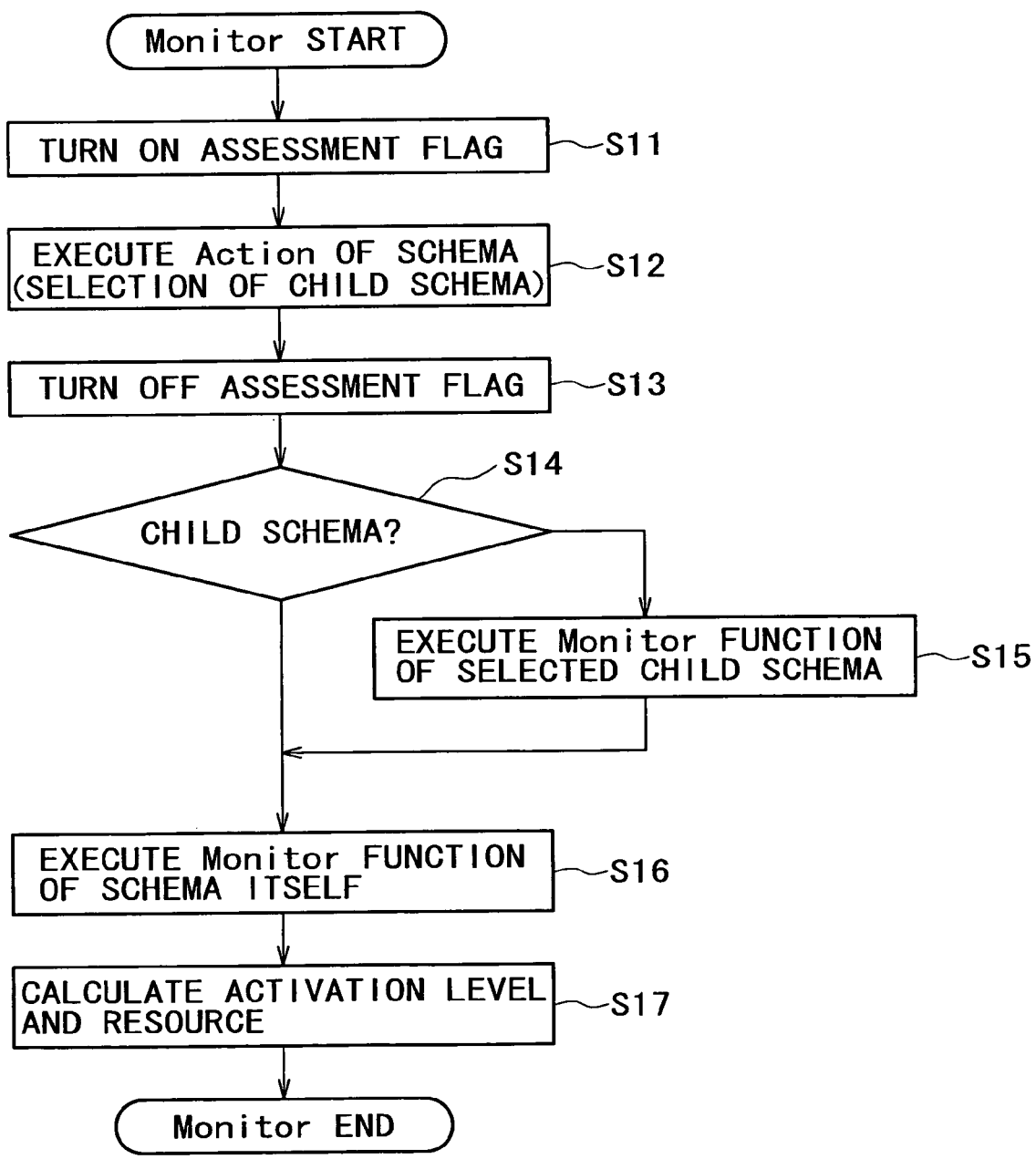
FIG. 32 is a flow chart illustrating a processing procedure for executing a Monitor function.

FIG. 32 illustrates a processing procedure for executing the Monitor function in the form of a flow chart.

First, an assessment flag (AssessmentFlag) is set to on (step S11), and the Action of the schema is executed (step S12). At this time, also selection of a child schema is performed. Then, the assessment flag is set back to off (step S13).

If a child schema is present (step S14), then the monitor function of the child schema selected at step S12 is recursively called (step S15).

Then, the Monitor function of the schema is executed (step S16) and an activity level and a resource to be used for execution of a behavior are calculated (step S17) and used as return values of the function.

Figure 33:
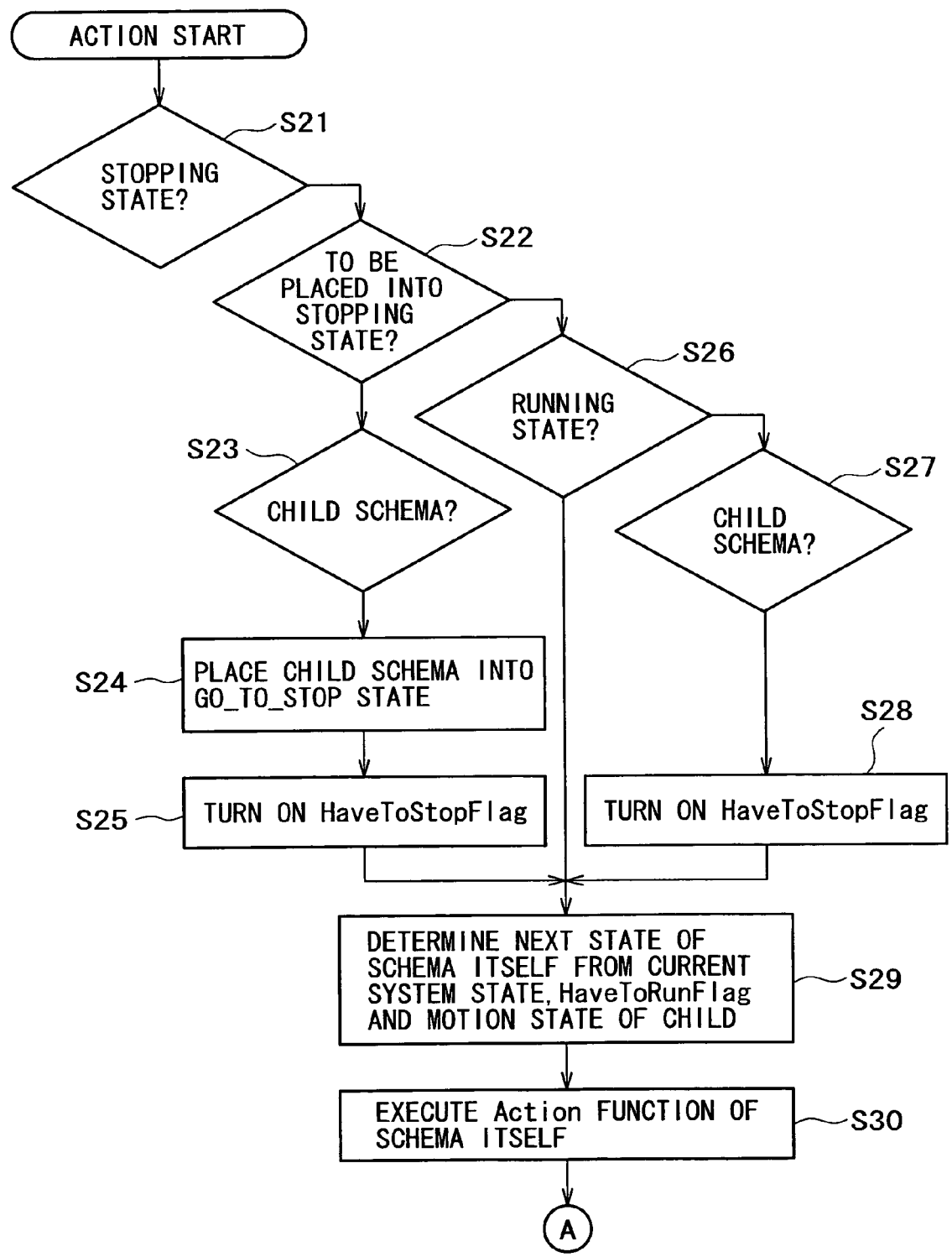
FIG. 33 is a flow chart illustrating a processing procedure for executing an Actions function.
Figure 34:
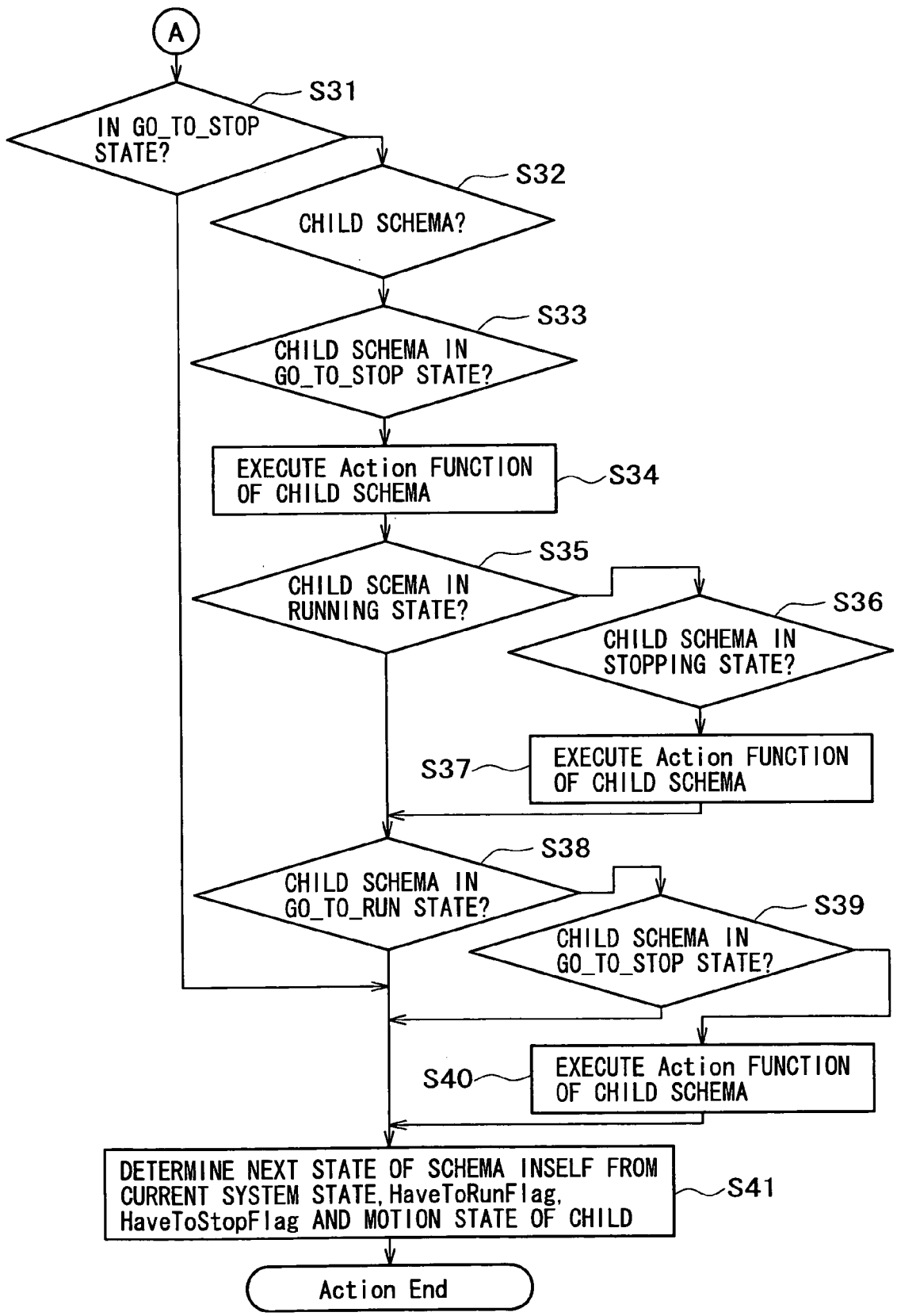
FIG. 34 is a flow chart illustrating a processing procedure for executing the Actions function.

FIGS. 33 and 34 illustrate a processing procedure for executing the Actions function in the form of flow charts.

First, it is checked whether or not the schema is in the STOPPING state (step S21), and then it is checked whether or not the schema should be placed into the STOPPING state (step S22).

If the schema should be placed into the STOPPING state, then it is checked whether or not a child schema is present (step S23). Then, if a child schema is present, the child schema is placed into the GO_TO_STOP state (step S24) and then the HaveToStopFlag is place into an on state (step S25).

On the other hand, if the schema should not be placed into the STOPPING state, then it is checked whether or not the schema is in the RUNNING state (step S26).

If the schema is not in the RUNNING state, then it is checked whether or not a child schema is present (step S27). Then, if a child schema is present, then the HaveToStopFlag is placed into an on state (step S28).

Then, a next state of the schema is determined from a current system state, the HaveToRunFlag, the HaveToStopFlag and the operation state of the child schema (step S29).

Then, the Action function of the schema is executed (step S30).

Thereafter, it is checked whether or not the schema is in the GO_TO_STOP state (step S31). If the schema is not in the GO_TO_STOP, then it is checked whether or not a child schema is present (step S32). Then, if a child schema is present, then it is checked whether or not a child schema in the GO_TO_STOP state is present (step S33).

If a child schema in the GO_TO_STOP state is present, then the Action functions of such schemas are executed (step S34).

Then, it is checked whether or not a child schema in the RUNNING state is present (step S35). If a child schema in the RUNNING state is not present, then it is checked whether or not a child schema in a stopping state is present (step S36), and the Action function of any child schema in a stopping state is executed (step S37).

Then, it is checked whether or not a child schema in the GO_TO_RUN is present (step S38). If a child schema in the GO_TO_RUN state is not present, then it is checked whether or not a child schema in the GO_TO_STOP state is present (step S39). If a child schema in the GO_TO_STOP state is present, then the Action function of the child schema is executed (step S40).

Finally, a next state of the schema is determined from the current system state, HaveToRunFlag, HaveToStopFlag and operation states of the children, thereby ending the entire processing routine (step S41).

D-3. Functions of the Situated Behavior Layer

The situated behavior layer (SituatedBahaviorsLayer) 108 controls the behavior of the robot apparatus 1 suitable for a situation in which the robot apparatus 1 is placed based on storage contents of the short-term memory section 105 and the long-term memory section 106 and the internal states managed by the internal state management section 104.

As described hereinabove, the situated behavior layer 108 in the present embodiment is formed in a tree structure of schemas (refer to FIG. 19). Each of the schemas maintains the independence in a state wherein it knows children and a parent thereof. Due to such a schema configuration as just described, the situated behavior layer 108 has principal characteristics of Concurrent evaluation, Concurrent execution, Preemption and Reentrant. The characteristics are described in detail below.

(1) Concurrent Valuation:

It is described hereinabove that a schema as a behavior module has the Monitor function of discriminating a situation in response to an external stimulus or a variation of an internal state. The Monitor function is mounted as the schema includes the Monitor function in the class object SchemaBase. The Monitor function is a function for calculating the activity level (Activation Level: AL) of the schema in response to an external stimulus and an internal state.

Where such a tree structure as shown in FIG. 19 is constructed, a higher order (parent) schema can call the Monitor function of a lower order (child) schema using an external stimulus and an internal state as arguments, and the child schema returns an AL value as a return value. Further, in order for the child schema to calculate the AL value of the child schema, it can call the Monitor function of its child schema. Thus, since a root schema receives AL values from its sub trees, it can integrally discriminate an optimum schema, that is, an optimum behavior, in response to the external stimulus and a variation of the internal state.

Since the schemas are arranged in a tree structure in this manner, the evaluation of each schema responsive to an external stimulus and a variation of an internal state is first performed concurrently from below to above in the tree structure. As illustrated also in the flow chart of FIG. 32, where a schema has a child schema or schemas (step S14), it calls the Monitor function of a selected child (step S15) and then it executes the Monitor function of the schema.

Then, execution permission as an evaluation result is passed from above to below in the tree structure. The evaluation and the execution are performed while removing competition of a resource used by the behavior.

The situated behavior layer 108 in the present embodiment has adaptability to a situation such as an external stimulus or an internal state since it can evaluate a behavior concurrently making use of the tree structure of schemas. Further, upon evaluation, the situated behavior layer 108 performs evaluation regarding the entire tree, and the tree is modified with an activity level (AL) value calculated at the time. Consequently, a schema, that is, a behavior to be executed, can be dynamically prioritized.

(2) Concurrent Execution:

Since a root schema receives AL values returned from its sub trees, it can integrally discriminate an optimum schema, that is, an optimum behavior, suitable for an external stimulus and a variation of an internal state. For example, a schema having the highest AL value may be selected. Or, two or more schemas having AL values higher than a predetermined threshold value may be selected to execute corresponding behaviors in parallel (however, where schemas are to be executed in parallel, it is presupposed that the schemas do not cause conflict of a hardware resource).

Any schema to which execution permission is given is executed. In particular, the schema actually observes a more detailed external stimulus or variation of an internal state and executes a command. As regards execution, commands are executed successively from above to below in the tree structure, that is, in a Concurrent fashion. As illustrated in the flow charts of FIGS. 33 and 34, where the schema has a child schema, the Actions function of the child is executed.

The Action function includes state machines (hereinafter described) that describe behaviors the schema has. Where such a tree structure as shown in FIG. 19 is constructed, a parent schema can call the Action function to start or interrupt execution of a child schema.

The situated behavior layer 108 in the present embodiment can make use of a tree structure of schemas to simultaneously execute another schema which uses a remaining resource if it does not cause competition of a resource. However, if a limitation is not applied to resources to be used up to the Goal, then there is the possibility that incoherent behavior developments may occur. A situated behavior determined by the situated behavior layer 108 is applied to a machine body motion (MotionController) after arbitration by the resource manager against competition of a hardware resource with a reflexive behavior by the reflexive behavior section 109.

(3) Preemption:

Even if a schema is placed into an executed state, if a more significant (higher priority) behavior is required, then the schema must be interrupted to pass the execution right to the behavior. Further, also it is necessary to resume and continue execution of the original scheme if the more significant behavior is ended (completed, suspended from execution or the like).

Such execution of tasks in accordance with priority is similar to a function called Preemption of an OS (Operating System) in the world of computers. In an OS, the Preesemption is a policy of successively executing tasks in the descending order of priority at timings with a schedule taken into consideration.

In contrast, since the behavior control system 100 of the robot apparatus 1 according to the present embodiment involves a plurality of objects, it requires arbitration among the objects. For example, the ReflexiveSBL which is an object for controlling a reflexive behavior must necessarily dodge an article or keep balancing without taking care of a behavior evaluation of the SBL which is an object for controlling a higher order situated behavior. In this instance, the ReflexiveSBL actually deprives of the execution right and performs execution. Thus, the ReflexiveSBL issues a notification to a higher order behavior module (the SBL) that the higher order behavior module is deprived of its execution right, and the higher order behavior module executes the process to maintain the Preemptive capacity.

Further, it is assumed that execution permission is given to a certain schema in the situated behavior layer 108 as a result of evaluation of the AL value based on an external stimulus and a variation of an internal state. Also it is assumed that later evaluation of the AL value based on an external stimulus and a variation of an internal state exhibits that the degree of significance of another schema is higher than that of the certain schema. In such an instance, the Actions function of the schema being executed is utilized to place the schema into the Sleep state to interrupt the execution of the schema, and consequently, Preemptive changeover of a motion can be performed.

The state of the Actions( ) of the schema being executed is stored, and the Actions( ) of the different schema is executed. Further, after the Actions( ) of the different schema comes to an end, the Actions( ) of the interrupted schema can be executed again.

In addition, before the Actions( ) of the schema being executed is interrupted and the execution right is moved to the different schema, the SleepActions( ) is executed. For example, when the robot 1 discovers a soccer ball during dialog, it can say, "wait a moment" and play the soccer.

(4) Reentrant:

Each of the schemas that compose the situated behavior layer 108 is a kind of subroutine. If a schema is called from a plurality of parents, it must have storage spaces corresponding to the individual parents in order to store an internal state thereof.

This is similar to the Reentrant property an OS has in the world of computers. In the present description, this is called Reentrant property of a schema. As described hereinabove with reference to FIG. 30, a schema is composed of class objects, and the Reentrant property is implemented by producing an entity, that is, an instance, of a class object for each target (Pronome).

Figure 35:
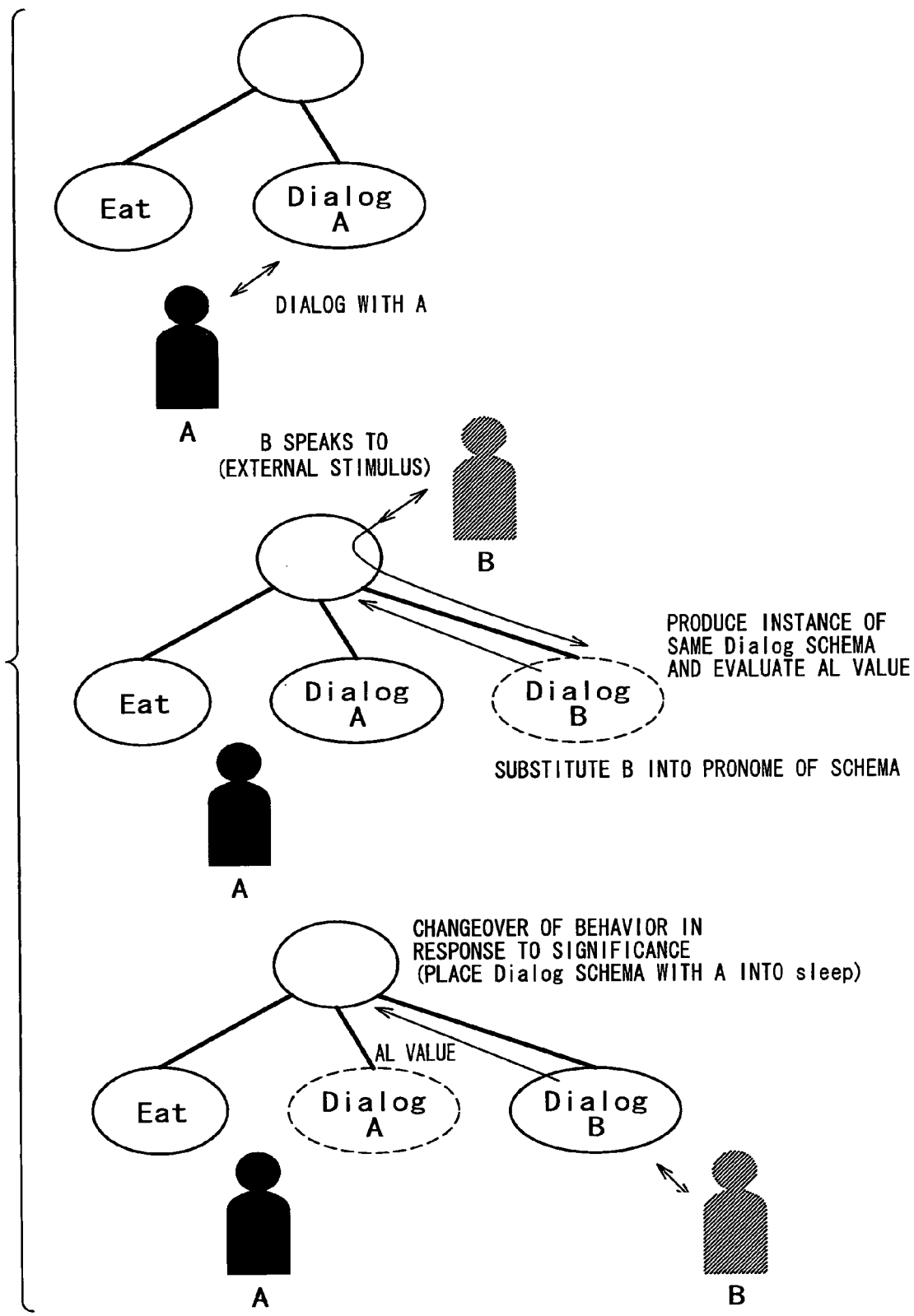
FIG. 35 is a schematic diagrammatic view illustrating a Reentrant property of a schema.

The Reentrant property of a schema is described in more detail with reference to FIG. 35.

SchemaHandler is a class object for managing the schema and retains configuration information of the schemas that compose the SBL as a file. Upon activation of the system, the SchemaHandler reads the configuration information file and constructs a schema configuration in the SBL. In the example shown in FIG. 31, entities of schemas that define behaviors such as Eat and Dialog are mapped in the memory space.

Here, it is assumed that, as a result of evaluation of the activity levels based on an external stimulus and a variation of an internal state, a target (Pronome) A is set for the schema Dialog and the Dialog thereafter executes dialog with the user A.

It is further assumed that another user B thereafter cuts into the dialog between the robot apparatus 1 and the user A and, as a result of evaluation of the activity levels performed based on an external stimulus and a variation of an internal state, the schema for performing the dialog with the user B exhibits higher priority.

In such an instance, the SchemaHandler maps another Dialog entity (instance) that inherits the class for performing dialog with the user B in the memory space. Since the SchemaHandler uses the different Diaflog entity to perform dialog with the user B independently of the former Dialog entity, the contents of the dialog with the user A are not destroyed. Accordingly, the Dialog A can maintain the consistency of data, and after the dialog with the user B comes to an end, the dialog with the user A can be resumed from the interrupted point.

For a schema in the Ready list, evaluation, that is, calculation of an AL value, is performed in response to an object article (external stimulus), and the execution right is passed to the schema. Thereafter, an instance of the schema moved into the Ready list is generated, and evaluation with respect to the other object articles is performed. Consequently, the same schema can be placed into an active or sleep state.

E. Internal State Management of the Robot

In the behavior control system 100 for a robot according to the present embodiment, the situated behavior layer 108 determines a behavior depending upon an internal state and an external stimulus.

The internal state of the robot apparatus 1 is composed of a plurality of different emotions such as an instinct and a feeling and is handled as formula models. The internal state management section (ISM: Internal Status Manager) 104 manages the internal state based on an external stimulus (ES: ExternalStimula) recognized by any of the recognition function sections 101 to 103 described hereinabove and passage of time.

E-1. Hierarchies of Emotions

In the present embodiment, the emotions are divided into a plurality of hierarchical layers depending upon the significance of presence thereof and operate in the individual layers. It is determined which one of a plurality of determined motions should be selectively performed depending upon an external environment and an internal state at the time (hereinafter described). Further, while a motion is selected in each of the layers, motions are developed preferentially beginning with that of a comparatively low layer so that an instinctive motion such as reflex and a higher order behavior such as selection of an operation through use of memory can be developed without a contradiction on a single individual.

Figure 36:
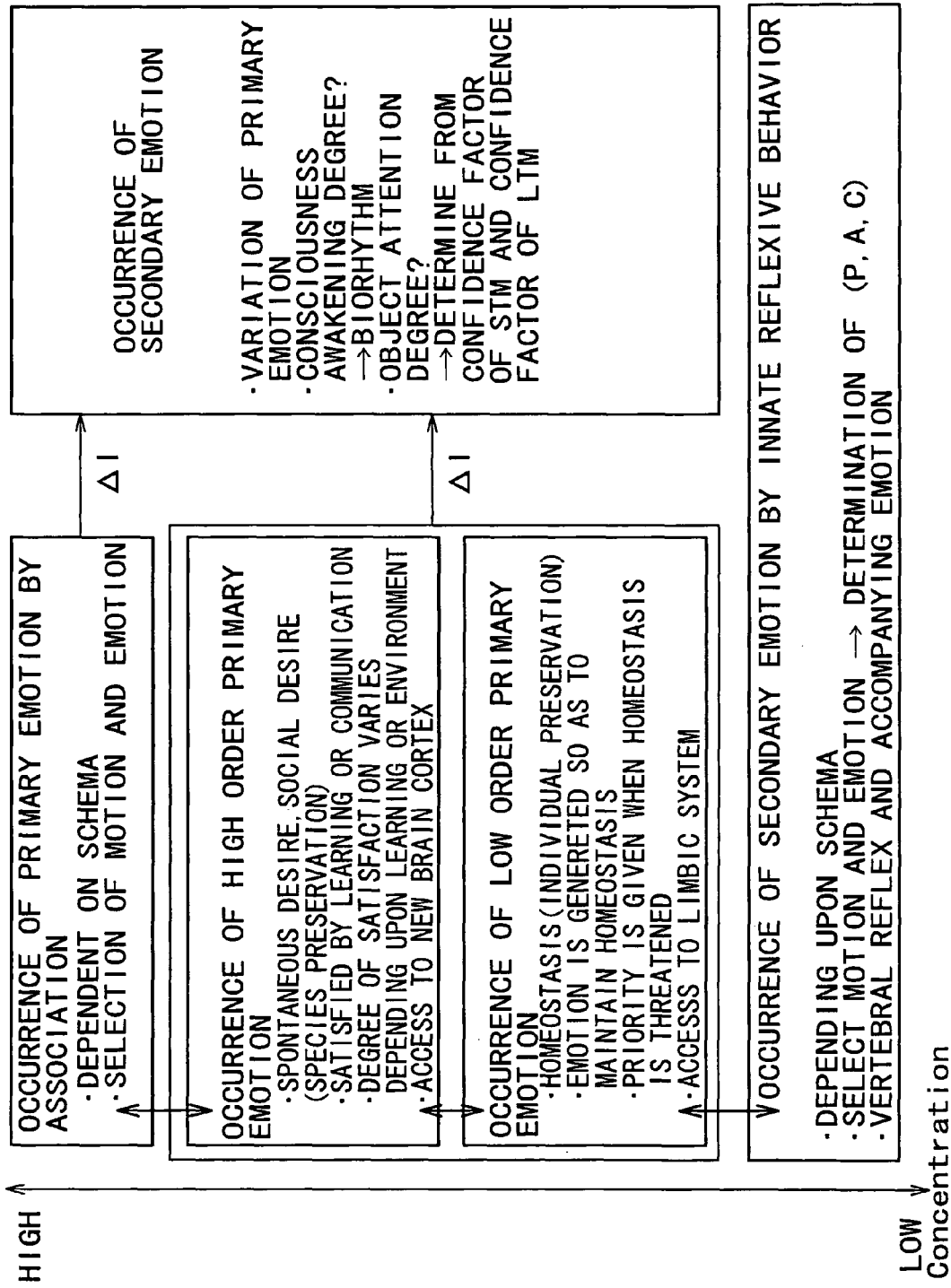
FIG. 36 is a diagrammatic view schematically illustrating a hierarchical configuration of an internal state management section 104 according to the present invention.

FIG. 36 schematically shows a hierarchical configuration of the internal state management section 104 in the present embodiment.

Referring to FIG. 36, the internal state management section 104 roughly classifies internal information such as emotions into primary emotions necessary for the individual persistence such as an instinct and a desire and secondary emotions which vary depending upon the degree of satisfaction of any of the primary emotions. Further, the primary emotions are hierarchically subdivided into those ranging from those which are comparatively physiological in individual persistence to association.

In the example illustrated in FIG. 36, the primary emotions are classified into, from the lower order side to the higher order side, low order primary emotions, high order primary emotions and primary emotions by association. A low order primary emotion corresponds to accessing to the limbic system and is generated so that the homeostasis may be maintained, and takes priority when the homeostasis is threatened. Meanwhile, a high order primary emotion corresponds to accessing to the new brain cortex and relates to the species preservation such as a spontaneous desire or a social desire. Further, the degree of satisfaction of a high order primary emotion varies depending upon learning or an environment (a high order primary emotion is satisfied through learning or communication).

Each of the layers of the primary emotions outputs a variation amount ΔI of the primary emotion (instinct) level through execution of a schema selected for a behavior.

The secondary emotions correspond to feelings (Emotion) and include such factors as joy, sad, anger, surprise, disgust and fear. A variation amount (satisfaction degree) ΔE of a secondary emotion is determined in response to the variation amount ΔI of a primary emotion.

While the situated behavior layer 108 performs behavior selection based principally on the primary emotions, where a secondary emotion is strong, also it is possible for the situated behavior layer 108 to perform behavior selection based on the secondary emotion. Further, also it is possible to use a parameter generated from a secondary emotion to perform modulation to a behavior selected based on a primary emotion.

In the emotion layer for the individual preservation, a behavior by innate reflex is selected first. Then, a behavior that satisfies the low order primary emotions is selected. Then, a motion that satisfies the high order primary emotions is generated, and then a motion that satisfies the primary emotions by association is generated. In this manner, motions are realized beginning with that for the more primitive individual preservation.

In this instance, a primary emotion in each layer can apply pressure to the nearest layer. Where an index for selecting a behavior determined by each layer is strong, the motion determined by the nearest layer can be suppressed to develop the behavior of the layer.

As described also in the item D above, the situated behavior layer 108 is composed of a plurality of schemas each having a target motion (refer to FIG. 18 or 19). The situated behavior layer 108 uses the activity level each schema has as a target to select a schema, that is, a behavior. The activity level of an entire schema is determined depending upon the activity levels of the internal states and the activity levels of the external situation. The schema stores an activity level for each intermediate passage for execution of a target motion. Occurrence of a motion for satisfying ○○ corresponds to the fact that a motion for satisfying ○○ executes a schema which is a final target.

The activity level of an internal state is determined by the sum total of the variations ΔE of the satisfaction degrees of the secondary emotions based on the variation amount ΔI for each of the layers of the primary emotions when a schema is executed. It is assumed here that the primary emotions are divided into three layers of L1, L2 and L3 and the variations of the secondary emotions originating from the layers of the primary emotions upon schema selection are represented by $\Delta E_{L1}$, $\Delta E_{L2}$ and $\Delta E_{L3}$, respectively. Thus, the variations $\Delta E_{L1}$, $\Delta E_{L1}$ and $\Delta E_{L3}$ are multiplied by weighting coefficients $w_1$, $w_2$ and $w_3$ to calculate activity levels, respectively. If the weighting coefficient for a lower order primary emotion is set comparatively high, then a motion which satisfies the low order primary emotion is selected more likely. By adjusting the weighting coefficients, an action that a primary emotion of each layer applies a pressure to the nearest layer (Concentration: behavior suppression) can be achieved.

Here, a form of behavior selection that utilizes the hierarchical structure of emotions is described. It is to be noted, however, that, in the following description, the Sleep is handled as the low order primary emotion, and the Curiosity is handled as the high order primary emotion.

(1) It is assumed that the Sleep that is a low order primary emotion gradually becomes short and the activity level of a schema that satisfies the Sleep becomes higher. At this time, if the activity level of any other schema does not become high, the schema that satisfies the Sleep executes the schema itself until after the Sleep is satisfied.

(2) It is assumed that, before the Sleep is satisfied, the Curiosity that is a high order primary emotion becomes short. However, since the Sleep is directly coupled to the individual preservation, the schema that satisfies the Sleep continues to execute itself until after the activity level of the Sleep becomes lower than a fixed value. Then, when the Sleep is satisfied to some degree, a schema for satisfying the Curiosity can be executed.

(3) It is assumed that a hand approaches the face of the robot rapidly during execution of the schema for satisfying the Curiosity. In response to this, the robot discriminates through color recognition and magnitude recognition that a skin color has approached the robot suddenly, and reflexively performs, as an innate reflexive motion, a motion of moving the face away from the hand, that is, pulling the head back. This reflexive motion corresponds to a vertebral reflex of an animal. Since the reflex is a schema of the lowest order, a reflex schema is executed first.

After the vertebral reflex, an emotion variation accompanying the same occurs, and it is determined from the magnitude of the variation and the activity levels of the other schemas whether or not an emotion development schema should be performed subsequently. If the emotion development schema should not be performed, then the schema for satisfying the Curiosity is continued.

(4) Although another schema in a lower order than a certain schema is selected with a higher degree of possibility than that of the certain schema, only when the activity level of the certain schema is extremely high, the certain schema can be executed to a fixed value while the lower order schema is suppressed (Concentration). When the Sleep is excessively short, even if it is desired to develop a behavior of a reflexive motion schema, the schema for satisfying the Sleep is executed preferentially until the fixed value is recovered.

E-2. Linkage with other Function Modules

Figure 37:
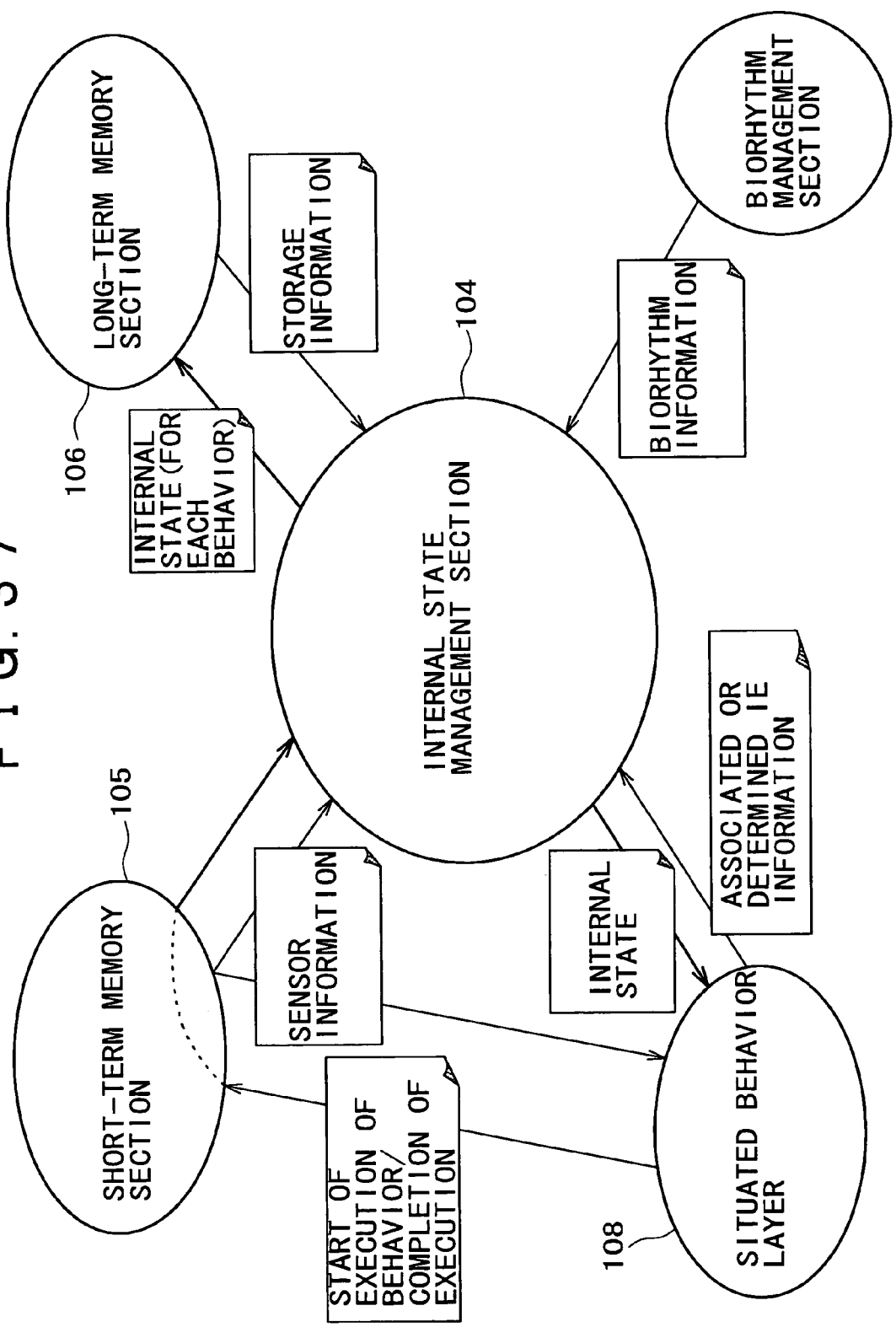
FIG. 37 is a flow diagram schematically illustrating communication paths between the internal state management section 104 and other function modules.

FIG. 37 schematically shows communication paths between the internal state management section 104 and other function modules.

The short-term memory section 105 outputs recognition results from the recognition function sections 101 to 103 for recognizing a variation of an external environment to the internal state management section 104 and the situated behavior layer 108.

The internal state management section 104 issues a notification of an internal state to the situated behavior layer 108. In response to the notification, the situated behavior layer 108 returns information of an associated or determined instinct or feeling.

Further, the situated behavior layer 108 selects a behavior based on activity levels calculated from an internal state and an external environment and notifies the internal state management section 104 of execution and completion of the selected motion through the short-term memory section 105.

The internal state management section 104 outputs internal states for each behavior to the long-term memory section 106. In response to the output, the long-term memory section 106 returns memory information.

The biorhythm management section supplies biorhythm information to the internal state management section 104.

E-3. Variation of the Internal States by Passage of Time

The indices to the internal states vary as time passes. For example, the Hunger (feeling of hunger), the Fatigue and the Sleep (sleepiness) that are primary emotions, that is, instincts, vary in the following manner as time passes.

Hunger: the hunger increases (virtual value or battery remaining amount)

Fatigue: the fatigue accumulates

Sleep: the sleepiness accumulates

Further, in the present embodiment, the Pleasantness (degree of satisfaction), the Activation (activity) and the Certainty (confidence factor) are defined as elements of the secondary emotions, that is, the feelings (Emotion) of the robot. However, they vary in the following manner as time passes.

Pleasantness: the pleasantness varies toward the Neutral

Activation: the activation relies upon the biorhythm and the Sleep (sleepiness)

Certainty: the certainty relies upon Attention

Figure 38:
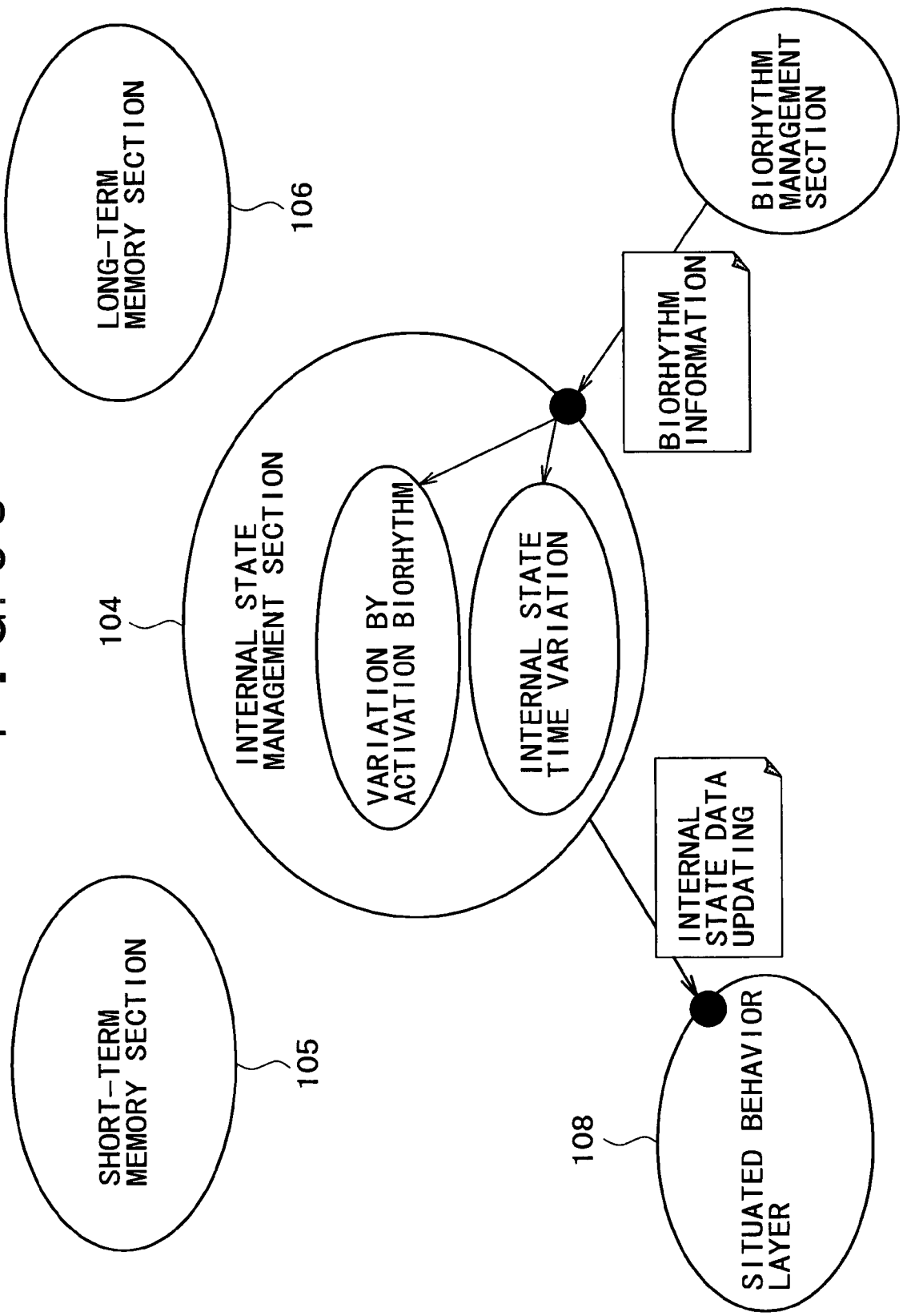
FIG. 38 is a diagrammatic view illustrating a mechanism wherein the internal state management section 104 varies an internal state in response to variation of time.

FIG. 38 shows a mechanism for allowing the internal state management section 104 to vary the internal states as time passes.

As seen in FIG. 38, the biorhythm management section issues a notification of biorhythm information in a fixed cycle. In contrast, the internal state management section 104 changes the values of the various elements of the primary emotions in accordance with the biorhythm and varies the Activation (activity) that is a secondary emotion. Then, every time a notification is received from the biorhythm management section, the situated behavior layer 108 receives the index values of the internal states such as an instinct and a feeling from the internal state management section 104.

Therefore, the situated behavior layer 108 calculates the activity levels of the schemas based on the internal states and can thereby select a behavior (schema) depending upon the situation.

E-4. Variation of an Internal State by Execution of a Motion

The internal states vary also by execution of a motion by the robot apparatus 1.

For example, in a schema for performing a behavior of "to sleep", the final target is a behavior of satisfying the Sleep (sleepiness) as a low order primary emotion. The situated behavior layer 108 calculates and compares the activity levels of the individual schemas based on the Sleep as a primary emotion and the Activation as a secondary emotion to select the "sleep" schema. As a result, a behavior to sleep is realized.

Meanwhile, the situated behavior layer 108 transmits completion of execution of the behavior of sleeping to the internal state management section 104 through the short-term memory section 105. In response to the notification, the internal state management section 104 changes the index value to the Sleep of a primary emotion as a result of the execution of the "sleeping" behavior.

Then, the situated behavior layer 108 calculates and compares the activity levels of the schemas again based on the degree with which the Sleep is not satisfied and the Activation as a secondary emotion. As a result, another schema whose priority has become high is selected, and the schema of sleeping is escaped.

Figure 39:
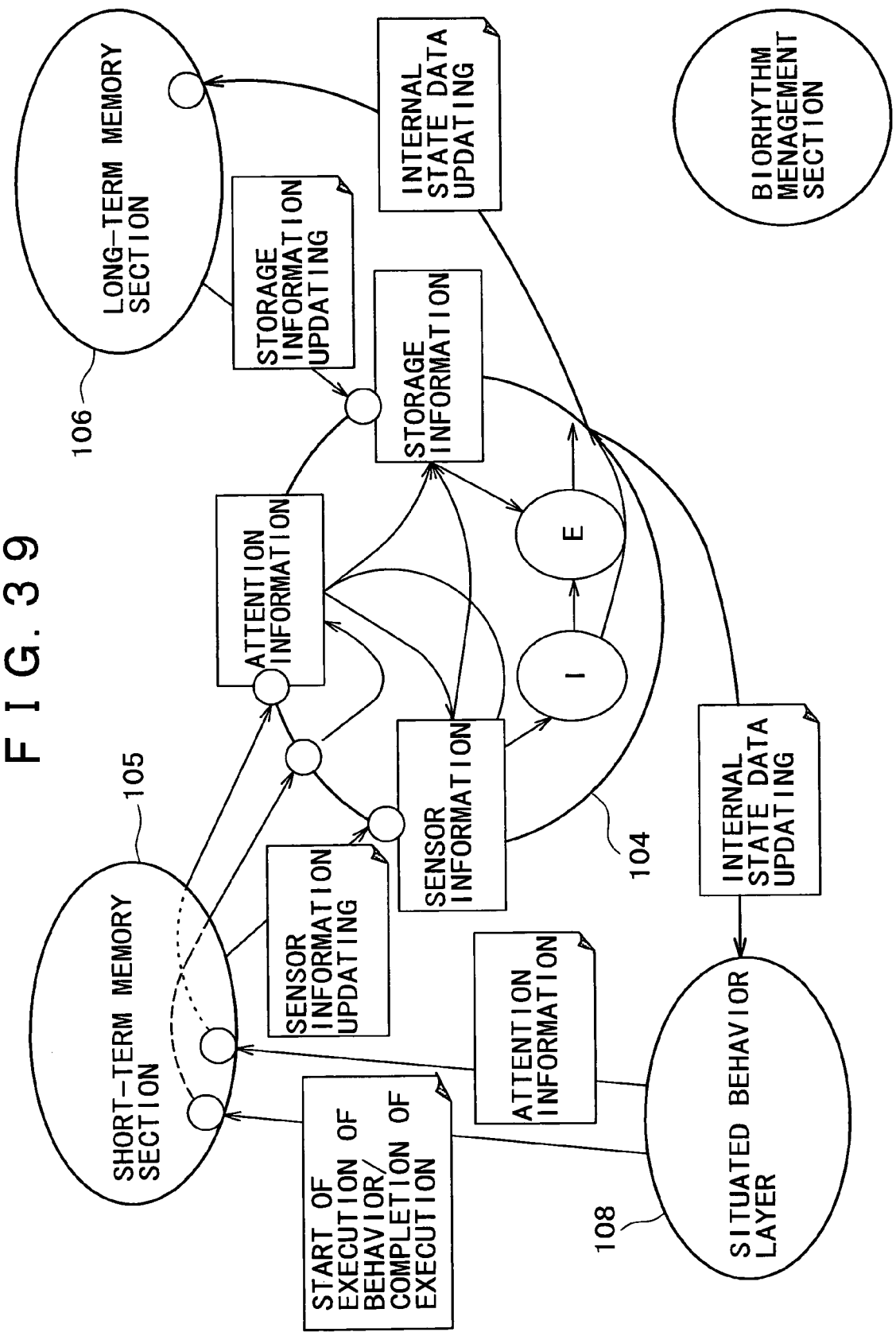
FIG. 39 is a diagrammatic view illustrating a mechanism wherein the internal state management section 104 varies an internal state in response to execution of a motion of the robot.

FIG. 39 illustrates a mechanism for varying an internal state of the internal state management section 104 through execution of a motion of the robot.

The situated behavior layer 108 notifies the internal state management section 104 of a start of execution and an end of execution of a selected situated motion and Attention information through the short-term memory section 105.

When the notification of execution completion information of the selected motion is received, the internal state management section 104 confirms an external environment acquired from the short-term memory section 105 and changes the index value to the instinct (Sleep) as a primary emotion in accordance with the Attention information. Together with this, the internal state management section 104 changes also the feeling as a secondary emotion. Then, the internal state management section 104 outputs the updated data of the internal states to the situated behavior layer 108 and the long-term memory section 106.

The situated behavior layer 108 calculates the activity levels of the schemas based on the newly received index values to the internal states to select a next situated behavior (schema).

The long-term memory section 106 updates the storage information thereof based on the updated data of the internal states and notifies the internal state management section 104 of the updated contents. The internal state management section 104 determines the confidence factor (Certainty) as a second emotion based on the confidence factor to the external environment and the confidence factor of the long-term memory section 106.

E-5. Variation an Internal State with Sensor Information

The degree of a motion when the robot executes the motion is recognized by the recognition function sections 101 to 103 and conveyed to the internal state management section 104 through the short-term memory section 105. The internal state management section 104 can reflect the motion degree, for example, as Fatigue on the variation of the primary emotion. Further, also a secondary emotion can be varied in response to the variation of the primary emotion.

Figure 40:
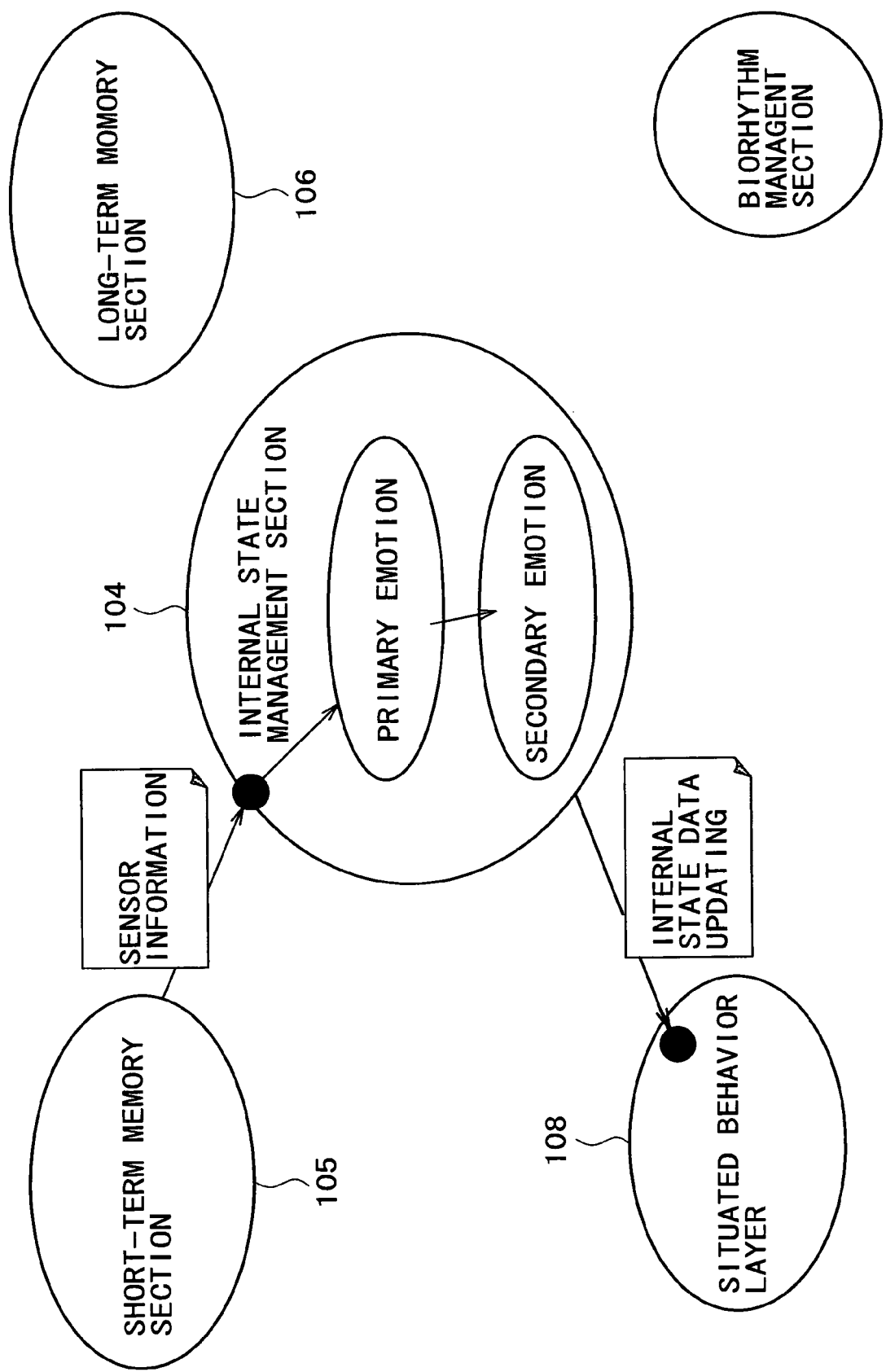
FIG. 40 is a diagrammatic view illustrating a mechanism wherein the internal state management section 104 varies an internal state in response to a result of recognition of an external environment.

FIG. 40 illustrates a mechanism for allowing the internal state management section 104 to vary an internal state with a recognition result of an external environment.

When a recognition result from any of the recognition function sections 101 to 103 is received through the short-term memory section 105, the internal state management section 104 changes the index value to the primary emotion and changes also the feeling as a secondary emotion. Then, the internal state management section 104 outputs the updated data of the internal states to the situated behavior layer 108.

The situated behavior layer 108 can calculate the activity levels of the schemas based on the newly received index values to the internal states and select a next situated behavior (schema).

E-6. Variation of an Internal State by Association

As described hereinabove, in the robot according to the present embodiment, the long-term memory section 106 has an associative memory function. The associative memory is a mechanism wherein input patterns each formed from a plurality of symbols are stored as storage patterns and a pattern similar to a certain one of the storage patterns is recalled, and a variation of an internal state can be associatively stored from an external stimulus.

For example, a case wherein a variation of an emotion of "happy" occurs when an apple is observed is examined.

When an apple is recognized by the visual recognition function section 101, this is conveyed as a variation of an external environment to the situated behavior layer 108 through the short-term memory section 105.

The long-term memory section 106 can recall, through associative memory regarding an "apple", a behavior "to eat (an apple)" and a variation of an internal state that, when the robot eats the apple, the primary emotion (feeling of hunger) is satisfied by 30 in index value.

When the storage information is received from the long-term memory section 106, the situated behavior layer 108 issues a notification of the variation $\Delta I=30$ of the internal state to the internal state management section 104.

The internal state management section 104 calculates the variation amount $\Delta E$ of the secondary emotion based on the variation $\Delta I$ conveyed thereto and can thereby acquire the index value to the secondary emotion E originating from the eating of the apple.

Figure 41:
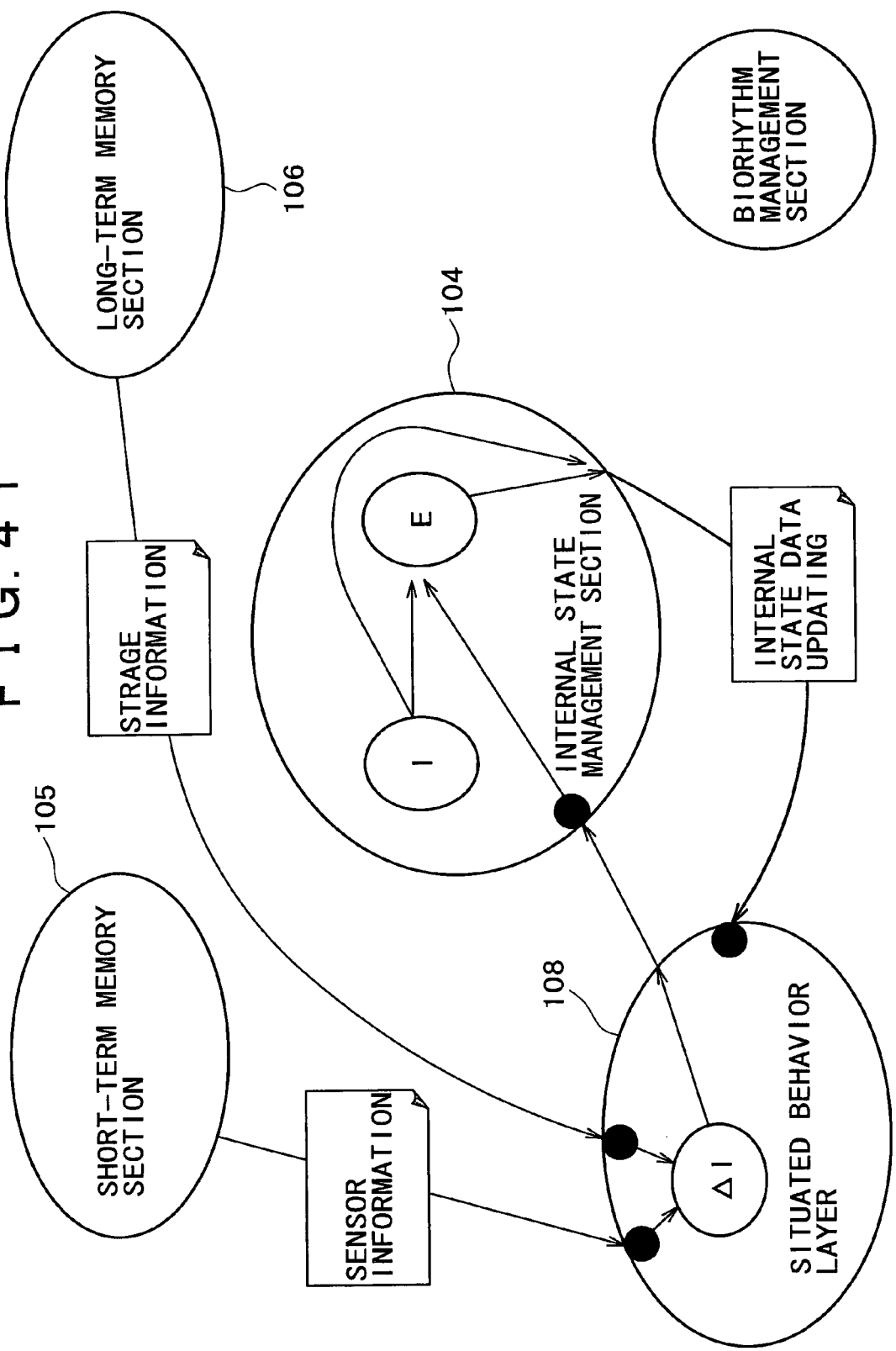
FIG. 41 is a diagrammatic view illustrating a mechanism wherein the internal state management section 104 varies an internal state by associative memory.

FIG. 41 illustrates a mechanism for allowing the internal state management section 104 to vary an internal state by associative memory.

A notification of an external environment is issued to the situated behavior layer 108 through the short-term memory section 105. A behavior suitable for the external environment and the variation $\Delta I$ of the primary emotion can be recalled by the associative memory function of the long-term memory section 106.

The situated behavior layer 108 selects a behavior based on the storage information obtained by the associative memory and issues a notification of the variation $\Delta I$ of the primary emotion to the internal state management section 104.

The internal state management section 104 calculates the variation $\Delta E$ of the secondary emotion based on the variation $\Delta I$ of the primary emotion conveyed thereto and an index value to the primary emotion managed thereby and varies the secondary emotion with the variation $\Delta E$. Then, the internal state management section 104 outputs the newly generated primary emotion and secondary emotion as internal state updated data to the situated behavior layer 108.

The situated behavior layer 108 calculates the activity levels of the schemas based on the newly received index values to the internal states and can thereby select a next situated behavior (schema).

E-7. Variation of an Internal State by an Innate Behavior

It is described hereinabove that the robot according to the present embodiment varies an internal state thereof by execution of a motion (refer to FIG. 39). In this instance, a behavior is selected based on index values to internal states including primary emotions and secondary emotions, and the emotions are satisfied by completion of execution of the behavior. On the other hand, in the robot according to the present embodiment, also innate reflexive motions that do not rely upon any emotion are defined. In this instance, a reflexive motion is selected directly in response to a variation of an external environment, and this is caused by a mechanism different from that of an internal variation by execution of an ordinary motion.

For example, a case wherein an innate reflexive behavior is taken when something large appears suddenly is examined.

In such an instance, a recognition result (sensor information) of "something large" by the visual recognition function section 101 is inputted directly to the situated behavior layer 108 without by way of the short-term memory section 105.

The situated behavior layer 108 calculates the activity levels of the schemas in response to the external stimulus of "something large" and selects a suitable behavior (refer to FIGS. 15, 25 and 26). In this instance, the situated behavior layer 108 selects a vertebral reflexive behavior of "to dodge" and determines a secondary emotion of "to be surprised", and then issues a notification of the selection to the internal state management section 104.

The internal state management section 104 outputs the secondary information sent thereto from the situated behavior layer 108 as a feeling of the internal state management section 104.

Figure 42:
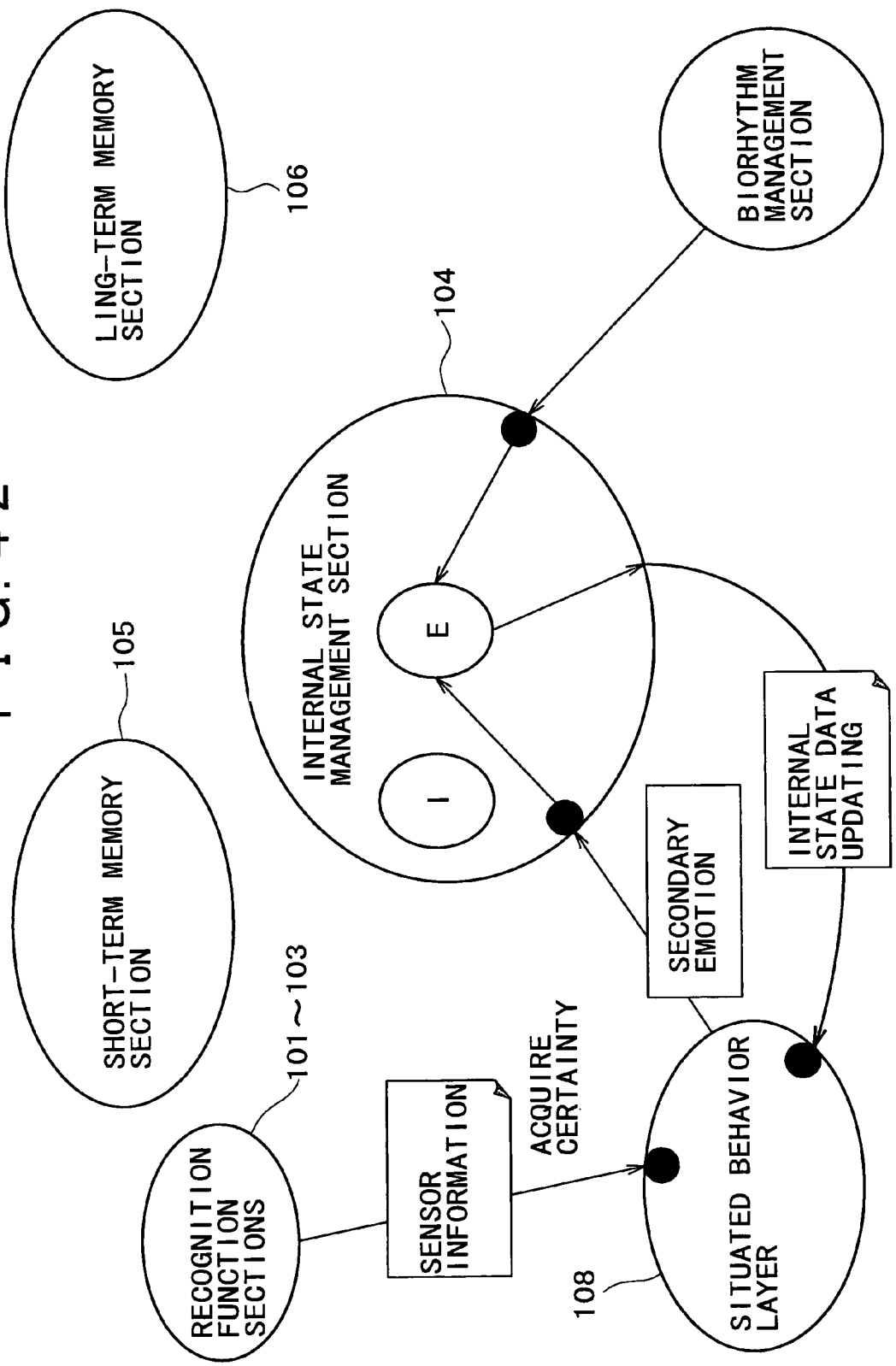
FIG. 42 is a diagrammatic view illustrating a mechanism wherein the internal state management section 104 varies an internal state in response to an innate reflexive motion.

FIG. 42 illustrates a mechanism for allowing the internal state management section 104 to vary an internal state by an innate reflexive behavior.

When an innate reflexive behavior is to be performed, sensor information by any of the recognition function sections 101 to 103 is inputted directly to the situated behavior layer 108 without by way of the short-term memory section 105.

The situated behavior layer 108 calculates the activity levels of the schemas based on the external stimulus acquired as sensor information to select a suitable motion and determines a secondary emotion. Then, the situated behavior layer 108 notifies the internal state management section 104 of the determined secondary emotion.

The internal state management section 104 outputs the secondary emotion sent thereto from the situated behavior layer 108 as a feeling of the internal state management section 104. Further, the internal state management section 104 determines a final Activation depending upon the magnitude of the biorhythm in response to the Activation from the situated behavior layer 108.

The situated behavior layer 108 calculates the activity levels of the schemas based on the newly received index values to the internal states and can thereby select a next situated motion (schema).

E-8. Relationship between a Schema and the Internal State Management Section

The situated behavior layer 108 is composed of a plurality of schemas, and calculates an activity level for each schema based on an external stimulus or a variation of an internal state. Then, the situated behavior layer 108 selects one of the schemas in response to the degrees of the activity levels to execute a behavior (refer to FIGS. 18, 19 and 25).

Figure 43:
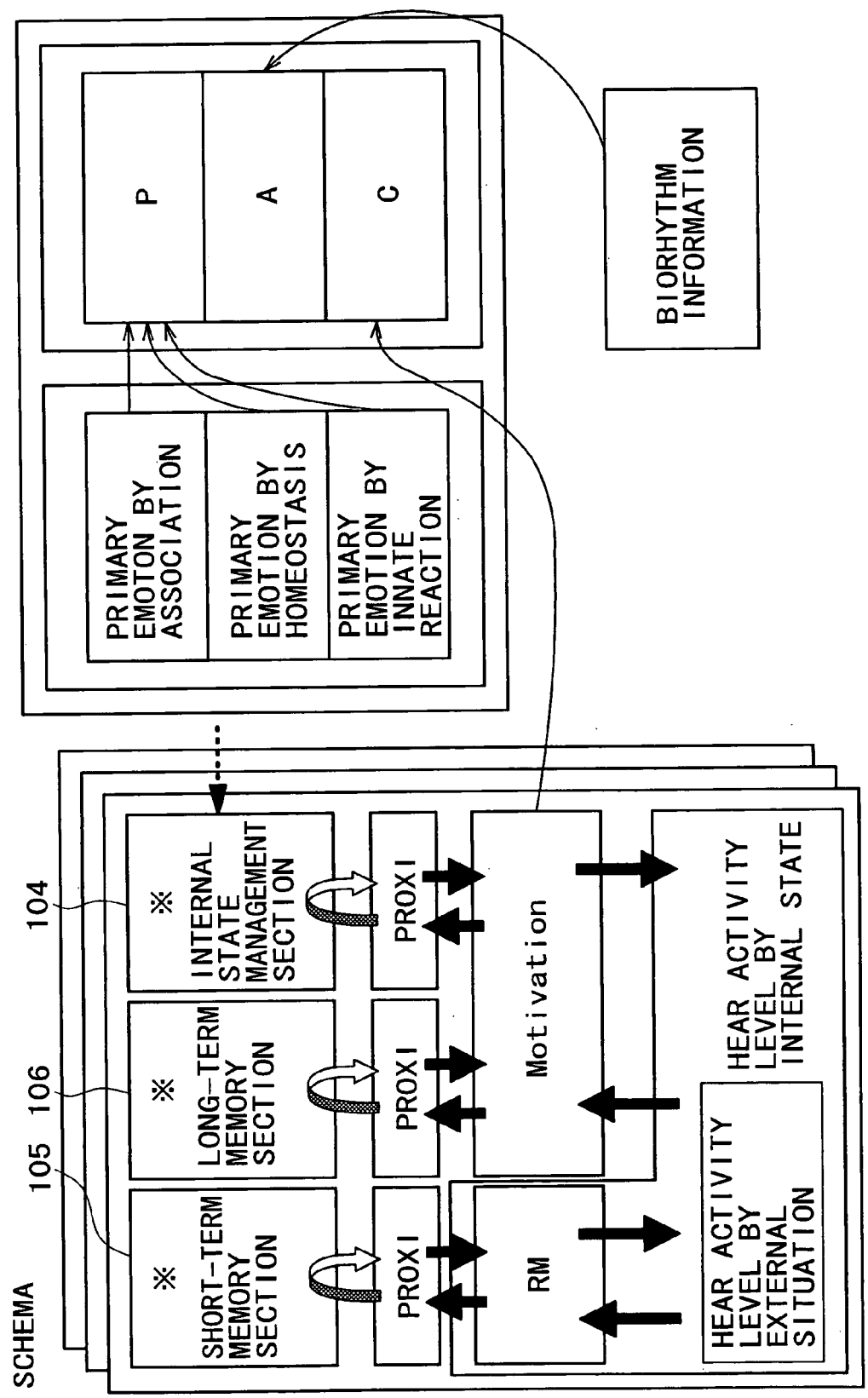
FIG. 43 is a diagrammatic view schematically illustrating a relationship between a schema and the internal state management section.

FIG. 43 schematically illustrates a relationship between a schema and the internal state management section.

Each schema can communicate with an external object such as the short-term memory section 105, long-term memory section 106 or internal state management section 104 through a proxi such as the DSubject or the DObject (refer to FIG. 30).

Each schema includes class objects for calculating an activity level depending upon an external stimulus or a variation of an internal state. The RM (Resource Management) object communicates with the short-term memory section 105 through a proxi to acquire an external environment and calculates an activity level based on the external environment. Meanwhile, the Motivation calculation class object communicate with the long-term memory section 106 and the internal state management section 104 each through a proxi to acquire a variation amount of an internal state and calculates an activation level, that is, Motivation, based on the internal state. A method of calculating the Motivation is hereinafter described in detail.

The internal state management section 104 is structured hierarchically from primary emotions and secondary emotions as described hereinabove. The primary emotions are hierarchically and dimensionally divided into a primary emotion layer by an innate reaction, primary emotions by homeostasis and primary emotions by association (refer to FIG. 36). Further, feelings as secondary emotions are mapped to three factors of P (Pleasantness), A (Activity) and C (Concentration).

The variations ΔI of the primary emotions in the layers are all inputted to the secondary emotions and utilized for calculation of a variation ΔP of the Pleasantness.

The Activity is discriminated integrally from information such as the sensor inputs, operation time and the biorhythm.

Further, the confidence factor of a selected schema is used as the confidence factor of the actual secondary emotion layer.

Figure 44:
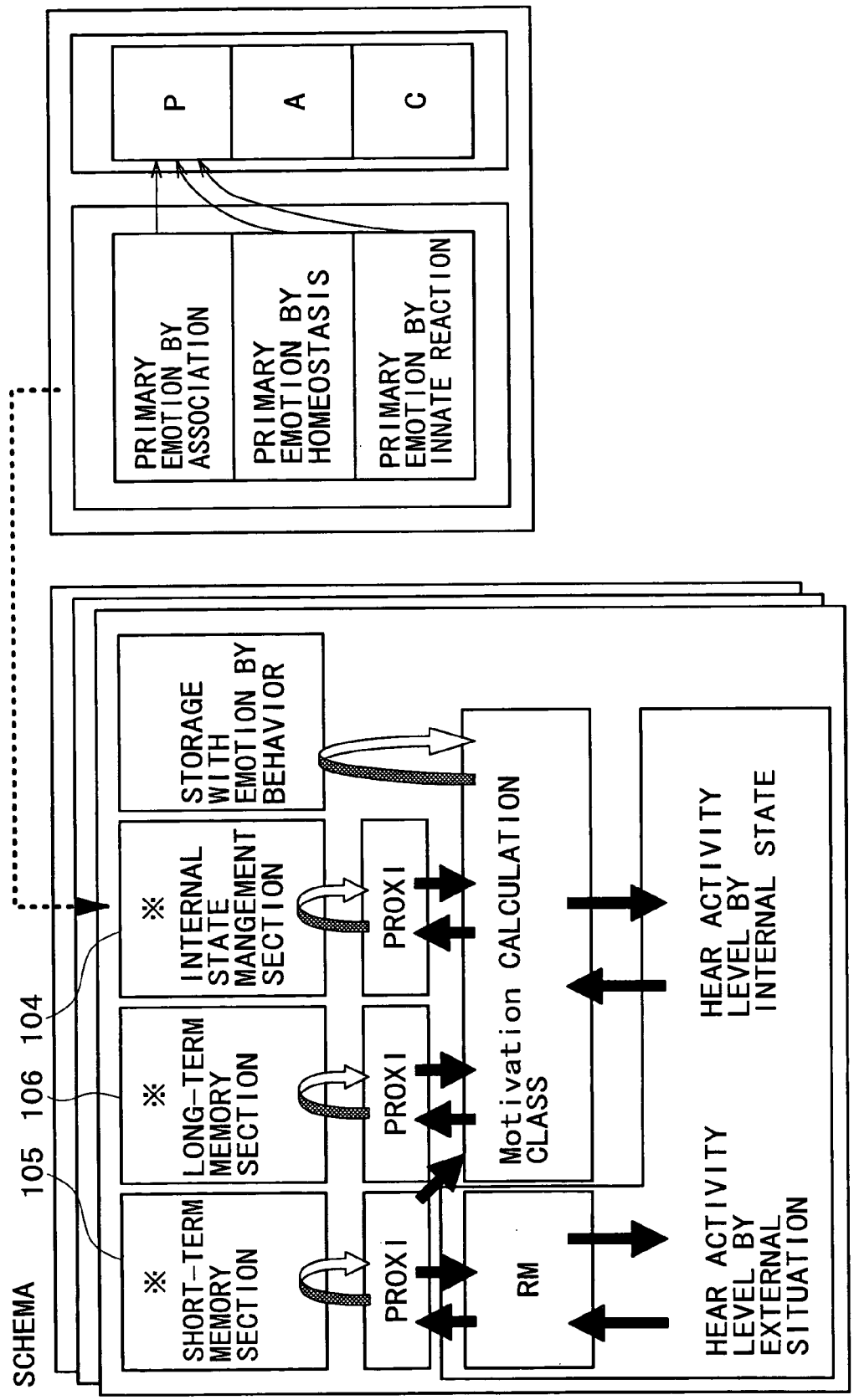
FIG. 44 is a diagrammatic view schematically illustrating a Motivation calculation path by a Motivation calculation class object.

FIG. 44 schematically illustrates a Motivation calculation path by the Motivation calculation class object.

The RM class object accesses the short-term memory section 105 through a proxi to acquire the sensor information and evaluates an activity level by an external stimulus based on a strength of a stimulus such as a recognized distance or size of an object article.

Meanwhile, the Motivation calculation class object accesses the short-term memory section 105 through a proxi to acquire a characteristic regarding the object article. Further, the Motivation calculation class object issues an inquiry for a characteristic of the object article to the long-term memory section 106 through a proxi to acquire a variation of an internal state. Then, the Motivation calculation class object accesses the internal state management section 104 through a proxi and calculates an internal evaluation value in the inside of the robot. Accordingly, the calculation of the Motivation is independent of the strength of an external stimulus.

The behavior control system for a robot according to the present invention uses associative memory to recall a variation of an internal state from an external state to calculate a secondary emotion to perform behavior selection as described hereinabove (refer to FIG. 41). Further, a variation of an internal state that differs among different object articles can be recalled using the associative memory. Consequently, even if it is under the same situation, the facility in development of the motion can be made different. In other words, a behavior can be selected taking not only an external stimulus, a physical situation and a current internal state but also memory for each object article of the robot into consideration. Thus, variegated and diversified countermeasures can be anticipated.

For example, when the robot does not perform a fixed behavior depending upon an external environment or an internal state like "the robot performs ×× since it sees ○○" or "the robot performs ×× (for everything) since it currently lacks in ○○" but uses variation memory of an internal state regarding an object article like "even if the robot sees ○○, it performs □□ because of ΔΔ" or "even if the robot sees ○○, it performs ■■ because of ××", then various behaviors can be achieved.

Figure 45:
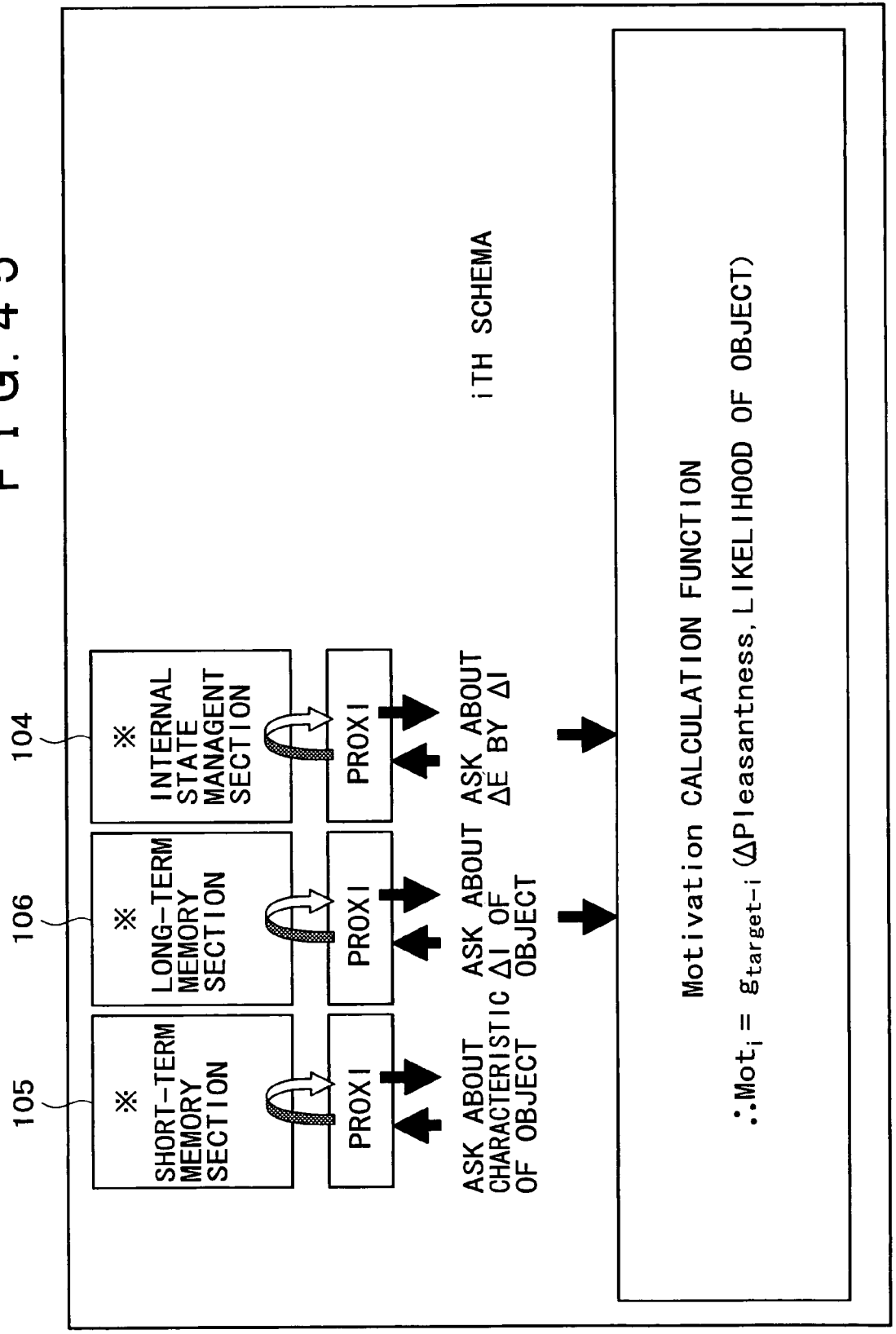
FIG. 45 is a diagrammatic view schematically illustrating a mechanism of a Motivation calculation process when an object article is present.

FIG. 45 schematically illustrates a mechanism for a Motivation calculation process when an object article is present.

First, the Motivation calculation class object accesses the short-term memory section 105 to inquire for a characteristic of a target recognized by any of the recognition function sections 101 to 103.

Then, the Motivation calculation class object accesses the long-term memory section 106 through a proxi by using a thus fetched characteristic to acquire in what manner the object article of the characteristic varies a desire relating to the schema, that is, a variation ΔI of a primary emotion.

Then, the Motivation calculation class object accesses the internal state management section 104 through a proxi to extract in what manner the value of pleasantness changes with a variation of the desire, that is, a variation ΔPleasant of a secondary emotion.

Then, the Motivation calculation class object calculates the ith Motivation using the following Motivation calculation function $g_{target-i}$ which uses the variation ΔPleasant of the secondary emotion and the confidence factor of the object article as arguments:

$$Mot_i = g_{target-i}(\Delta Pleasantness, \text{likelihood of object article})$$

Figure 46:
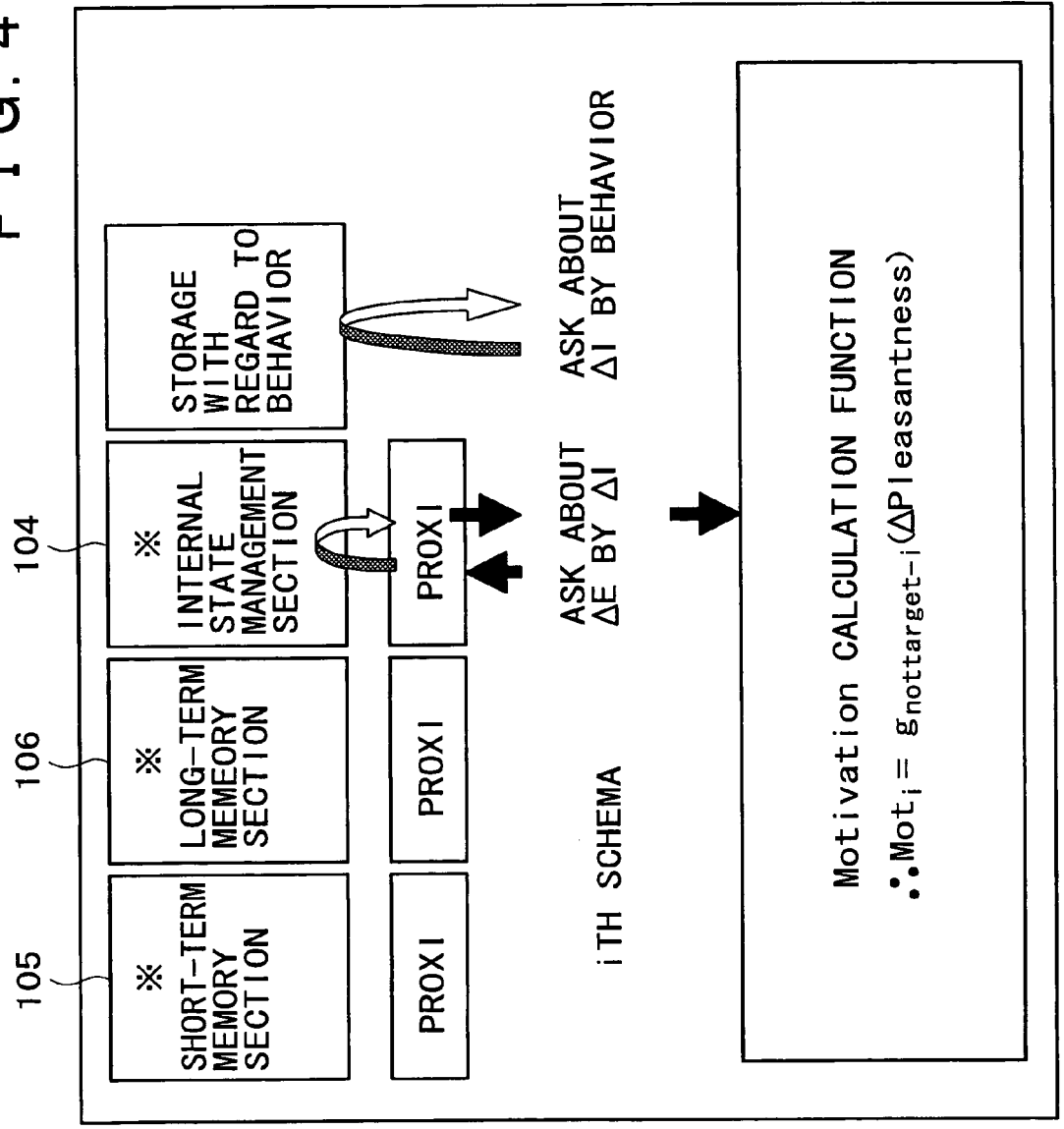
FIG. 46 is a diagrammatic view schematically illustrating a mechanism of the Motivation calculation process when an object article is not present.

FIG. 46 schematically illustrates a mechanism of a Motivation calculation process when no object article is present.

In this instance, the Motivation calculation class object first inquires the memory of a behavior for a variation ΔI of a desire by the behavior.

Then, the Motivation calculation class object extracts a variation ΔPleasant of a secondary emotion when the primary emotion varies by ΔI from the internal state management section 104. Then, in this instance, the Motivation calculation class object calculates the ith Motivation using the following motivation calculation function $g_{nottarget-i}$ that uses the variation ΔPleasant of the secondary emotion as an argument:

$$Mot_i = g_{nottarget-i}(\Delta Pleasantness)$$

E-9. Changing Method of Elements of the Secondary Emotions

Figure 47:
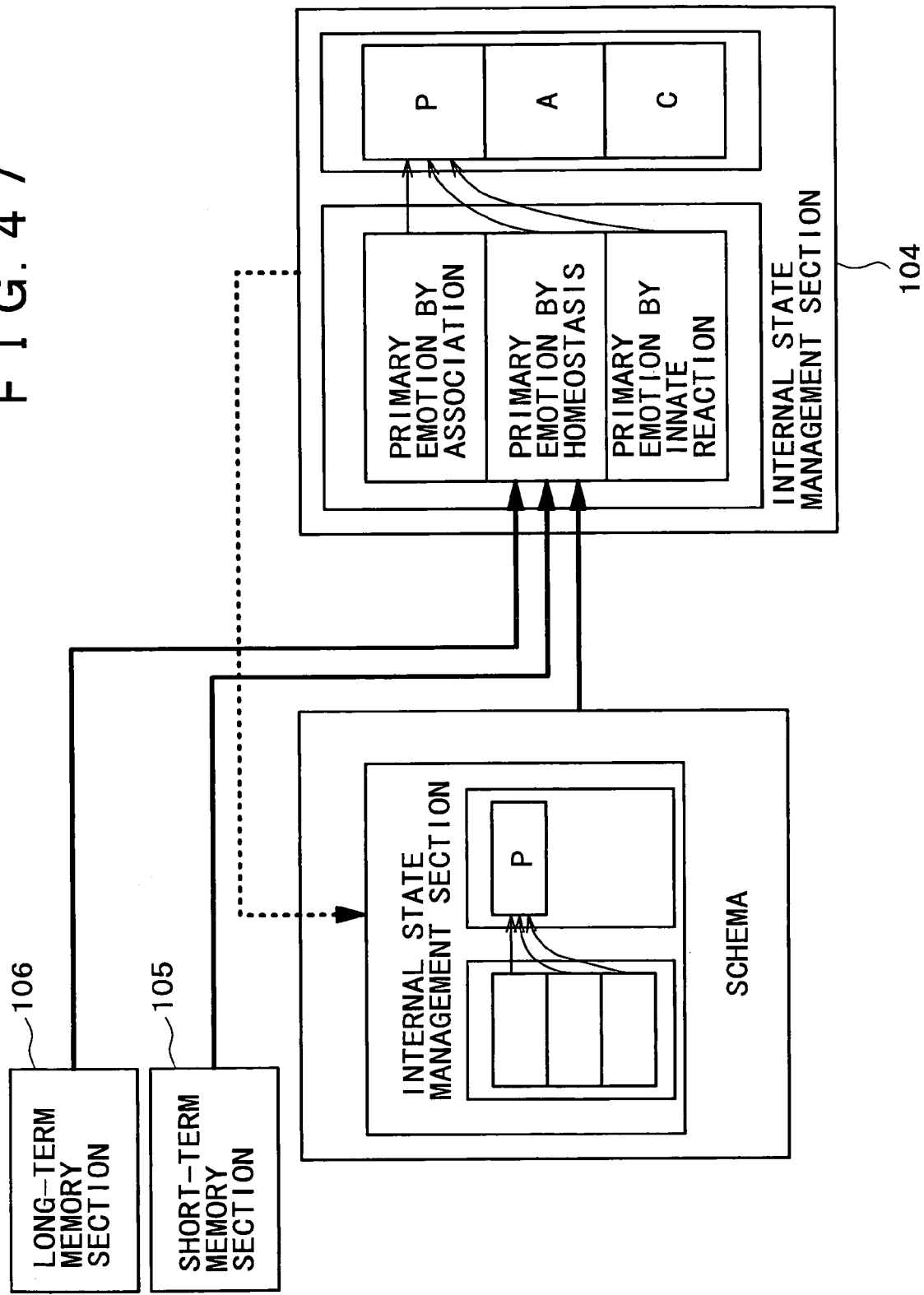
FIG. 47 is a diagrammatic view illustrating a method of changing Pleasantness.

FIG. 47 illustrates a mechanism for changing the Pleasantness among the secondary emotions.

The long-term memory section 106 inputs a variation of a primary emotion caused by an amount of memory to the internal state management section 104. The short-term memory section 105 inputs a variation of the primary variation caused by the sensor inputs from the recognition function sections 101 to 103 to the internal state management section 104.

Further, the schema inputs variations (Nourishment, Moisture, Sleep) of primary emotions caused by execution of the schema and a variation (Affection) of a primary emotion caused by contents of the schema to the internal state management section 104.

The Pleasantness is determined depending upon a variation in excess/deficiency of the primary emotions.

Figure 48:
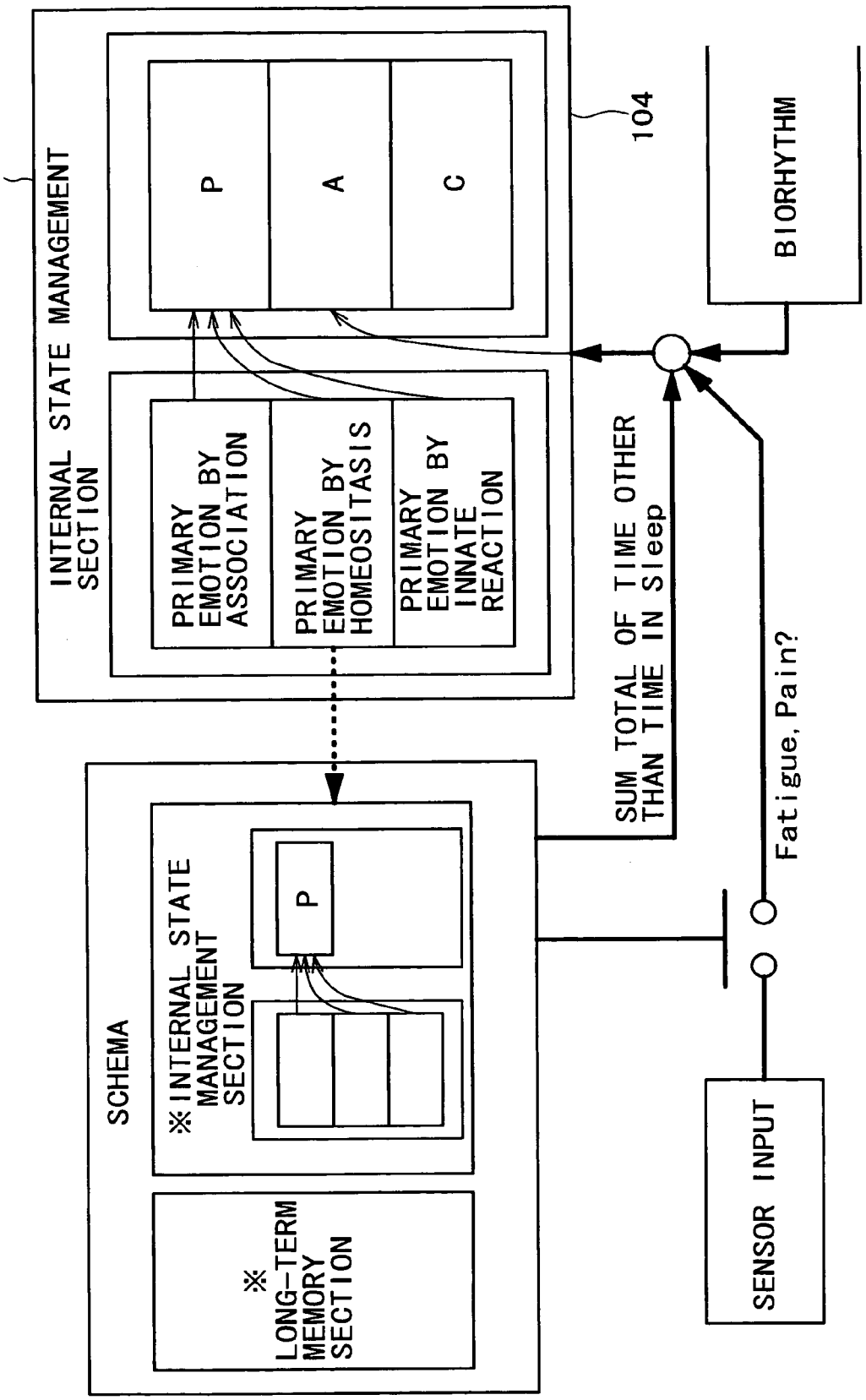
FIG. 48 is a diagrammatic view illustrating a method of changing Activity.

FIG. 48 illustrates a mechanism for changing the Activity among the secondary emotions.

The Activity is determined integrally based on the sum total of time of the schema other than time relating to the Sleep, the biorhythm and the sensor inputs.

Figure 49:
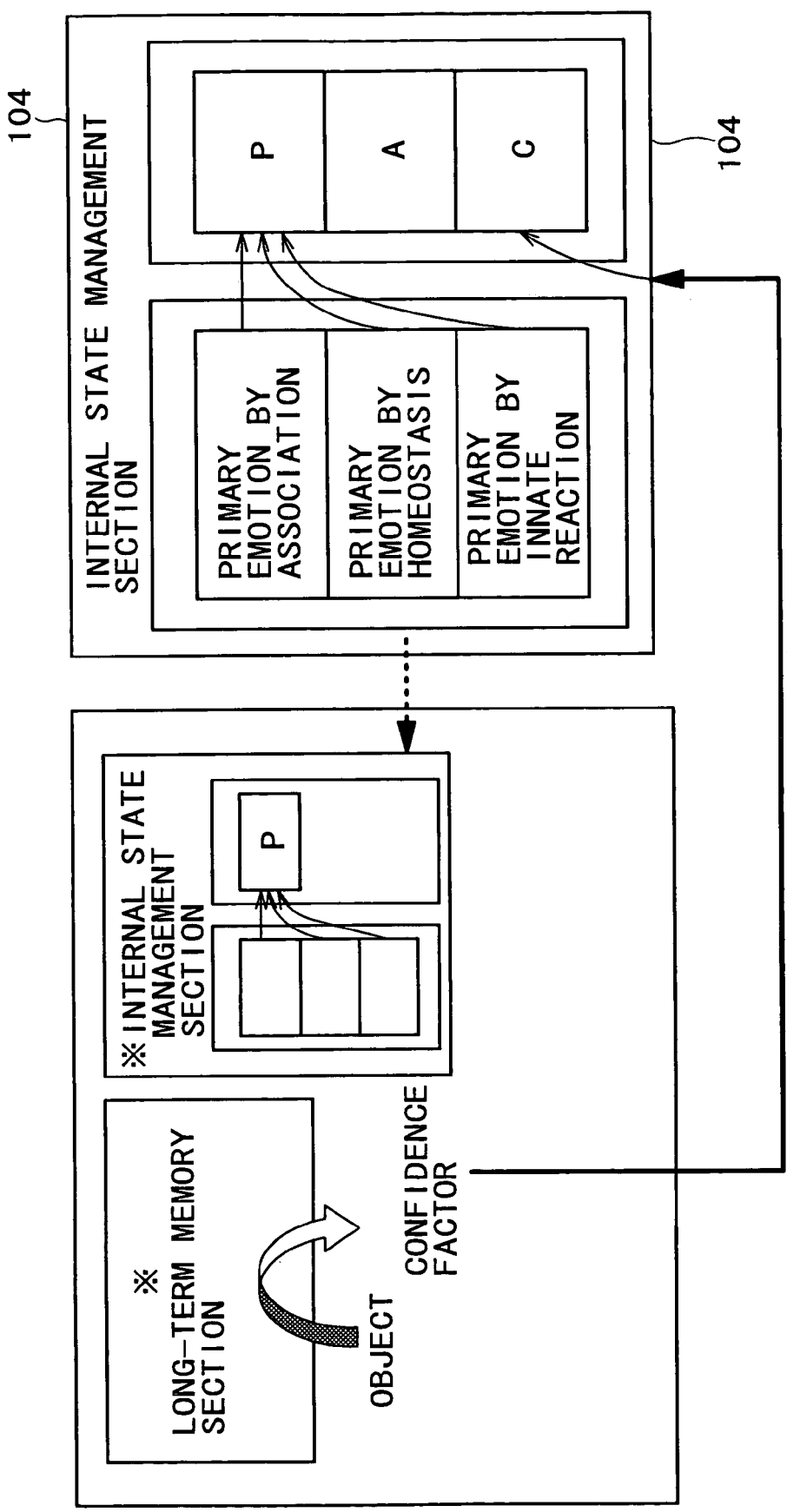
FIG. 49 is a diagrammatic view illustrating a method of changing Certainty.

FIG. 49 illustrates a mechanism for changing the Certainty among the secondary emotions.

When an inquiry for an object article is issued to the long-term memory section 106, the Certainty is returned. Which one of the primary emotions should be noticed relies upon a target behavior of the schema. Then, the extracted Certainty makes the Certainty of the secondary emotion of the internal state management section 104 as it is.

Figure 50:
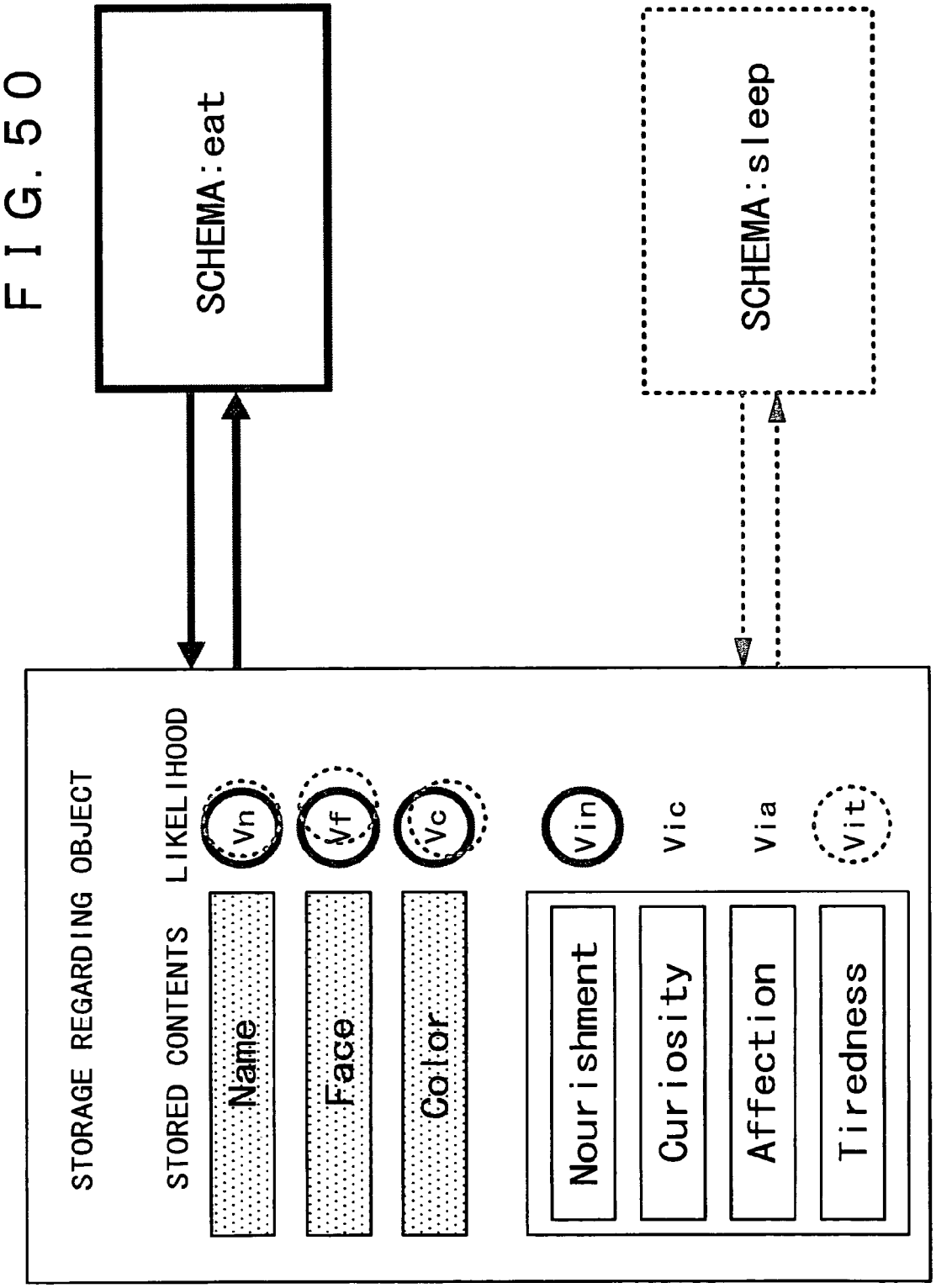
FIG. 50 is a diagrammatic view illustrating a mechanism for determining the Certainty.

FIG. 50 schematically illustrates a mechanism for determining the Certainty.

The long-term memory section 106 stores, for each schema, recognition results regarding an object article or likelihood of such items as the emotions.

A schema issues an inquiry for the likelihood value of memory relating to the schema to the long-term memory section 106. In response to the inquiry, the long-term memory section 106 supplies the likelihood of the memory relating to the schema as likelihood of the object article.

Supplement

The present invention has been described in detail above with reference to a particular embodiment. However, it is apparent that those skilled in the art may modify or alter the embodiment without departing from the spirit and the scope of the present invention.

The subject matter of the present invention is not necessarily limited to products called "robot". In particular, the present invention can be applied similarly to any mechanical apparatus which makes use of electrical or mechanical actions to perform a movement similar to a motion of a human being even if it is a product which belongs to any other industrial field such as, for example, a toy.

In summary, the present invention has been disclosed by way of illustration, and the disclosed contents of the present specification shall not be interpreted restrictively. In order to determine the subject matter of the present invention, the claims appearing at the top of the specification should be referred.

INDUSTRIAL APPLICABILITY

According to the present invention, a superior behavior control system and behavior control method for a robot and robot apparatus by which a robot can perform an autonomous motion and achieve realistic communication can be provided.

Further, according to the present invention, a superior behavior control system and behavior control method for a robot and robot apparatus by which a robot can integrally discriminate a situation in which it is placed such as a result of recognition of an external environment through a visual sense or an auditory sense or an internal state such as an instinct or a feeling to select a behavior can be provided.

Furthermore, according to the present invention, a superior behavior control system and behavior control method for a robot and robot apparatus by which a robot can integrally discriminate a situation in which it is placed such as a result of recognition of an external environment through a visual sense or an auditory sense or an internal state such as an instinct or a feeling to select a behavior can be provided.

Further, according to the present invention, a superior behavior control system and behavior control method for a robot and robot apparatus by which existence significance regarding emotions is made more definite so that a robot can suitably select and execute a behavior suitable for an external stimulus or an internal state under fixed order can be provided.

According to the present invention, emotions are divided into a plurality of hierarchical layers depending upon the significance of presence thereof, and a motion is determined in each of the layers. It is determined which one of a plurality of such determined motions should be selectively performed depending upon an external environment and an internal state at the time. Further, while a motion is selected in each of the layers, the order in which the motions should be performed is based on the priority order of the internal states of the robot. Therefore, the motions are developed preferentially beginning with that of a comparatively low layer so that an instinctive motion such as reflex and a higher order behavior such as selection of a motion through use of memory can be developed without a contradiction on a single individual. Further, this makes a definite index also when behaviors are categorized to generate schemas.

Further, according to the behavior control system and the behavior control method for a robot according to the present invention, since a variation of an internal state that differs among different object articles can be recalled using associative memory, even if it is under the same situation, the facility in development of a motion can be made different. In other words, a behavior can be selected taking not only an external stimulus or physical situation and a current internal state but also memory for each object article of the robot into consideration. Consequently, variegated and diversified countermeasures can be anticipated.

For example, if the robot does not perform a fixed behavior depending upon an external environment or an internal state like "the robot performs ×× since it sees ○○" or "the robot performs ×× (for everything) since it currently lacks in ○○" but uses variation memory of an internal state regarding an object article like "even if the robot sees ○○, it performs □□ because of ΔΔ" or "even if the robot sees ○○, it performs ■■ because of ××", then various behaviors can be achieved.

The invention claimed is:

1. A behavior control system for a robot apparatus that operates autonomously, comprising:

a plurality of behavior description sections for describing motions of a machine body of said robot;

an external environment recognition section for recognizing an external environment of said machine body;

an internal state management section for managing an internal state of said robot in response to the recognized external environment and/or a result of execution of a behavior, and for managing emotions each of which is an index to the internal state in a hierarchical structure having a plurality of layers; and a behavior evaluation section for evaluating execution of behaviors described in said behavior description sections in response to the external environment and/or the internal state, wherein said behavior description sections are arranged in a tree structure form in accordance with implementation levels of the machine body motions, wherein said behavior evaluation section simultaneously and concurrently evaluates a plurality of ones of said behavior description sections from above to below in the tree structure, and wherein said internal state management section divides the emotions into a layer of primary emotions necessary for individual preservation and another layer of secondary emotions which vary depending upon excess/deficiency of the primary emotions, and further divides the primary emotions into low order primary emotions by innate reaction, high order primary emotions by homeostasis and primary emotions by association.

2. A behavior control system for a robot according to claim 1, wherein said external environment recognition section performs at least one of visual recognition of the outside, auditory recognition of sound generated outside said robot and contact recognition of contact applied from the outside to said robot.

3. A behavior control system for a robot according to claim 1, wherein said internal state management section manages an instinct model and/or a feeling model of said robot.

4. A behavior control system for a robot according to claim 1, further comprising:

a behavior selection section for selectively executing, when evaluation of each of said behavior description sections is performed by said behavior evaluation section in response to new recognition by said external environment recognition section and/or a variation of the internal state by said internal state management section, a behavior described in the behavior description section based on the evaluation values.

5. A behavior control system for a robot according to claim 4, further comprising:

a resource management section for managing conflict of a resource on said machine body when behaviors described in a plurality of ones of said behavior description sections are executed simultaneously, said behavior selection section permits said resource management section to simultaneously select two or more ones of said behavior description sections in response to a conflict relationship of a resource.

6. A behavior control system for a robot according to claim 4, wherein, when a result of execution of evaluation for each of said behavior description sections by said behavior evaluation section based on new recognition by said external environment recognition section reveals appearance of a behavior description section which exhibits an evaluation value higher than that of the behavior being currently executed, said behavior selection section stops the behavior being currently executed and preferentially executes the behavior described in the behavior description section having the higher evaluation value.

7. A behavior control system for a robot according to claim 6, wherein said behavior selection section causes the behavior stopped once to be resumed after the behavior executed preferentially comes to an end.

8. A behavior control system for a robot according to claim 4, wherein said behavior selection section can successively select a same one of said behavior description sections in response to a variation of each different external environment, and said behavior control system further comprises a working space management section for allocating an individual working space for each external environment every time the behavior described in the behavior description section is executed.

9. A behavior control system for a robot that operates autonomously, comprising:

one or more behavior modules each including a state machine which describes a motion of a machine body of said robot and a behavior evaluator for evaluating an activity level of a current machine body motion state of said state machine and a machine body resource to be used upon starting of the machine body motion state;

a behavior state control section for issuing an instruction to calculate an activity level and a use resource to said behavior evaluator of each of said behavior modules, selecting one of said behavior modules to be activated in response to the activity levels and the use resources of said behavior modules and issuing an instruction to said state machine of the selected behavior module to execute the state machine thereby to control behavior states of said behavior modules, and an internal state management section for managing emotions each of which is an index to an internal state of the robot in a hierarchical structure having a plurality of layers, wherein said internal state management section divides the emotions into a layer of primary emotions necessary for individual preservation and another layer of secondary emotions which vary depending upon excess/deficiency of the primary emotions, and further divides the primary emotions into low order primary emotions by innate reaction, high order primary emotions by homeostasis and primary emotions by association.

10. A behavior control system for a robot according to claim 9, wherein said behavior evaluator evaluates the activity level of said state machine in response to an external environment of said machine body and/or an internal state of said robot.

11. A behavior control system for a robot according to claim 9, wherein said behavior modules are arranged in a tree structure form in accordance with implementation levels of the machine body motions, and said behavior state control section is mounted in each of said behavior modules and issues an instruction to evaluate the activity level and the use resource, an instruction to select a behavior module and an instruction to execute the state machine to another one of said behavior modules which is positioned in a lower order in the tree structure.

12. A behavior control system for a robot according to claim 9, wherein said behavior state control section places one of said behavior modules whose activity level exhibits a drop from an active state into a standby state, and places another one of said behavior modules whose activity level exhibits a rise from a standby state into an active state.

13. A behavior control system for a robot according to claim 12, further comprising:

means for storing, when any of said behavior modules is placed from an active state into a standby state, data necessary to resume the behavior module and activating a behavior necessary to place the behavior model into a standby state; and means for regenerating, when the behavior model is placed back from the standby state into the active state, the stored data to initialize the state of the behavior module and activating a motion necessary to place the behavior module into the active state.

14. A behavior control system for a robot that operates autonomously, comprising:
one or more behavior modules each formed from a combination of a command for causing said robot to move and a behavior evaluator for evaluating a resource of a machine body of said robot necessary to execute the command;
means for detecting a machine body resource or resources in a released state;
means for selectively activating those of said behavior modules which can be executed with the released machine body resources in accordance with a predetermined priority order;
two or more ones of said behavior modules with which conflict of a resource does not occur being capable of being executed concurrently; and
an internal state management section for managing emotions each of which is an index to an internal state of the robot in a hierarchical structure having a plurality of layers,
wherein said internal state management section divides the emotions into a layer of primary emotions necessary for individual preservation and another layer of secondary emotions which vary depending upon excess/deficiency of the primary emotions, and further divides the primary emotions into low order primary emotions by innate reaction, high order primary emotions by homeostasis and primary emotions by association.

15. A behavior control system for a robot that operates autonomously in response to an internal state thereof, comprising:
an internal state management section for managing emotions each of which is an index to the internal state in a hierarchical structure having a plurality of layers; and
a behavior selection section for selectively executing a behavior for satisfying one of the emotions in each of said layers,
wherein said internal state management section divides the emotions into a layer of primary emotions necessary for individual preservation and another layer of secondary emotions which vary depending upon excess/deficiency of the primary emotions, and further divides the primary emotions into low order primary emotions by innate reaction, high order primary emotions by homeostasis and primary emotions by association.

16. A behavior control system for a robot according to claim 15, wherein
said behavior selection section preferentially selects a behavior which satisfies a comparatively low order primary emotion.

17. A behavior control system for a robot according to claim 16, wherein
said behavior selection section suppresses selection of a behavior which satisfies a comparatively low order primary emotion where a comparatively high order primary emotion exhibits significant shortage when compared with the comparatively low order primary emotion.

18. A behavior control system for a robot according to claim 15, further comprising:
an external environment recognition section for recognizing a variation of an external environment of said robot, said behavior selection section selecting a behavior based on an index to the external environment in addition to the index to the internal state.

19. A behavior control system for a robot according to claim 15, wherein
said internal state management section changes the index to the internal state in response to passage of time.

20. A behavior control system for a robot according to claim 15, wherein
said internal state management section changes the index to the internal state in response to execution of a behavior selected by said behavior selection section.

21. A behavior control system for a robot according to claim 15, further comprising:
an external environment recognition section for recognizing a variation of an external environment of said robot, said internal state management section changing the index to the internal state in response to a variation of the external environment.

22. A behavior control system for a robot according to claim 15, further comprising:
an external environment recognition section for recognizing a variation of an external environment of said robot and an associative memory section for associatively storing a variation of the internal state from the external environment,
said internal state management section changing the index to the internal state based on a variation of the internal state recalled from the external environment by said associative memory section.

23. A behavior control system for a robot according to claim 22, wherein
said associative memory section associatively stores a variation of the internal state for each object article to be recognized.

24. A behavior control method for a robot which operates autonomously, a plurality of behavior description modules which describe motions of a machine body of said robot being prepared, said behavior control method comprising:
an external environment recognition step of recognizing an external environment of said machine body;
an internal state management step of managing an internal state of said robot in response to the recognized external environment and/or a result of execution of a behavior, and of managing emotions each of which is an index to the internal state in a hierarchical structure having a plurality of layers;
a behavior evaluation step of evaluating execution of behaviors described in said behavior description modules in response to the external environment and/or the internal state,
an arranging step of arranging said behavior description modules in a tree structure form in accordance with implementation levels of the machine body motions,
wherein at the behavior evaluation step, simultaneously and concurrently evaluating a plurality of ones of said behavior description modules from above to below in the tree structure, and
wherein at the internal state management step, the emotions are divided into a layer of primary emotions necessary for individual preservation and another layer of secondary emotions which vary depending upon excess/deficiency of the primary emotions, and the primary emotions are further divided into low order primary emotions by innate reaction, high order primary emotions by homeostasis and primary emotions by association.

25. A behavior control method for a robot according to claim 24, wherein,
at the external environment recognition step, at least one of visual recognition of the outside, auditory recognition of sound generated outside said robot and contact recognition of contact applied from the outside to said robot is performed.

26. A behavior control method for a robot according to claim 24, wherein,
at the internal state management step, an instinct model and/or a feeling model of said robot is managed.

27. A behavior control method for a robot according to claim 24, further comprising:
a behavior selection step of selectively executing, when evaluation of each of said behavior description modules is performed at the behavior evaluation step in response to new recognition at the external environment recognition step and/or a variation of the internal state at the internal state management step, a behavior described in the behavior description module based on the evaluation values.

28. A behavior control method for a robot according to claim 27, further comprising:
a resource management step of managing conflict of a resource on said machine body when behaviors described in a plurality of ones of said behavior description section are executed simultaneously,
simultaneous selection of two or more ones of said behavior description section in response to a conflict relationship of a resource being permitted at the behavior selection step.

29. A behavior control method for a robot according to claim 27, wherein,
when a result of execution of evaluation of each of said behavior description modules at the behavior evaluation step based on new recognition at the external environment recognition step reveals appearance of a behavior description module which exhibits an evaluation value higher than that of the behavior being currently executed, at the behavior selection step, the behavior being currently executed is stopped and the behavior described in the behavior description section having the higher evaluation value is preferentially executed.

30. A behavior control method for a robot according to claim 29, wherein
said behavior selection step causes the behavior stopped once to be resumed after the behavior executed preferentially comes to an end.

31. A behavior control method for a robot according to claim 27, wherein,
at the behavior selection step, a same one of said behavior description modules can be successively selected in response to a variation of each different external environment, and
said behavior control method further comprises a working space management step of allocating an individual working space for each external environment every time the behavior described in the behavior description module is executed.

32. A behavior control method for a robot that operates autonomously in response to an internal state thereof, comprising:
an internal state management step of managing emotions each of which is an index to the internal state in a hierarchical structure having a plurality of layers; and
a behavior selection step of selectively executing a behavior for satisfying one of the emotions in each of said layers,
wherein at the internal state management step, the emotions are divided into a layer of primary emotions necessary for individual preservation and another layer of secondary emotions which vary depending upon excess/deficiency of the primary emotions, and the primary emotions are further divided into low order primary emotions by innate reaction, high order primary emotions by homeostasis and primary emotions by association.

33. A behavior control method for a robot according to claim 32, wherein,
at the behavior selection step, a behavior which satisfies a comparatively low order primary emotion is preferentially selected.

34. A behavior control method for a robot according to claim 32, wherein,
at the behavior selection step, selection of a behavior which satisfies a comparatively low order primary emotion is suppressed where a comparatively high order primary emotion exhibits significant shortage when compared with the comparatively low order primary emotion.

35. A behavior control method for a robot according to claim 32, further comprising:
an external environment recognition step of recognizing a variation of an external environment of said robot,
a behavior being selected, at the behavior selection step, based on an index to the external environment in addition to the index to the internal state.

36. A behavior control method for a robot according to claim 32, wherein,
at the internal state management step, the index to the internal state is changed in response to passage of time.

37. A behavior control method for a robot according to claim 32, wherein,
at the internal state management step, the index to the internal state is changed in response to execution of a behavior selected at the behavior selection step.

38. A behavior control method for a robot according to claim 32, further comprising:
an external environment recognition step of recognizing a variation of an external environment of said robot,
the index to the internal state being changed, at the internal state management step, in response to a variation of the external environment.

39. A behavior control method for a robot according to claim 32, further comprising:
an external environment recognition step of recognizing a variation of an external environment of said robot and an associative memory step of associatively storing a variation of the internal state from the external state,
the index to the internal state being changed, at the internal state management step, based on a variation of the internal environment recalled from the external environment by the associative memory.

40. A behavior control method for a robot according to claim 39, wherein,
at the associative memory step, a variation of the internal state is associatively stored for each object article to be recognized.

41. A robot apparatus that generates a motion based on an internal input or an external input, comprising:
one or more behavior modules for determining a behavior of said robot,
wherein the behavior modules each includes a state machine which describes a motion of a machine body of said robot and a behavior evaluator for evaluating an activity level of a current machine body motion state of said state machine and a machine body resource to be used upon starting of the machine body motion state;
behavior module management means for managing said behavior modules;
state storage means for storing current states of said behavior modules;
one or more state machines corresponding to the states stored in said state storage means for outputting a behavior instruction based on an external or internal input; and
an internal state management section for managing emotions each of which is an index to an internal state of the robot in a hierarchical structure having a plurality of layers,
wherein said internal state management section divides the emotions into a layer of primary emotions necessary for individual preservation and another layer of secondary emotions which vary depending upon excess/deficiency of the primary emotions, and further divides the primary emotions into low order primary emotions by innate reaction, high order primary emotions by homeostasis and primary emotions by association, and
wherein said behavior module management means managing said behavior modules such that, when outputting of a behavior instruction from any of said state machines is stopped and behavior outputting is to be resumed thereafter, said behavior module management means causes the state machine to resume the behavior outputting after said behavior module management means causes said robot to execute a predetermined behavior based on the states stored in said state storage means.

42. A robot apparatus according to claim 41, wherein
said state storage means and said state machines are provided in said behavior modules, and
said behavior module management means is accommodated in another behavior module which cooperates with said behavior modules to form a hierarchical structure and is positioned in a comparatively higher layer in the hierarchical structure.

43. A robot apparatus that operates autonomously, comprising:
a behavior module including means for discriminating a situation based on an external stimulus and an internal environment to calculate an activity level and means for outputting a behavior in response to an input and a state based on a predetermined state machine;
a behavior state control section for selecting said behavior modules to be activated in response to the activity levels and the use resource of said behavior module and issuing an instruction to said state machine of the selected behavior module to execute the state machine thereby to control behavior states of said behavior modules, and
an internal state management section for managing emotions each of which is an index to an internal state of the robot in a hierarchical structure having a plurality of layers,
wherein said internal state management section divides the emotions into a layer of primary emotions necessary for individual preservation and another layer of secondary emotions which vary depending upon excess/deficiency of the primary emotions, and further divides the primary emotions into low order primary emotions by innate reaction, high order primary emotions by homeostasis and primary emotions by association.

44. A robot apparatus according to claim 43, state setting means for setting said behavior module to one of ready, active and standby states in response to the activity level.

45. A robot apparatus according to claim 43, wherein
two or more two behavior modules are arranged in a hierarchical structure, and further comprising
state setting means is configured such that one of said behavior modules which is positioned in a comparatively high layer in the hierarchical structure selects another one of said behavior modules which is positioned in a lower layer in the hierarchical structure.

* * * * *